US012494866B2

(12) United States Patent
Wang et al.

(10) Patent No.: US 12,494,866 B2
(45) Date of Patent: Dec. 9, 2025

(54) COMMUNICATION PROCESSING METHOD AND APPARATUS

(71) Applicant: HUAWEI TECHNOLOGIES CO., LTD., Guangdong (CN)

(72) Inventors: Xiaohan Wang, Shanghai (CN); Liuliu Ji, Shanghai (CN); Haicun Hang, Shanghai (CN); Hongzhe Shi, Shenzhen (CN); Shibin Ge, Shanghai (CN); Xiaoyan Bi, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 585 days.

(21) Appl. No.: 17/489,322

(22) Filed: Sep. 29, 2021

(65) Prior Publication Data
US 2022/0021482 A1 Jan. 20, 2022

Related U.S. Application Data

(63) Continuation of application No. PCT/CN2020/081384, filed on Mar. 26, 2020.

(30) Foreign Application Priority Data

Mar. 29, 2019 (CN) .......................... 201910253512.1

(51) Int. Cl.
*H04W 4/00* (2018.01)
*H04L 1/00* (2006.01)
(Continued)

(52) U.S. Cl.
CPC .......... *H04L 1/0067* (2013.01); *H04L 5/0051* (2013.01); *H04W 72/0446* (2013.01);
(Continued)

(58) Field of Classification Search
CPC ....... H04L 1/0067; H04L 1/0013; H04L 1/08; H04L 5/0051; H04L 5/0026;
(Continued)

(56) References Cited

U.S. PATENT DOCUMENTS

2014/0036806 A1* 2/2014 Chen ..................... H04L 5/0035
370/329
2014/0169279 A1* 6/2014 Song ................... H04W 72/542
370/329
(Continued)

FOREIGN PATENT DOCUMENTS

| CN | 104488217 A | 4/2015 |
|---|---|---|
| CN | 108199819 A | 6/2018 |

(Continued)

OTHER PUBLICATIONS

3GPP TS 36.211 V15.5.0 (Mar. 2019), "3rd Generation Partnership Project; Technical Specification Group Radio Access Network; Evolved Universal Terrestrial Radio Access (E-UTRA); Physical channels and modulation (Release 15)," Mar. 2019, 239 pages.
(Continued)

*Primary Examiner* — Sithu Ko
*Assistant Examiner* — Hidayat Dabiri
(74) *Attorney, Agent, or Firm* — Fish & Richardson P.C.

(57) ABSTRACT

Example communication processing methods and apparatus are described. One method includes receiving M groups of first parameters and N groups of second parameters that are sent by a network device, where each first parameter is a a control resource set (CORESET) group, each second parameter is a cell-specific reference signal (CRS) rate matching parameter, M is equal to N, and both M and N are positive integer greater than or equal to 2. There is an association relationship between each group of first parameters and each group of second parameters. Terminal devices may deter-
(Continued)

mine a punctured time-frequency resource on a physical downlink shared channel (PDSCH) based on CRS rate matching parameters determined by the terminal devices to obtain downlink data.

17 Claims, 17 Drawing Sheets

(51) Int. Cl.

| | |
|---|---|
| H04L 5/00 | (2006.01) |
| H04W 72/0446 | (2023.01) |
| H04W 72/0453 | (2023.01) |
| H04W 72/23 | (2023.01) |
| H04W 80/02 | (2009.01) |

(52) U.S. Cl.
CPC ....... *H04W 72/0453* (2013.01); *H04W 72/23* (2023.01); *H04W 80/02* (2013.01)

(58) Field of Classification Search
CPC ... H04L 1/1896; H04L 5/0035; H04L 5/0044; H04L 5/005; H04L 5/0091; H04L 1/1893; H04L 5/0094; H04W 72/0446; H04W 72/0453; H04W 72/23; H04W 80/02; H04W 28/18
See application file for complete search history.

(56) References Cited

U.S. PATENT DOCUMENTS

| | | | | |
|---|---|---|---|---|
| 2016/0150510 | A1* | 5/2016 | Shao | H04W 72/23 |
| | | | | 370/329 |
| 2017/0311299 | A1* | 10/2017 | Chen | H04L 1/0067 |
| 2018/0160409 | A1 | 6/2018 | Park et al. | |
| 2018/0227804 | A1* | 8/2018 | Damnjanovic | H04W 74/002 |
| 2018/0227922 | A1 | 8/2018 | Lee et al. | |
| 2019/0037577 | A1 | 1/2019 | Sun et al. | |
| 2019/0098590 | A1* | 3/2019 | Nam | H04W 72/23 |
| 2019/0342030 | A1* | 11/2019 | Hosseini | H04L 1/00 |
| 2021/0050934 | A1* | 2/2021 | Khoshnevisan | H04L 1/0067 |
| 2022/0131642 | A1* | 4/2022 | Kim | H04L 5/005 |

FOREIGN PATENT DOCUMENTS

| | | |
|---|---|---|
| CN | 108494536 A | 9/2018 |
| CN | 108633078 A | 10/2018 |
| CN | 108781095 A | 11/2018 |
| WO | 2015013959 A1 | 2/2015 |
| WO | 2018031623 A1 | 2/2018 |
| WO | 2018106043 A1 | 6/2018 |
| WO | 2018164452 A1 | 9/2018 |
| WO | 2018226039 A2 | 12/2018 |

OTHER PUBLICATIONS

3GPP TS 38.211 V15.5.0 (Mar. 2019), "3rd Generation Partnership Project; Technical Specification Group Radio Access Network; NR; Physical channels and modulation(Release 15)," Mar. 2019, 96 pages.
3GPP TS 38.212 V15.5.0 (Mar. 2019), "3rd Generation Partnership Project; Technical Specification Group Radio Access Network; NR; Multiplexing and channel coding(Release 15)," Mar. 2019, 101 pages.
3GPP TS 38.213 V15.5.0 (Mar. 2019), "3rd Generation Partnership Project; Technical Specification Group Radio Access Network; NR; Physical layer procedures for control(Release 15)," Mar. 2019, 104 pages.
3GPP TS 38.214 V15.5.0 (Mar. 2019), "3rd Generation Partnership Project; Technical Specification Group Radio Access Network; NR; Physical layer procedures for data(Release 15)," Mar. 2019, 103 pages.
3GPP TS 38.331 V15.4.0 (Dec. 2018), "3rd Generation Partnership Project; Technical Specification Group Radio Access Network; NR; Radio Resource Control (RRC) protocol specification (Release 15)," Mar. 2018, 474 pages.
Huawei, HiSilicon, "Summary of AI: 7.2.8.2 Enhancements on Multi-TRP/Panel Transmission of Offline Discussion," 3GPP TSG RAN WG1 Meeting #96, R1-1903541, Athens, Greece, Feb. 25-Mar. 1, 2019, 59 pages.
Nokia, "CR to 38.214 capturing the RAN1#94bis and RAN1#95 meeting agreements," 3GPP TSG-RAN1 Meeting #95, R1-1814381, Spokane, USA, Nov. 12-16, 2018, 104 pages.
Nokia, Nokia Shanghai Bell, "Summary of offline on maintenance related to rate-matching in NR," 3GPP TSG-RAN WG1 #95, R1-1813937, Spokane, USA, Nov. 12-16, 2018, 9 pages.
Office Action issued in Chinese Application No. 201910253512.1 on Aug. 17, 2021, 8 pages (with English translation).
Office Action issued in Chinese Application No. 201910253512.1 on Mar. 3, 2021, 24 pages (with English translation).
PCT International Search Report and Written Opinion issued in International Application No. PCT/CN2020/081384 on Jun. 24, 2020, 17 pages (with English translation).
Qualcomm Incorporated, "Multi-TRP Enhancements," 3GPP TSG-RAN WG1 Meeting #95, R1-1813442, Spokane, WA, USA, Nov. 12-16, 2018, 20 pages.
Extended European Search Report issued in European Application No. 20782824.5 on Mar. 24, 2022, 11 pages.
Huawei et al., "Enhancements on Multi-TRP/panel transmission," 3GPP TSG RAN WG1 Meeting #96, R1-1901567, Athens, Greece, Feb. 25-Mar. 1, 2019, 14 pages.
3GPP TS 38.300 V15.4.0, "3rd Generation Partnership Project; Technical Specification Group Radio Access Network; NR; NR and NG-RAN Overall Description; Stage 2 (Release 15)," Dec. 2018, 97 pages.

* cited by examiner

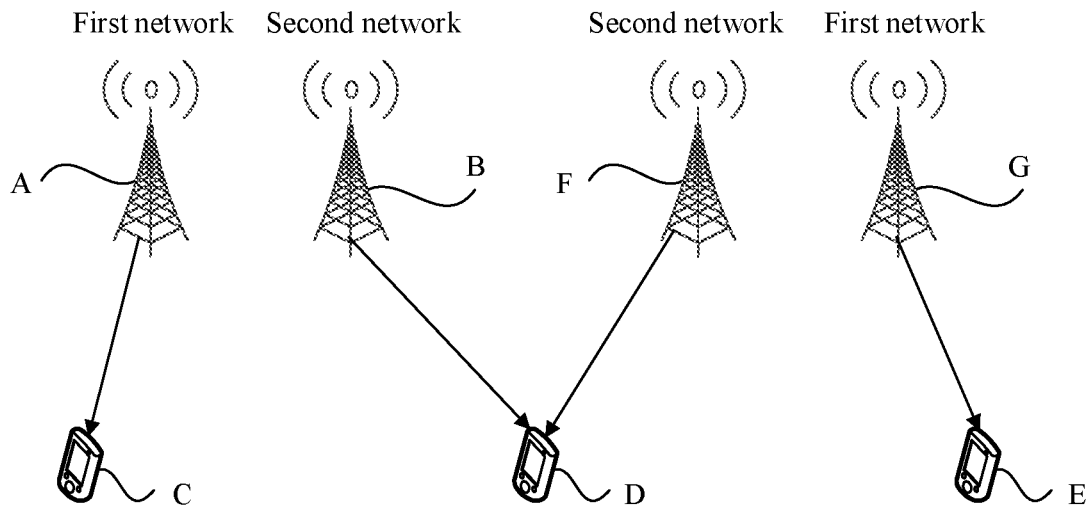

FIG. 8

Receive M groups of first parameters and N groups of second parameters that are sent by a network device, where the first parameter is a downlink parameter, the second parameter is a CRS rate matching parameter, M is a positive integer greater than or equal to 2, and N is a positive integer greater than or equal to 1, where there is an association relationship between P groups of first parameters in the M groups of first parameters and the N groups of second parameters, P is less than or equal to M, and P is a positive integer   S101

FIG. 9

Receive M groups of first parameters and N groups of second parameters that are sent by a network device, where the first parameter is a downlink parameter, the second parameter is a CRS rate matching parameter, M is a positive integer greater than or equal to 1, and N is a positive integer greater than or equal to 1, where there is an association relationship between P groups of first parameters in the M groups of first parameters and the N groups of second parameters, P is less than or equal to M, and P is a positive integer ⎯ S301

FIG. 14

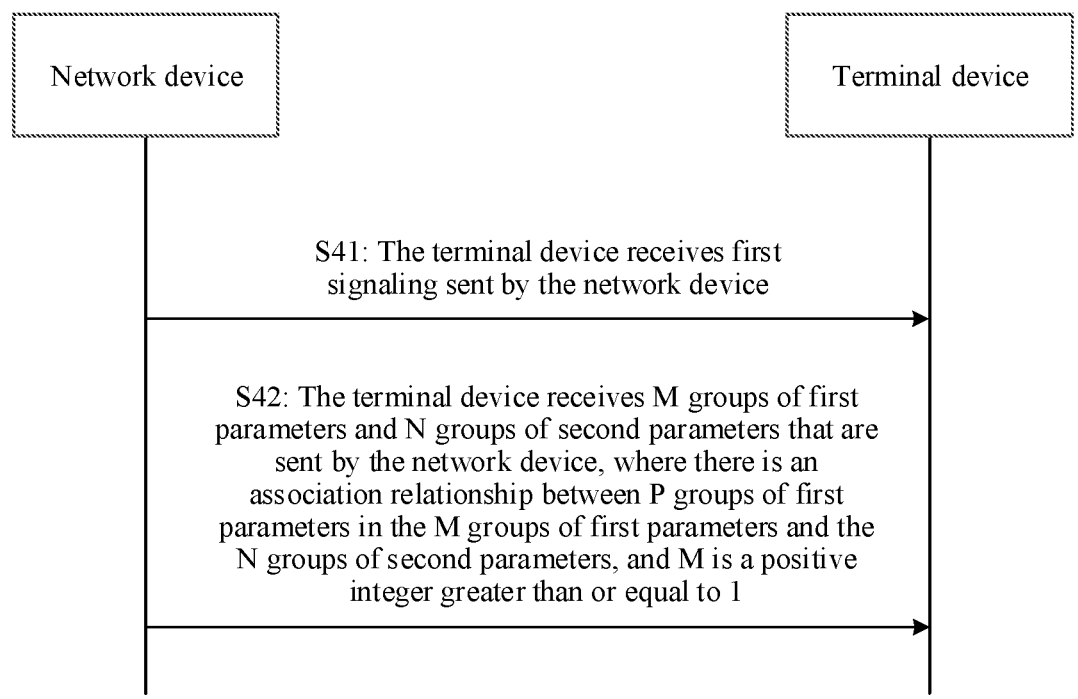

FIG. 15

Receive M groups of first parameters and N groups of second parameters that are sent by a network device, where the first parameter is a downlink parameter, the second parameter is a cell-specific reference signal CRS rate matching parameter, M is a positive integer greater than or equal to 2, and N is a positive integer greater than or equal to 1, where P groups of first parameters in the M groups of first parameters and the N groups of second parameters are used to determine a physical downlink shared channel PDSCH time-frequency resource on which CRS rate matching is performed, P is less than or equal to M, and P is a positive integer — S401

FIG. 16

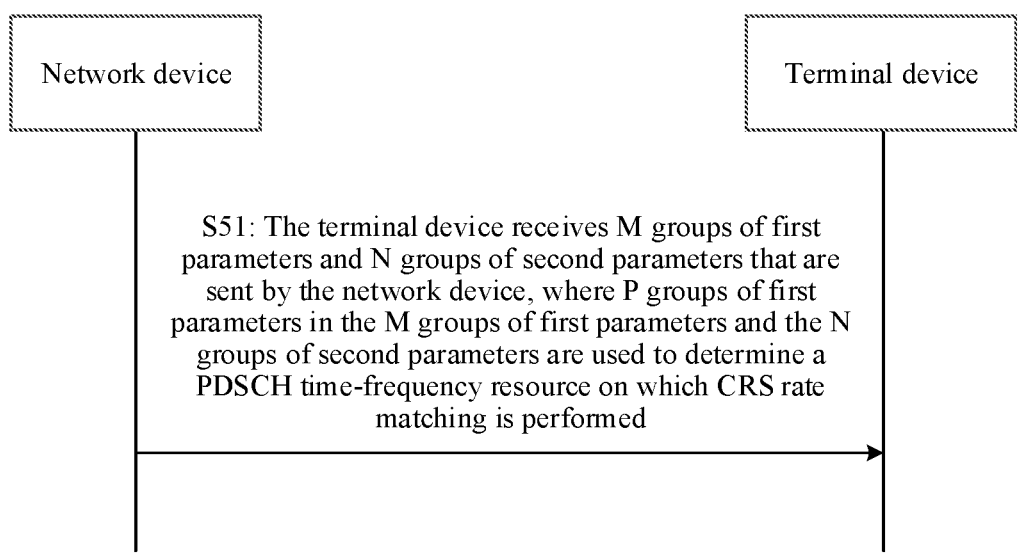

FIG. 17

Receive N groups of CRS rate matching parameters sent by a network device, where N is a positive integer greater than or equal to 1, and the N groups of CRS rate matching parameters are used to determine a PDSCH time-frequency resource on which CRS rate matching is performed — S501

FIG. 18a

COMMUNICATION PROCESSING METHOD AND APPARATUS

CROSS-REFERENCE TO RELATED APPLICATIONS

This application is a continuation of International Application No. PCT/CN2020/081384, filed on Mar. 26, 2020, which claims priority to Chinese Patent Application No. 201910253512.1, filed on Mar. 29, 2019. The disclosures of the aforementioned applications are hereby incorporated by reference in their entireties.

TECHNICAL FIELD

This application relates to the field of communication technologies, and in particular, to a communication processing method and apparatus.

BACKGROUND

In a communication system, cells in a network are adjacent to each other. When a terminal device is located in an edge area of a cell, the terminal device may be interfered with by a signal from a neighboring cell of the cell. Consequently, a signal sending and receiving capability of the terminal device is relatively poor, and a channel state of the terminal device is relatively poor.

In a conventional technology, to resolve the foregoing signal interference problem, a coordinated multipoint transmission/reception technology (coordinated multi-point, CoMP) is provided. To be specific, a plurality of network devices coordinate to avoid signal interference to the terminal device.

However, in the conventional technology, when sending downlink data to the terminal device by using a data channel, the network devices perform rate matching (rate matching) processing. Rate matching means that rate matching is performed on a time-frequency resource of the data channel for sending the downlink data. However, in the coordinated multipoint transmission/reception process, how the terminal device determines time-frequency resources on which rate matching is performed, to obtain the downlink data is a problem that needs to be resolved.

SUMMARY

This application provides a communication processing method and apparatus, to resolve a conventional-technology problem of how to determine time-frequency resources on which rate matching is performed, to obtain downlink data.

According to a first aspect, this application provides a communication processing method, including:

receiving M groups of first parameters and N groups of second parameters that are sent by a network device, where the first parameter is a downlink parameter, the second parameter is a cell-specific reference signal CRS rate matching parameter, M is a positive integer greater than or equal to 2, and N is a positive integer greater than or equal to 1, where there is an association relationship between P groups of first parameters in the M groups of first parameters and the N groups of second parameters, P is less than or equal to M, and P is a positive integer.

In this application, the network device delivers the first parameters and the at least one group of second parameters, and there is the association relationship between the first parameters and the second parameters. Further, a terminal device or another network device may receive the plurality of groups of first parameters and the at least one group of second parameters that have the association relationship. Then the terminal device or the another network device can obtain data based on the plurality of groups of first parameters and the at least one group of second parameters that have the association relationship. For example, the terminal device determines a time-frequency resource based on the parameters, or the terminal device obtains downlink data based on the parameters. Therefore, in a coordinated multipoint transmission/reception process, network devices participating in coordination may separately perform rate matching on time-frequency resources based on respective CRS rate matching parameters associated with downlink parameters. Terminal devices may determine, based on CRS rate matching parameters determined by the terminal devices, physical downlink shared channel (physical downlink shared channel, PDSCH) time-frequency resources on which rate matching is performed, to obtain downlink data. In this way, in a multi-site coordination scenario, CRS rate matching processes are implemented, to ensure that the terminal devices are not interfered with by a signal from another cell, and can correctly exchange data with the network devices.

In a possible implementation, the association relationship is predefined.

In a possible implementation, the method further includes:

receiving first signaling sent by the network device, where the first signaling includes the association relationship, or the first signaling is used to indicate the association relationship.

In a possible implementation, the first signaling is one or more of the following: radio resource control RRC signaling, media access control-control element MAC-CE signaling, and downlink control information DCI signaling.

In a possible implementation, the receiving M groups of first parameters and N groups of second parameters that are sent by a network device includes:

receiving second signaling sent by the network device, where the second signaling includes the M groups of first parameters and/or the N groups of second parameters, or the second signaling is used to indicate the M groups of first parameters and/or the N groups of second parameters.

In a possible implementation, the second signaling is one or more of the following: RRC signaling, MAC-CE signaling, and DCI signaling.

In a possible implementation, when M is equal to N, each group of first parameters is associated in a one-to-one correspondence with each group of second parameters.

In a possible implementation, when M is greater than N, at least two groups of first parameters are associated with a same group of second parameters.

In a possible implementation, the downlink parameter is a downlink control resource parameter or a downlink data parameter. Optionally, the downlink parameter may alternatively be a downlink control resource parameter and a downlink data parameter.

In a possible implementation, the P groups of first parameters and the N groups of second parameters are used to determine a physical downlink shared channel PDSCH time-frequency resource on which CRS rate matching is performed.

In a possible implementation, the PDSCH time-frequency resource on which CRS rate matching is performed is a remaining PDSCH time-frequency resource in a configured PDSCH time-frequency resource except a resource overlapping a CRS resource indicated by the second parameter; and the first parameter is the downlink control resource parameter, and the configured PDSCH time-frequency resource is a PDSCH time-frequency resource scheduled by downlink control information DCI transmitted on a physical downlink control channel PDCCH indicated by the downlink control resource parameter.

In a possible implementation, the PDSCH time-frequency resource on which CRS rate matching is performed is a remaining PDSCH time-frequency resource in a configured PDSCH time-frequency resource except a resource overlapping a CRS resource indicated by the second parameter; and the first parameter is the downlink data parameter, and the configured PDSCH time-frequency resource is a time-frequency resource corresponding to a PDSCH associated with the downlink data parameter.

According to a second aspect, this application provides a communication processing method, including:

sending M groups of first parameters and N groups of second parameters to a terminal device, where the first parameter is a downlink parameter, the second parameter is a cell-specific reference signal CRS rate matching parameter, M is a positive integer greater than or equal to 2, and N is a positive integer greater than or equal to 1, where there is an association relationship between P groups of first parameters in the M groups of first parameters and the N groups of second parameters, P is less than or equal to M, and P is a positive integer.

In this application, a network device delivers the first parameters and the at least one group of second parameters, and there is the association relationship between the first parameters and the second parameters. Further, the terminal device or another network device may receive the plurality of groups of first parameters and the at least one group of second parameters that have the association relationship. Then the terminal device or the another network device can obtain data based on the plurality of groups of first parameters and the at least one group of second parameters that have the association relationship. For example, the terminal device determines a time-frequency resource based on the parameters, or the terminal device obtains downlink data based on the parameters. Therefore, in a coordinated multipoint transmission/reception process, network devices participating in coordination may separately perform rate matching on time-frequency resources based on respective CRS rate matching parameters associated with downlink parameters. Terminal devices may determine, based on CRS rate matching parameters determined by the terminal devices, physical downlink shared channel (physical downlink shared channel, PDSCH) time-frequency resources on which rate matching is performed, to obtain downlink data. In this way, in a multi-site coordination scenario, CRS rate matching processes are implemented, to ensure that the terminal devices are not interfered with by a signal from another cell, and can correctly exchange data with the network devices.

In a possible implementation, the association relationship is predefined.

In a possible implementation, the method further includes:

sending first signaling to the terminal device, where the first signaling includes the association relationship, or the first signaling is used to indicate the association relationship.

In a possible implementation, the first signaling is one or more of the following: radio resource control RRC signaling, media access control-control element MAC-CE signaling, and downlink control information DCI signaling.

In a possible implementation, the sending M groups of first parameters and N groups of second parameters to a terminal device includes:

sending second signaling to the terminal device, where the second signaling includes the M groups of first parameters and/or the N groups of second parameters, or the second signaling is used to indicate the M groups of first parameters and/or the N groups of second parameters.

In a possible implementation, the second signaling is one or more of the following: RRC signaling, MAC-CE signaling, and DCI signaling.

In a possible implementation, when M is equal to N, each group of first parameters is associated in a one-to-one correspondence with each group of second parameters.

In a possible implementation, when M is greater than N, at least two groups of first parameters are associated with a same group of second parameters.

In a possible implementation, the downlink parameter is a downlink control resource parameter or a downlink data parameter. Optionally, the downlink parameter may alternatively be a downlink control resource parameter and a downlink data parameter.

In a possible implementation, the P groups of first parameters and the N groups of second parameters are used by the terminal device to determine a physical downlink shared channel PDSCH time-frequency resource on which CRS rate matching is performed.

In a possible implementation, the PDSCH time-frequency resource on which CRS rate matching is performed is a remaining PDSCH time-frequency resource in a configured PDSCH time-frequency resource except a resource overlapping a CRS resource indicated by the second parameter; and the first parameter is the downlink control resource parameter, and the configured PDSCH time-frequency resource is a PDSCH time-frequency resource scheduled by downlink control information DCI transmitted on a physical downlink control channel PDCCH indicated by the downlink control resource parameter.

In a possible implementation, the PDSCH time-frequency resource on which CRS rate matching is performed is a remaining PDSCH time-frequency resource in a configured PDSCH time-frequency resource except a resource overlapping a CRS resource indicated by the second parameter; and the first parameter is the downlink data parameter, and the configured PDSCH time-frequency resource is a time-frequency resource corresponding to a PDSCH associated with the downlink data parameter.

According to a third aspect, this application provides a communication processing apparatus, including:

a communication module, configured to receive M groups of first parameters and N groups of second parameters that are sent by a network device, where the first parameter is a downlink parameter, the second parameter is a cell-specific reference signal CRS rate matching parameter, M is a positive integer greater than or equal to 2, and N is a positive integer greater than or equal to 1, where there is an association relationship between P groups of first parameters in the M groups of first parameters and the N groups of second parameters, P is less than or equal to M, and P is a positive integer.

In a possible implementation, the association relationship is predefined.

In a possible implementation, the communication module is further configured to:
receive first signaling sent by the network device, where the first signaling includes the association relationship, or the first signaling is used to indicate the association relationship.

In a possible implementation, the first signaling is one or more of the following: radio resource control RRC signaling, media access control-control element MAC-CE signaling, and downlink control information DCI signaling.

In a possible implementation, the communication module is specifically configured to:
receive second signaling sent by the network device, where the second signaling includes the M groups of first parameters and/or the N groups of second parameters, or the second signaling is used to indicate the M groups of first parameters and/or the N groups of second parameters.

In a possible implementation, the second signaling is one or more of the following: RRC signaling, MAC-CE signaling, and DCI signaling.

In a possible implementation, when M is equal to N, each group of first parameters is associated in a one-to-one correspondence with each group of second parameters.

In a possible implementation, when M is greater than N, at least two groups of first parameters are associated with a same group of second parameters.

In a possible implementation, the downlink parameter is a downlink control resource parameter or a downlink data parameter. Optionally, the downlink parameter may alternatively be a downlink control resource parameter and a downlink data parameter.

In a possible implementation, the P groups of first parameters and the N groups of second parameters are used to determine a physical downlink shared channel PDSCH time-frequency resource on which CRS rate matching is performed.

In a possible implementation, the PDSCH time-frequency resource on which CRS rate matching is performed is a remaining PDSCH time-frequency resource in a configured PDSCH time-frequency resource except a resource overlapping a CRS resource indicated by the second parameter; and
the first parameter is the downlink control resource parameter, and the configured PDSCH time-frequency resource is a PDSCH time-frequency resource scheduled by downlink control information DCI transmitted on a physical downlink control channel PDCCH indicated by the downlink control resource parameter.

In a possible implementation, the PDSCH time-frequency resource on which CRS rate matching is performed is a remaining PDSCH time-frequency resource in a configured PDSCH time-frequency resource except a resource overlapping a CRS resource indicated by the second parameter; and
the first parameter is the downlink data parameter, and the configured PDSCH time-frequency resource is a time-frequency resource corresponding to a PDSCH associated with the downlink data parameter.

According to a fourth aspect, this application provides a communication processing apparatus, including:
a communication module, configured to send M groups of first parameters and N groups of second parameters to a terminal device, where the first parameter is a downlink parameter, the second parameter is a cell-specific reference signal CRS rate matching parameter, M is a positive integer greater than or equal to 2, and N is a positive integer greater than or equal to 1, where there is an association relationship between P groups of first parameters in the M groups of first parameters and the N groups of second parameters, P is less than or equal to M, and P is a positive integer.

In a possible implementation, the association relationship is predefined.

In a possible implementation, the communication module is further configured to:
send first signaling to the terminal device, where the first signaling includes the association relationship, or the first signaling is used to indicate the association relationship.

In a possible implementation, the first signaling is one or more of the following: radio resource control RRC signaling, media access control-control element MAC-CE signaling, and downlink control information DCI signaling.

In a possible implementation, the communication module is specifically configured to:
send second signaling to the terminal device, where the second signaling includes the M groups of first parameters and/or the N groups of second parameters, or the second signaling is used to indicate the M groups of first parameters and/or the N groups of second parameters.

In a possible implementation, the second signaling is one or more of the following: RRC signaling, MAC-CE signaling, and DCI signaling.

In a possible implementation, when M is equal to N, each group of first parameters is associated in a one-to-one correspondence with each group of second parameters.

In a possible implementation, when M is greater than N, at least two groups of first parameters are associated with a same group of second parameters.

In a possible implementation, the downlink parameter is a downlink control resource parameter or a downlink data parameter. Optionally, the downlink parameter may alternatively be a downlink control resource parameter and a downlink data parameter.

In a possible implementation, the P groups of first parameters and the N groups of second parameters are used by the terminal device to determine a physical downlink shared channel PDSCH time-frequency resource on which CRS rate matching is performed.

In a possible implementation, the PDSCH time-frequency resource on which CRS rate matching is performed is a remaining PDSCH time-frequency resource in a configured PDSCH time-frequency resource except a resource overlapping a CRS resource indicated by the second parameter; and
the first parameter is the downlink control resource parameter, and the configured PDSCH time-frequency resource is a PDSCH time-frequency resource scheduled by downlink control information DCI transmitted on a physical downlink control channel PDCCH indicated by the downlink control resource parameter.

In a possible implementation, the PDSCH time-frequency resource on which CRS rate matching is performed is a remaining PDSCH time-frequency resource in a configured PDSCH time-frequency resource except a resource overlapping a CRS resource indicated by the second parameter; and
the first parameter is the downlink data parameter, and the configured PDSCH time-frequency resource is a time-frequency resource corresponding to a PDSCH associated with the downlink data parameter.

According to a fifth aspect, this application provides a terminal device, including a unit or a means (means) configured to perform the steps of any method according to the foregoing first aspect.

According to a sixth aspect, this application provides a communication apparatus. The communication apparatus may be a terminal device, may be an apparatus in the terminal device, or exists in a product form of a chip. The communication apparatus includes a processor. The processor is connected to a memory. The memory stores computer program instructions. The processor executes the computer program instructions stored in the memory, to implement the method according to any one of the first aspect or the implementations of the first aspect. The memory and the processor may be integrated together, or may be independent devices. If the memory and the processor are the independent devices, the memory may be located inside the communication apparatus, or may be located outside the communication apparatus.

In a possible implementation, the processor includes a logic circuit and an input interface and/or an output interface. The output interface is configured to perform a sending action in a corresponding method, and the input interface is configured to perform a receiving action in the corresponding method.

In a possible implementation, the communication apparatus further includes a communication interface and a communication bus. The processor, the memory, and the communication interface are connected by using the communication bus. The communication interface is configured to perform sending and receiving actions in the corresponding method. The communication interface may also be referred to as a transceiver. Optionally, the communication interface includes a transmitter or a receiver. In this case, the transmitter is configured to perform a sending action in a corresponding method, and the receiver is configured to perform a receiving action in the corresponding method.

According to a seventh aspect, this application provides a terminal device, including at least one processing element or chip configured to perform any method according to the first aspect.

According to an eighth aspect, this application provides a program product, including computer program instructions. When executed by a computer, the computer program instructions are used to perform any method according to the first aspect.

According to a ninth aspect, this application provides a computer-readable storage medium, including the program in the fifth aspect.

According to a tenth aspect, this application provides a network device, including a unit or a means (means) configured to perform the steps of any method according to the foregoing second aspect.

According to an eleventh aspect, this application provides a communication apparatus. The communication apparatus may be a network device, may be an apparatus in the network device, or exists in a product form of a chip. The communication apparatus includes a processor. The processor is connected to a memory. The memory stores computer program instructions. The processor executes the computer program instructions stored in the memory, to implement the method according to any one of the second aspect or the implementations of the second aspect. The memory and the processor may be integrated together, or may be independent devices. If the memory and the processor are the independent devices, the memory may be located inside the communication apparatus, or may be located outside the communication apparatus.

In a possible implementation, the processor includes a logic circuit and an input interface and/or an output interface. The output interface is configured to perform a sending action in a corresponding method, and the input interface is configured to perform a receiving action in the corresponding method.

In a possible implementation, the communication apparatus further includes a communication interface and a communication bus. The processor, the memory, and the communication interface are connected by using the communication bus. The communication interface is configured to perform sending and receiving actions in the corresponding method. The communication interface may also be referred to as a transceiver. Optionally, the communication interface includes a transmitter or a receiver. In this case, the transmitter is configured to perform a sending action in a corresponding method, and the receiver is configured to perform a receiving action in the corresponding method.

According to a twelfth aspect, this application provides a network device, including at least one processing element or chip configured to perform any method according to the second aspect.

According to a thirteenth aspect, this application provides a program product, including computer program instructions. When executed by a computer, the computer program instructions are used to perform any method according to the second aspect.

According to a fourteenth aspect, this application provides a computer-readable storage medium, including the program in the thirteenth aspect.

According to a fifteenth aspect, this application provides a communication processing method, including:
  receiving M groups of first parameters and N groups of second parameters that are sent by a network device, where the first parameter is a downlink parameter, the second parameter is a cell-specific reference signal CRS rate matching parameter, M is a positive integer greater than or equal to 2, and N is a positive integer greater than or equal to 1, where
  P groups of first parameters in the M groups of first parameters and the N groups of second parameters are used to determine a physical downlink shared channel PDSCH time-frequency resource on which CRS rate matching is performed, P is less than or equal to M, and P is a positive integer.

In this embodiment, in a multi-site coordination scenario, the network device may send the plurality of groups of downlink parameters and the at least one group of CRS rate matching parameters to a terminal device, and network devices participating in coordination may perform rate matching processes based on the foregoing parameters. Then terminal devices may obtain the downlink parameters and the CRS rate matching parameters, and then obtain data. For example, the terminal devices determine a time-frequency resource based on the parameters, or the terminal devices obtain downlink data based on the parameters. Therefore, in a coordinated multipoint transmission/reception process, the network devices participating in coordination may separately perform rate matching on time-frequency resources based on respective CRS rate matching parameters associated with downlink parameters. The terminal devices may determine a punctured time-frequency resource on a PDSCH based on CRS rate matching parameters determined by the terminal devices, to obtain downlink data. In this way, in the multi-site coordination scenario, CRS rate matching processes are implemented, to ensure that the terminal devices are not interfered with by a signal from another cell, and can correctly exchange data with the network devices.

In a possible implementation, the M groups of first parameters correspond to Q network devices, the N groups of first parameters correspond to the Q network devices, and Q is a positive integer greater than or equal to 2.

In a possible implementation, when M is equal to N, the M groups of first parameters correspond to the Q network devices. For example, each group of first parameters in the M groups of first parameters corresponds to each of the Q network devices, a plurality of groups of first parameters correspond to a same network device, or a same group of first parameters corresponds to a plurality of network devices. Each group of second parameters in the N groups of second parameters corresponds to each of the Q network devices.

In a possible implementation, when M is greater than N, the M groups of first parameters correspond to the Q network devices. For example, each group of first parameters in the M groups of first parameters corresponds to each of the Q network devices, a plurality of groups of first parameters correspond to a same network device, or a same group of first parameters corresponds to a plurality of network devices. At least two of the network devices correspond to a same group of second parameters.

In a possible implementation, at least one of the Q network devices is the network device that sends the first parameters and/or the second parameters.

In a possible implementation, the downlink parameter is a downlink control resource parameter or a downlink data parameter. Optionally, the downlink parameter may alternatively be a downlink control resource parameter and a downlink data parameter.

In a possible implementation, the PDSCH time-frequency resource on which CRS rate matching is performed is a remaining PDSCH time-frequency resource in a configured PDSCH time-frequency resource except a resource overlapping a CRS resource associated with the second parameter; and the first parameter is the downlink control resource parameter, and the configured PDSCH time-frequency resource is a PDSCH time-frequency resource scheduled by downlink control information DCI transmitted on a physical downlink control channel PDCCH indicated by the downlink control resource parameter.

In a possible implementation, the PDSCH time-frequency resource on which CRS rate matching is performed is a remaining PDSCH time-frequency resource in a configured PDSCH time-frequency resource except a resource overlapping a CRS resource associated with the second parameter; and the first parameter is the downlink data parameter, and the configured PDSCH time-frequency resource is a time-frequency resource corresponding to a PDSCH associated with the downlink control data parameter.

According to a sixteenth aspect, this application provides a communication processing method, including:

sending M groups of first parameters and N groups of second parameters to a terminal device, where the first parameter is a downlink parameter, the second parameter is a cell-specific reference signal CRS rate matching parameter, M is a positive integer greater than or equal to 2, and N is a positive integer greater than or equal to 1, where P groups of first parameters in the M groups of first parameters and the N groups of second parameters are used by the terminal device to determine a physical downlink shared channel PDSCH time-frequency resource on which CRS rate matching is performed, P is less than or equal to M, and P is a positive integer.

In this embodiment, in a multi-site coordination scenario, a network device may send the plurality of groups of downlink parameters and the at least one group of CRS rate matching parameters to the terminal device, and network devices participating in coordination may perform rate matching processes based on the foregoing parameters. Then terminal devices may obtain the downlink parameters and the CRS rate matching parameters, and then obtain data. For example, the terminal devices determine a time-frequency resource based on the parameters, or the terminal devices obtain downlink data based on the parameters. Therefore, in a coordinated multipoint transmission/reception process, the network devices participating in coordination may separately perform rate matching on time-frequency resources based on respective CRS rate matching parameters associated with downlink parameters. The terminal devices may determine a punctured time-frequency resource on a PDSCH based on CRS rate matching parameters determined by the terminal devices, to obtain downlink data. In this way, in the multi-site coordination scenario, CRS rate matching processes are implemented, to ensure that the terminal devices are not interfered with by a signal from another cell, and can correctly exchange data with the network devices.

In a possible implementation, the M groups of first parameters correspond to Q network devices, the N groups of first parameters correspond to the Q network devices, and Q is a positive integer greater than or equal to 2.

In a possible implementation, when M is equal to N, the M groups of first parameters correspond to the Q network devices. For example, each group of first parameters in the M groups of first parameters corresponds to each of the Q network devices, a plurality of groups of first parameters correspond to a same network device, or a same group of first parameters corresponds to a plurality of network devices. Each group of second parameters in the N groups of second parameters corresponds to each of the Q network devices.

In a possible implementation, when M is greater than N, the M groups of first parameters correspond to the Q network devices. For example, each group of first parameters in the M groups of first parameters corresponds to each of the Q network devices, a plurality of groups of first parameters correspond to a same network device, or a same group of first parameters corresponds to a plurality of network devices. At least two of the network devices correspond to a same group of second parameters.

In a possible implementation, at least one of the Q network devices is the network device that sends the first parameters and/or the second parameters.

In a possible implementation, the downlink parameter is a downlink control resource parameter or a downlink data parameter. Optionally, the downlink parameter may alternatively be a downlink control resource parameter and a downlink data parameter.

In a possible implementation, the PDSCH time-frequency resource on which CRS rate matching is performed is a remaining PDSCH time-frequency resource in a configured PDSCH time-frequency resource except a resource overlapping a CRS resource associated with the second parameter; and the first parameter is the downlink control resource parameter, and the configured PDSCH time-frequency resource is a PDSCH time-frequency resource scheduled by downlink control information DCI transmitted on a physical downlink control channel PDCCH indicated by the downlink control resource parameter.

In a possible implementation, the PDSCH time-frequency resource on which CRS rate matching is performed is a remaining PDSCH time-frequency resource in a configured PDSCH time-frequency resource except a resource overlapping a CRS resource associated with the second parameter; and the first parameter is the downlink data parameter, and the configured PDSCH time-frequency resource is a time-frequency resource corresponding to a PDSCH associated with the downlink control data parameter.

According to a seventeenth aspect, this application provides a communication processing apparatus, including:

a communication module, configured to receive M groups of first parameters and N groups of second parameters that are sent by a network device, where the first parameter is a downlink parameter, the second parameter is a cell-specific reference signal CRS rate matching parameter, M is a positive integer greater than or equal to 2, and N is a positive integer greater than or equal to 1, where P groups of first parameters in the M groups of first parameters and the N groups of second parameters are used to determine a physical downlink shared channel PDSCH time-frequency resource on which CRS rate matching is performed, P is less than or equal to M, and P is a positive integer.

In a possible implementation, the M groups of first parameters correspond to Q network devices, the N groups of first parameters correspond to the Q network devices, and Q is a positive integer greater than or equal to 2.

In a possible implementation, when M is equal to N, the M groups of first parameters correspond to the Q network devices. For example, each group of first parameters in the M groups of first parameters corresponds to each of the Q network devices, a plurality of groups of first parameters correspond to a same network device, or a same group of first parameters corresponds to a plurality of network devices. Each group of second parameters in the N groups of second parameters corresponds to each of the Q network devices.

In a possible implementation, when M is greater than N, the M groups of first parameters correspond to the Q network devices. For example, each group of first parameters in the M groups of first parameters corresponds to each of the Q network devices, a plurality of groups of first parameters correspond to a same network device, or a same group of first parameters corresponds to a plurality of network devices. At least two of the network devices correspond to a same group of second parameters.

In a possible implementation, at least one of the Q network devices is the network device that sends the first parameters and/or the second parameters.

In a possible implementation, the downlink parameter is a downlink control resource parameter or a downlink data parameter. Optionally, the downlink parameter may alternatively be a downlink control resource parameter and a downlink data parameter.

In a possible implementation, the PDSCH time-frequency resource on which CRS rate matching is performed is a remaining PDSCH time-frequency resource in a configured PDSCH time-frequency resource except a resource overlapping a CRS resource associated with the second parameter; and the first parameter is the downlink control resource parameter, and the configured PDSCH time-frequency resource is a PDSCH time-frequency resource scheduled by downlink control information DCI transmitted on a physical downlink control channel PDCCH indicated by the downlink control resource parameter.

In a possible implementation, the PDSCH time-frequency resource on which CRS rate matching is performed is a remaining PDSCH time-frequency resource in a configured PDSCH time-frequency resource except a resource overlapping a CRS resource associated with the second parameter; and the first parameter is the downlink data parameter, and the configured PDSCH time-frequency resource is a time-frequency resource corresponding to a PDSCH associated with the downlink control data parameter.

According to an eighteenth aspect, this application provides a communication processing apparatus, including:

a communication module, configured to send M groups of first parameters and N groups of second parameters to a terminal device, where the first parameter is a downlink parameter, the second parameter is a cell-specific reference signal CRS rate matching parameter, M is a positive integer greater than or equal to 2, and N is a positive integer greater than or equal to 1, where P groups of first parameters in the M groups of first parameters and the N groups of second parameters are used by the terminal device to determine a physical downlink shared channel PDSCH time-frequency resource on which CRS rate matching is performed, P is less than or equal to M, and P is a positive integer.

In a possible implementation, the M groups of first parameters correspond to Q network devices, the N groups of first parameters correspond to the Q network devices, and Q is a positive integer greater than or equal to 2.

In a possible implementation, when M is equal to N, the M groups of first parameters correspond to the Q network devices. For example, each group of first parameters in the M groups of first parameters corresponds to each of the Q network devices, a plurality of groups of first parameters correspond to a same network device, or a same group of first parameters corresponds to a plurality of network devices. Each group of second parameters in the N groups of second parameters corresponds to each of the Q network devices.

In a possible implementation, when M is greater than N, the M groups of first parameters correspond to the Q network devices. For example, each group of first parameters in the M groups of first parameters corresponds to each of the Q network devices, a plurality of groups of first parameters correspond to a same network device, or a same group of first parameters corresponds to a plurality of network devices. At least two of the network devices correspond to a same group of second parameters.

In a possible implementation, at least one of the Q network devices is the network device that sends the first parameters and/or the second parameters.

In a possible implementation, the downlink parameter is a downlink control resource parameter or a downlink data parameter. Optionally, the downlink parameter may alternatively be a downlink control resource parameter and a downlink data parameter.

In a possible implementation, the PDSCH time-frequency resource on which CRS rate matching is performed is a remaining PDSCH time-frequency resource in a configured PDSCH time-frequency resource except a resource overlapping a CRS resource associated with the second parameter; and the first parameter is the downlink control resource parameter, and the configured PDSCH time-frequency resource is a PDSCH time-frequency resource scheduled by downlink control information DCI transmitted on a physical downlink control channel PDCCH indicated by the downlink control resource parameter.

In a possible implementation, the PDSCH time-frequency resource on which CRS rate matching is performed is a remaining PDSCH time-frequency resource in a configured PDSCH time-frequency resource except a resource overlapping a CRS resource associated with the second parameter; and the first parameter is the downlink data parameter, and the configured PDSCH time-frequency resource is a time-frequency resource corresponding to a PDSCH associated with the downlink control data parameter.

According to a nineteenth aspect, this application provides a terminal device, including a unit or a means (means) configured to perform the steps of any method according to the foregoing fifteenth aspect.

According to a twentieth aspect, this application provides a communication apparatus. The communication apparatus may be a terminal device, may be an apparatus in the terminal device, or exists in a product form of a chip. The communication apparatus includes a processor. The processor is connected to a memory. The memory stores computer program instructions. The processor executes the computer program instructions stored in the memory, to implement the method according to any one of the fifteenth aspect or the implementations of the fifteenth aspect. The memory and the processor may be integrated together, or may be independent devices. If the memory and the processor are the independent devices, the memory may be located inside the communication apparatus, or may be located outside the communication apparatus.

In a possible implementation, the processor includes a logic circuit and an input interface and/or an output interface. The output interface is configured to perform a sending action in a corresponding method, and the input interface is configured to perform a receiving action in the corresponding method.

In a possible implementation, the communication apparatus further includes a communication interface and a communication bus. The processor, the memory, and the communication interface are connected by using the communication bus. The communication interface is configured to perform sending and receiving actions in the corresponding method. The communication interface may also be referred to as a transceiver. Optionally, the communication interface includes a transmitter or a receiver. In this case, the transmitter is configured to perform a sending action in a corresponding method, and the receiver is configured to perform a receiving action in the corresponding method.

According to a twenty-first aspect, this application provides a terminal device, including at least one processing element or chip configured to perform any method according to the fifteenth aspect.

According to a twenty-second aspect, this application provides a program product, including computer program instructions. When executed by a computer, the computer program instructions are used to perform any method according to the fifteenth aspect.

According to a twenty-third aspect, this application provides a computer-readable storage medium, including the program in the twenty-second aspect.

According to a twenty-fourth aspect, this application provides a network device, including a unit or a means (means) configured to perform the steps of any method according to the foregoing sixteenth aspect.

According to a twenty-fifth aspect, this application provides a communication apparatus. The communication apparatus may be a network device, may be an apparatus in the network device, or exist in a product form of a chip. The communication apparatus includes a processor. The processor is connected to a memory. The memory stores computer program instructions. The processor executes the computer program instructions stored in the memory, to implement the method according to any one of the sixteenth aspect or the implementations of the sixteenth aspect. The memory and the processor may be integrated together, or may be independent devices. If the memory and the processor are the independent devices, the memory may be located inside the communication apparatus, or may be located outside the communication apparatus.

In a possible implementation, the processor includes a logic circuit and an input interface and/or an output interface. The output interface is configured to perform a sending action in a corresponding method, and the input interface is configured to perform a receiving action in the corresponding method.

In a possible implementation, the communication apparatus further includes a communication interface and a communication bus. The processor, the memory, and the communication interface are connected by using the communication bus. The communication interface is configured to perform sending and receiving actions in the corresponding method. The communication interface may also be referred to as a transceiver. Optionally, the communication interface includes a transmitter or a receiver. In this case, the transmitter is configured to perform a sending action in a corresponding method, and the receiver is configured to perform a receiving action in the corresponding method.

According to a twenty-sixth aspect, this application provides a network device, including at least one processing element or chip configured to perform any method according to the sixteenth aspect.

According to a twenty-seventh aspect, this application provides a program product, including computer program instructions. When executed by a computer, the computer program instructions are used to perform any method according to the sixteenth aspect.

According to a twenty-eighth aspect, this application provides a computer-readable storage medium, including the program in the twenty-seventh aspect.

According to a twenty-ninth aspect, this application provides a communication system, including the terminal device according to any one of the foregoing aspects and the network device according to any one of the foregoing aspects.

BRIEF DESCRIPTION OF DRAWINGS

FIG. 8 is a schematic diagram 8 of an application scenario according to an embodiment of this application;

FIG. 9 is a schematic flowchart of a communication processing method according to an embodiment of this application;

FIG. 14 is a schematic flowchart of yet another communication processing method according to an embodiment of this application;

FIG. 15 is a signaling diagram of yet another communication processing method according to an embodiment of this application;

FIG. 16 is a schematic flowchart of still yet another communication processing method according to an embodiment of this application;

FIG. 17 is a signaling diagram of still yet another communication processing method according to an embodiment of this application;

FIG. 18a is a schematic flowchart of a further communication processing method according to an embodiment of this application;

DESCRIPTION OF EMBODIMENTS

Figure 1:
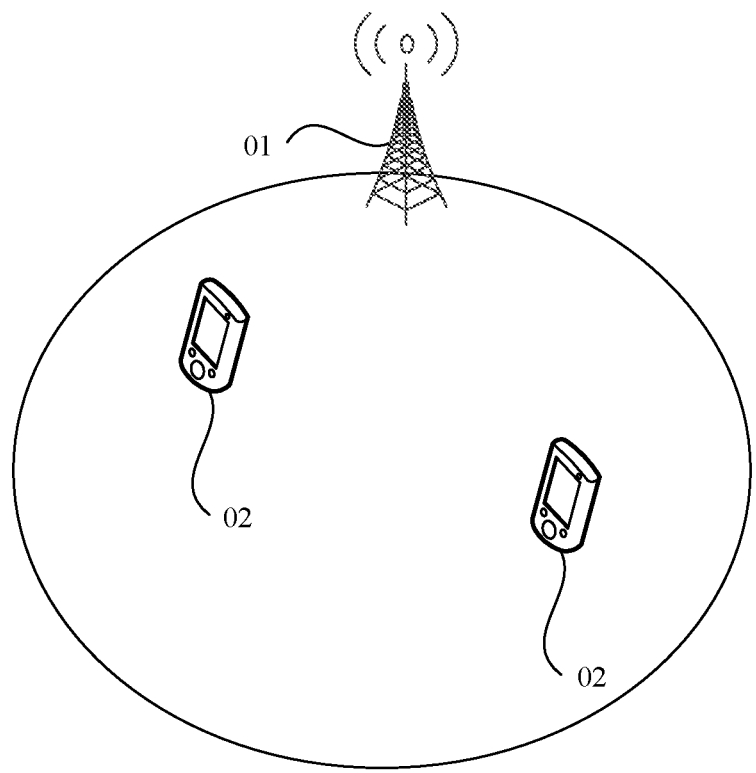
FIG. 1 is a schematic diagram 1 of an application scenario according to an embodiment of this application.

Embodiments of this application are applied to a fifth-generation mobile communication network (5th-generation, 5G) communication system or another system that may appear in the future, or may be applied to another communication system such as a wireless local area network (wireless local area network, WLAN) communication system, a global system for mobile communication (global system of mobile communication, GSM) system, a code division multiple access (code division multiple access, CDMA) system, a wideband code division multiple access (wideband code division multiple access, WCDMA) system, a general packet radio service (general packet radio service, GPRS), a long term evolution (long term evolution, LTE) system, an LTE frequency division duplex (frequency division duplex, FDD) system, an LTE time division duplex (time division duplex, TDD) system, a universal mobile telecommunication system (universal mobile telecommunication system, UMTS) system, or a worldwide interoperability for microwave access (worldwide interoperability for microwave access, WiMAX) communication system.

Some terms in this application are explained and described below, to facilitate understanding of the terms for a person skilled in the art. It should be noted that, when solutions in the embodiments of this application are applied to the 5G system, an existing system, or another system that may appear in the future, names of a network device and a terminal device may change, but this does not affect an implementation of the solutions in the embodiments of this application.

(1) The terminal device is a device that provides voice and/or data connectivity for a user. The terminal device in this application mainly refers to but is not limited to a vehicle terminal, a vehicle-mounted terminal, a vehicle device, a mobile terminal, a common terminal, or the like. The vehicle-mounted terminal includes but is not limited to a vehicle-mounted navigator or the like, and the mobile terminal includes but is not limited to a mobile phone, a wearable device, a tablet computer, or the like.

(2) The network device, also referred to as a radio access network (radio access network, RAN) device, is a device for connecting the terminal device to a wireless network, and includes devices in various communication standards. For example, the network device includes but is not limited to a transmission reception point (transmission reception point, TRP), a base station (for example, a gNB), a radio network controller (radio network controller, RNC), a NodeB (NodeB, NB), a base station controller (base station controller, a BSC), a BTS (base transceiver station), an HeNB (home evolved NodeB) or an HNB (home NodeB), a baseband unit (baseband unit, BBU), and the like.

(3) Rate matching means that data transmission is not performed on some or all time-frequency resources on a data channel. The time-frequency resource is a resource used to transmit data. For example, the time-frequency resource is used to transmit a reference signal. The data channel is, for example, a physical downlink shared channel (physical downlink shared channel, PDSCH). Therefore, when transmitting data, the network device needs to skip the time-frequency resources on which rate matching is performed. To correctly decode or obtain the data on the data channel, the terminal device also needs to learn of the time-frequency resources on which rate matching is performed.

In some deployments, the gNB may include a centralized unit (centralized unit, CU for short) and a distributed unit (Distributed Unit, DU for short). The gNB may further include an active antenna unit (active antenna unit, AAU for short). The CU implements some functions of the gNB, and the DU implements some functions of the gNB. For example, the CU is responsible for processing a non-real-time protocol and service, and implements functions of a radio resource control (radio resource control, RRC for short) layer and a packet data convergence protocol (packet data convergence protocol, PDCP for short) layer. The DU is responsible for processing a physical layer protocol and a real-time service, and implements functions of a radio link control (radio link control, RLC for short) layer, a media access control (media access control, MAC for short) layer, and a physical (physical, PHY for short) layer. The AAU implements some physical layer processing functions, radio frequency processing, and a function related to an active antenna. Information at the RRC layer eventually becomes information at the PHY layer, or is converted from the information at the PHY layer. Therefore, in this architecture, higher layer signaling, for example, RRC layer signaling or PDCP layer signaling, may also be considered as being sent by the DU or sent by the DU and the AAU. It may be understood that a network device may be a device including one or more of a CU node, a DU node, and an AAU node. In addition, the CU may be classified as a network device in a RAN, or the CU may be classified as a network device in a core network (core network, CN for short). This is not limited herein.

(4) Uplink control information (uplink control information, UCI) may be transmitted by using an uplink control channel or an uplink data channel. The uplink control information may include at least one of the following: hybrid automatic repeat request-acknowledgment (hybrid automatic repeat request-acknowledgement, HAQR-ACK) information, scheduling request (scheduling request, SR) information, and channel state information (channel state information, CSI). A bit of the UCI may include at least one of the following: a HARQK-ACK information bit, an SR bit, and a CSI bit.

(5) The CSI may include at least one of the following: a channel quality indicator (channel quality indicator, CQI), a precoding matrix indicator (precoding matrix indicator, PMI), a CSI-RS resource indicator (CSI-RS resource indicator), a synchronization signal/physical broadcast channel block resource indicator (SS/PBCH block resource indicator, SSBRD, layer indicator (layer indicator, LI) information, a rank indicator (rank indicator, RI), and reference signal received power (reference signal received power, RSRP) information. RSRP includes L1-RSRP that refers to RSRP of a layer 1.

(6) A synchronization signal block (SSB) may include one or more of a primary synchronization signal (primary synchronization signal, PSS), a secondary synchronization signal (Secondary synchronization signal, SSS), and a physical broadcast channel (physical broadcast channel, PBCH). Therefore, the SSB may also be referred to as an SS/PBCH block, and the signals and the channel occupy some physical resources.

(7) "A plurality of" means two or more, and another quantifier is similar to this. The term "and/or" describes an association relationship between associated objects and represents that three relationships may exist. For example, A and/or B may represent the following three cases: Only A exists, both A and B exist, and only B exists. The character "/" generally indicates an "or" relationship between the associated objects.

(8) "Correspondence" may refer to an association relationship or a binding relationship, and that A corresponds to B refers to an association relationship or a binding relationship between A and B.

It should be noted that the nouns or terms in the embodiments of this application may be mutually referenced. Details are not described again.

In addition, a communication process in this application may occur between the network device and the terminal device, or may occur between terminal devices. A scenario between the terminal devices is, for example, a (device-to-device, D2D) scenario.

FIG. 1 is a schematic diagram 1 of an application scenario according to an embodiment of this application. A networking architecture shown in FIG. 1 mainly includes a network device 01 and terminal devices 02. The network device 01 communicates with the terminal devices 02.

With development of communication technologies, in a communication system, cells in a network are adjacent to each other, and a plurality of cells may be deployed in a same frequency band, so that the cells are deployed in an intra-frequency manner. In such a deployment manner, spectrum utilization can be improved. However, in the foregoing deployment manner, a terminal device receives signals from a plurality of cells. Therefore, when the terminal device is located at an edge of a cell, the terminal device may be interfered with by a signal from a neighboring cell of the current cell. Consequently, a signal sending and receiving capability of the terminal device is relatively poor, and a channel state of the terminal device is relatively poor.

To resolve the foregoing signal interference problem, a coordinated multipoint transmission/reception technology is provided. In the coordinated multipoint transmission/reception technology, a plurality of network devices may exchange information to complete coordination, the signal interference problem for the terminal device can be effectively avoided, and a data transmission rate of the terminal device can be improved. There is only a coordination process of the coordinated multipoint transmission/reception technology. For example, a plurality of TRPs may provide a downlink service for the terminal device through coordination, or the plurality of TRPs may receive an uplink signal of the terminal device through coordination.

The coordinated multipoint transmission/reception technology includes but is not limited to the following technologies: a joint transmission (joint transmission, JT) technology, a dynamic point/cell selection (dynamic cell/point selection, DCS/DPS) technology, and a coordinated interference/scheduling (coordinated beamforming/scheduling, CB/CS) technology.

Figure 2:
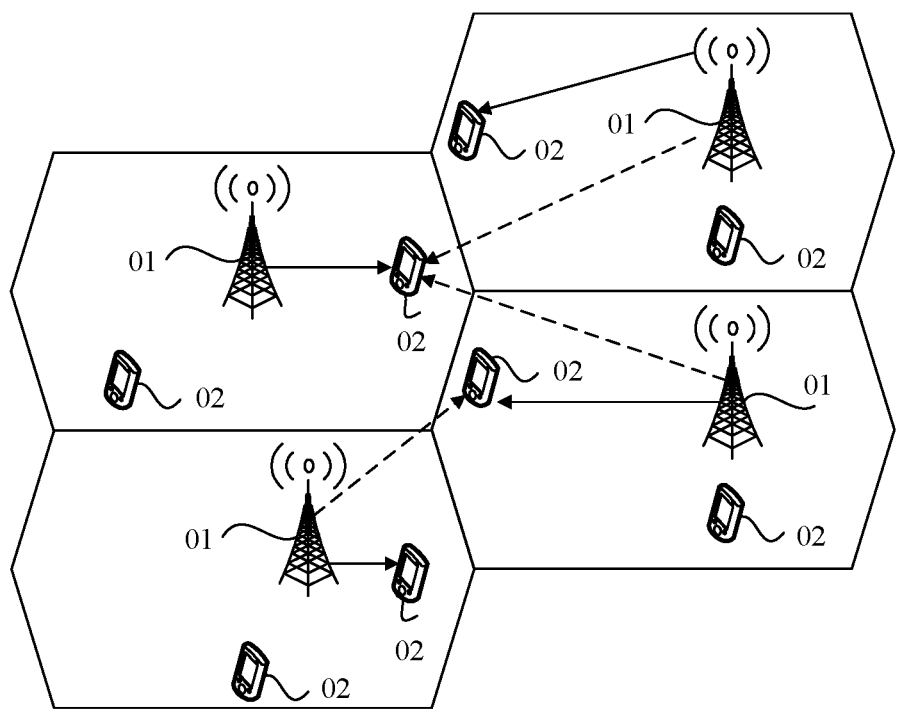
FIG. 2 is a schematic diagram 2 of an application scenario according to an embodiment of this application.
Figure 3:
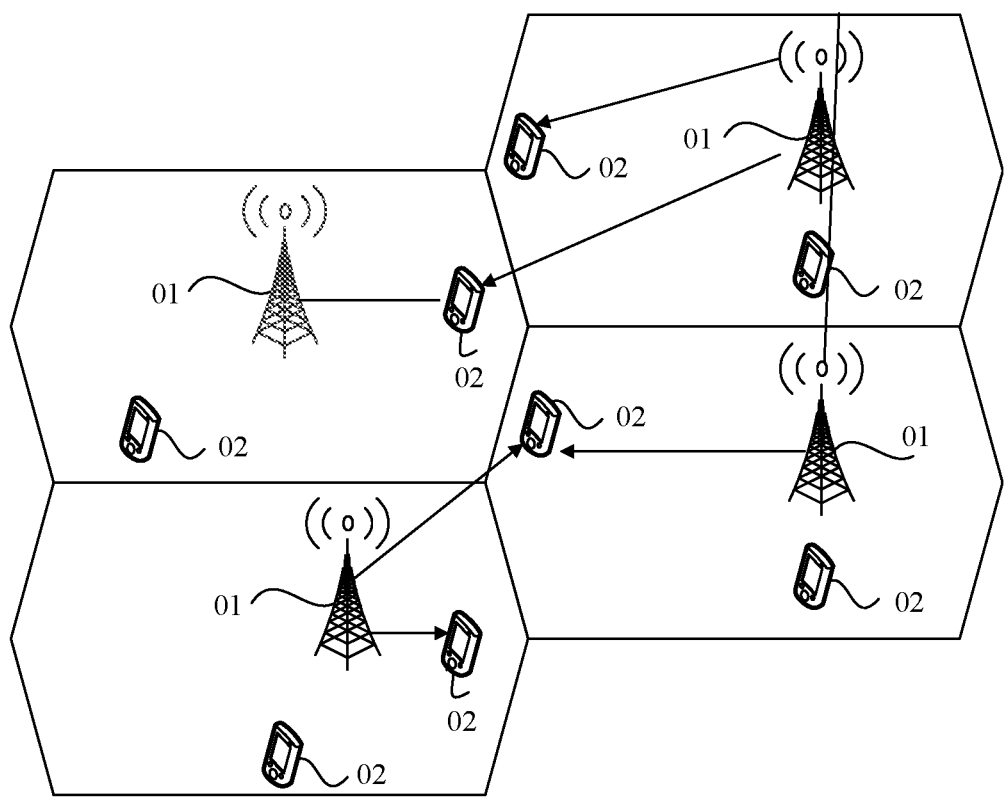
FIG. 3 is a schematic diagram 3 of an application scenario according to an embodiment of this application.
Figure 4:
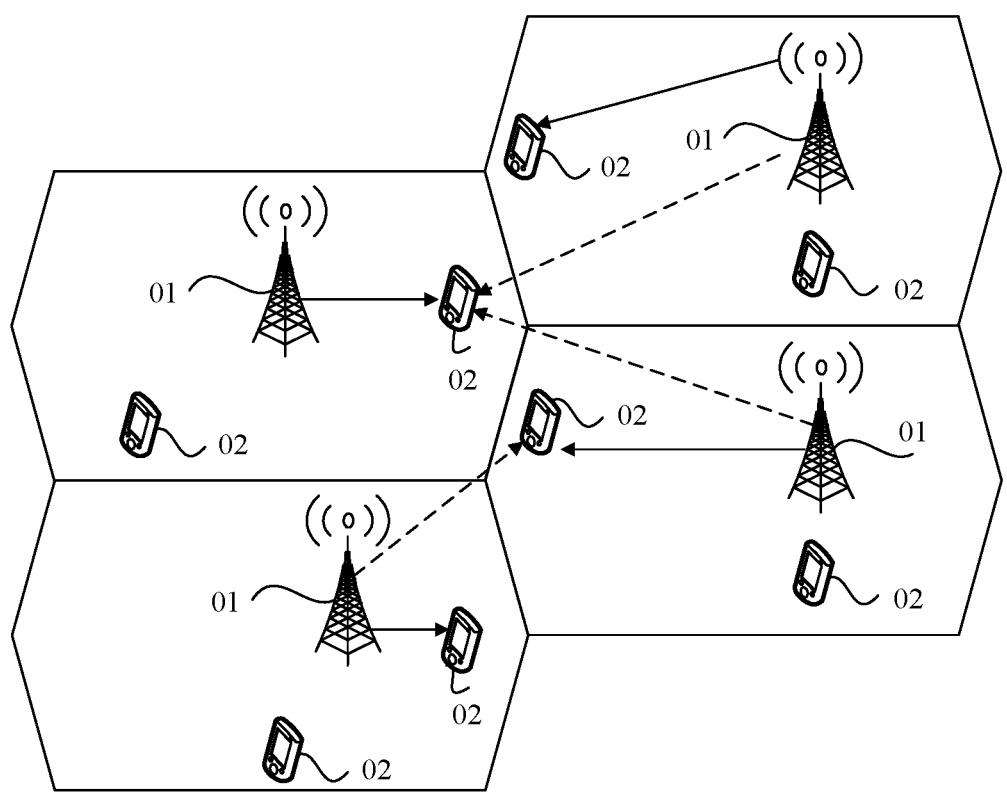
FIG. 4 is a schematic diagram 4 of an application scenario according to an embodiment of this application.
Figure 5:
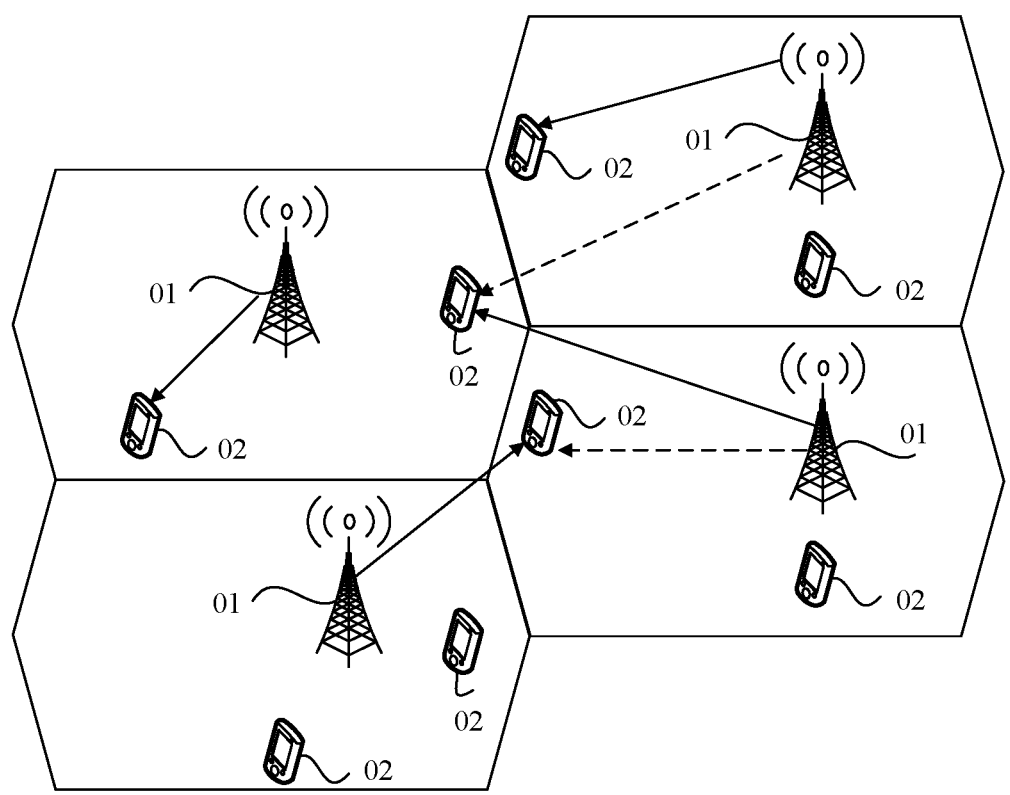
FIG. 5 is a schematic diagram 5 of an application scenario according to an embodiment of this application.

FIG. 2 is a schematic diagram 2 of an application scenario according to an embodiment of this application. FIG. 3 is a schematic diagram 3 of an application scenario according to an embodiment of this application. FIG. 4 is a schematic diagram 4 of an application scenario according to an embodiment of this application. FIG. 5 is a schematic diagram 5 of an application scenario according to an embodiment of this application. A networking architecture shown in each of FIG. 2 to FIG. 5 mainly includes a plurality of network devices 01 and a plurality of terminal devices 02. Each block in FIG. 2 to FIG. 5 represents one cell, each cell corresponds to one network device 01, and there is at least one terminal device 02 in each cell. In FIG. 2 to FIG. 5, a dashed line represents that a network device 01 causes signal interference to a terminal device 02 at a cell edge; a solid line represents that normal communication and data exchange are performed between a network device 01 and a terminal device 02, that is, the network device 01 may send useful data to the terminal device 02.

FIG. 2 shows a communication status between the plurality of network devices 01 and the plurality of terminal devices 02 in a non-coordinated scenario. In this way, in FIG. 2, it can be learned that, when receiving a signal of a network device 01 in a current cell, the terminal device 02 at the cell edge is interfered with by a signal from a neighboring cell.

FIG. 3 shows a communication status between the plurality of network devices 01 and the plurality of terminal devices 02 in a JT technology. In this way, in FIG. 3, it can be learned that network devices 01 corresponding to a plurality of cells jointly send data to a same terminal device 02, and then the same terminal device 02 receives a plurality of pieces of data, thereby improving a data rate and efficiency.

FIG. 4 shows a communication status between the plurality of network devices 01 and the plurality of terminal devices 02 in a CB/CS technology. Interference from a neighboring cell is coordinated. For example, a network device 01 in a neighboring cell may adjust a to-be-sent signal, to avoid sending the signal to a terminal device 02 in a strong interference direction, thereby reducing interference to the terminal device 02.

FIG. 5 shows a communication status between the plurality of network devices 01 and the plurality of terminal devices 02 in a DCS/DPS technology. A network may dynamically select a better network device 01 to serve a terminal device 02. In such a processing manner, the terminal device 02 can have a stronger cell signal. Then a cell with a higher signal to interference plus noise ratio is selected based on a difference between channels of a plurality of TRPs, to transmit data to the terminal, so that a signal signal-to-noise ratio of the terminal device 02 can be improved.

Figure 6:
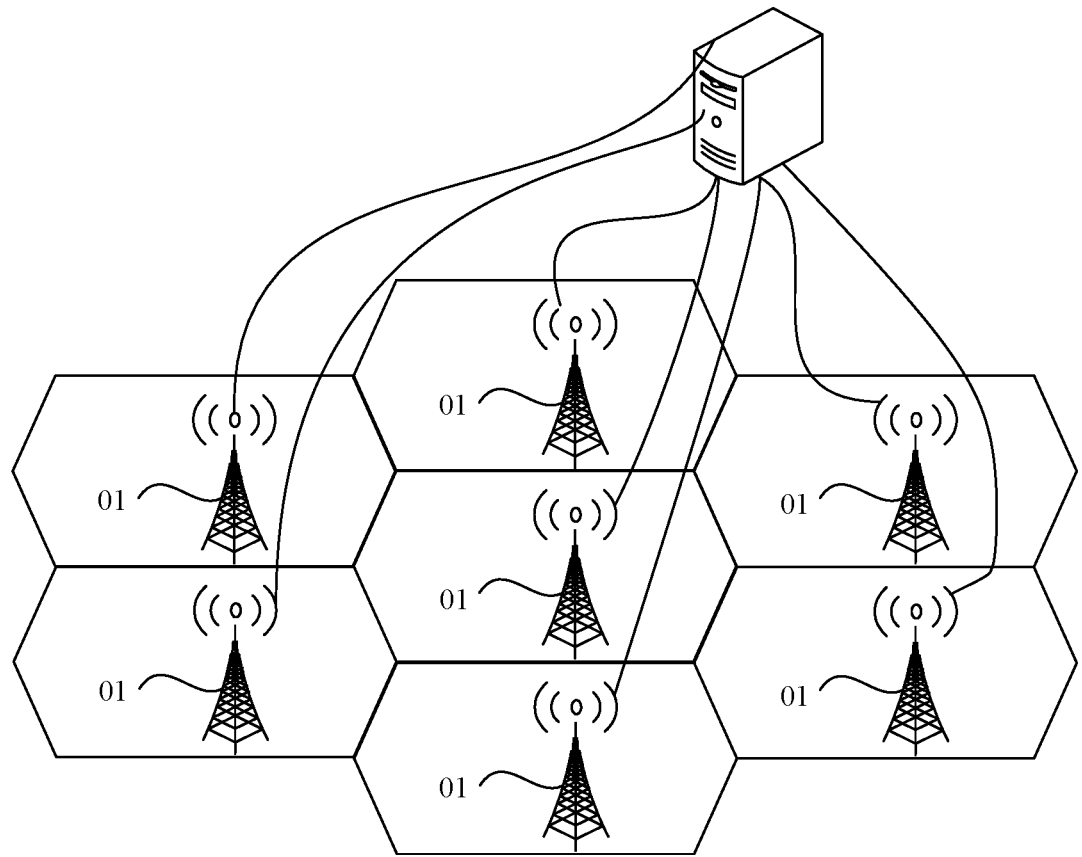
FIG. 6 is a schematic diagram 6 of an application scenario according to an embodiment of this application.

FIG. 6 is a schematic diagram 6 of an application scenario according to an embodiment of this application. As shown in FIG. 6, a plurality of network devices may be deployed on different transmission reception points. For example, the network devices are the TRPs. Physically, the plurality of network devices may be a group of antennas. An architecture of each of the plurality of network devices may be a baseband processing unit of a base station. The baseband processing unit is located at a geographical location. One network device connects one radio frequency processing unit to one geographical location. Further, the plurality of network devices connect a plurality of radio frequency processing units to a plurality of geographical locations. It can be learned that there is one group of antennas at each of the plurality of geographical locations. A distance between the baseband processing unit and the radio frequency processing unit may be hundreds of meters, and the baseband processing unit and the radio frequency processing unit may be connected by using an optical fiber, so that a time length of transmission between the baseband processing unit and the radio frequency processing unit is relatively short and a capacity of transmission between the baseband processing unit and the radio frequency processing unit is relatively large. After processing baseband signals, for example, after generating control channel signals, the baseband processing unit transmits the baseband signals to the plurality of network devices, and the plurality of network devices separately send data by using respective physical downlink control channels (physical downlink control channel, PDCCH).

For example, when the network devices are the TRPs, the plurality of TRPs may belong to different base stations, and a delay of information exchange between the plurality of TPRs is relatively long, and a capacity of information exchange between the plurality of TPRs is limited. A baseband processing unit of each base station generates a resource on a PDCCH, and then the plurality of TRPs separately send data by using resources on PDCCHs. In this way, the plurality of base stations can schedule data relatively independently with limited interaction.

A basic composition unit of the PDCCH is a control channel element (control channel element, CCE). One PDCCH occupies one or more CCEs. When the PDCCH occupies more CCE, reliability of the PDCCH is higher, but the PDCCH consumes more resources. When a terminal device-specific PDCCH occupies a part of CCEs, a PDCCH of another terminal device usually does not occupy the part of CCEs. That is, when a total quantity of resources is limited, a total quantity of scheduled PDCCHs that can be supported is limited.

One CCE includes six resource element groups (resource element group, REG), and a resource of one REG includes one resource block (resource block RB) in frequency domain and one OFDM symbol in time domain. There is a mapping relationship between the CCE and the REG. For example, a plurality of REGs including a plurality of RBs and a plurality of symbols may be mapped to the CCE based on some mapping relationships. In addition, the mapping may be direct mapping (for example, one CCE includes six consecutive REGs), interleaving mapping (the REGs are interleaved and then mapped to the CCE), or the like.

In addition, a quantity of CCEs included in a PDCCH may be referred to as a CCE aggregation level. For one terminal device, the terminal device may need to detect a possibility of a plurality of aggregation levels. In a specified resource range, the terminal device detects the PDCCH by using possible aggregation levels. For example, the terminal device detects, according to a rule by using an aggregation level 4, whether there is a PDCCH on a resource including four CCEs. In addition, the terminal device needs to determine whether the PDCCH can be correctly demodulated. In addition, the terminal device may further attempt other aggregation levels, and the possible aggregation levels are configured by the network device for the terminal device.

Figure 7:
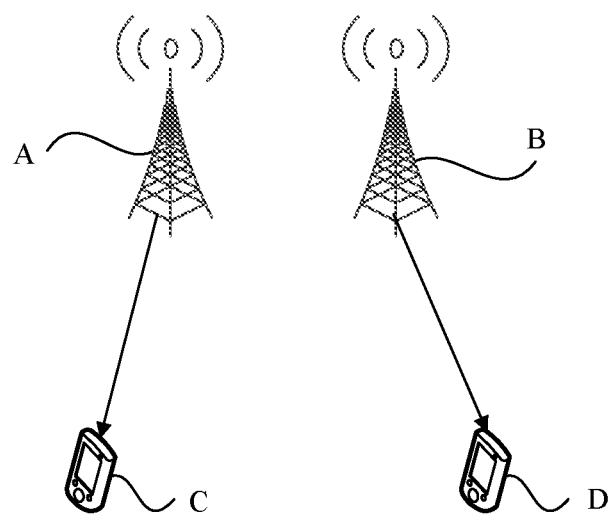
FIG. 7 is a schematic diagram 7 of an application scenario according to an embodiment of this application.

FIG. 7 is a schematic diagram 7 of an application scenario according to an embodiment of this application. As shown in FIG. 7, in a non-coordinated scenario, at an edge of neighboring areas or neighboring cells or in a same cell, there may be a plurality of networks. For example, there are both a long term evolution (long term evolution, LTE) network and a new radio access technology (new radio access technology, NR). As shown in FIG. 7, both a first network and a second network are deployed. A network device A and a network device B are covered by both the first network and the second network. However, the network device A uses the first network, and the network device B uses the second network. Then if frequency bands of the network device A and the network device B coincide, signal interference may occur. The network device A sends a cell-specific reference signal (cell-specific reference signal, CRS) to a terminal device C, and the network device B sends data to a terminal device by using a resource on a PDSCH. To ensure that a sending process of the network device A is not interfered with by a sending process of the network device B, the network device B needs to perform rate matching. For example, both the LTE network and the NR network are deployed, the network device A is a network device in the LTE network, and the network device B is a network device in the NR network. To ensure that signal interference does not occur, the network device B needs to perform rate matching on the CRS.

For example, a plurality of parameters may be used to indicate a location of a time-frequency resource on which rate matching is performed.

However, for a coordinated multipoint transmission/reception process, namely, a multi-site coordination scenario, no feasible implementation is provided yet to perform rate matching, and no feasible implementation is provided yet to enable a terminal device to determine time-frequency resource on which rate matching is performed. In multi-site coordination, in non-ideal backhaul (non-ideal backhaul), there is a delay during information transmission between two network devices, and real-time interaction cannot be performed. To be specific, at each moment, the network device A cannot learn whether the network device B sends data to the terminal device, and does not learn of a location of a time-frequency resource used by the network device B to send the data either.

FIG. 8 is a schematic diagram 8 of an application scenario according to an embodiment of this application. As shown in FIG. 8, in a multi-site coordination scenario, a network device A uses a first network, a network device B uses a second network, a network device F uses the second network, a network device G uses the first network, the network device A communicates with a terminal device C, the network device C and the network device F separately communicate with a terminal device D, and the network device G communicates with a terminal device E. The network device A and the network device G belong to different cells, and the network device B and the network device F need to perform rate matching processes. For example, the first network is an LTE network, and the second network is an NR network. The network device A sends a CRS 1 to the terminal device C, and the network device G sends a CRS 2 to the terminal device E. Locations of time-frequency resources occupied by the CRS 1 and the CRS 2 are different. The terminal device D needs to perform multi-site coordination transmission, that is, perform a transmission process of a coordinated multipoint transmission/reception technology. Therefore, the network device B that uses the NR network needs to perform rate matching on the CRS 1, and the network device F that uses the NR network needs to perform rate matching on the CRS 2. In this case, a manner needs to be provided so that the terminal device D can perform correct rate matching processing on both the CRS 1 and the CRS 2.

FIG. 9 is a schematic flowchart of a communication processing method according to an embodiment of this application. As shown in FIG. 9, the method includes the following step.

S101: Receive M groups of first parameters and N groups of second parameters that are sent by a network device, where the first parameter is a downlink parameter, the second parameter is a CRS rate matching parameter, M is a positive integer greater than or equal to 2, and N is a positive integer greater than or equal to 1.

There is an association relationship between P groups of first parameters in the M groups of first parameters and the N groups of second parameters, P is less than or equal to M, and P is a positive integer.

For example, this embodiment of this application may be performed by a terminal device, another network device, or another apparatus or device that can perform this embodiment of this application.

A first case is as follows: When step S101 is performed by the terminal device, the network device configures the M groups of first parameters and the N groups of second parameters for the terminal device, where the first parameter is the downlink parameter, and the second parameter is the CRS rate matching parameter. Then the network device sends the M groups of configured first parameters and the N groups of configured second parameters to the terminal device. In this way, the terminal device may receive the parameters sent by the network device. There is the association relationship between the P groups of first parameters in the M groups of first parameters and the N groups of second parameters. For example, the first parameters in the M groups of first parameters are separately associated with the N groups of second parameters, or some first parameters in the M groups of first parameters are separately associated with the N groups of second parameters.

A second case is as follows: When step S101 is performed by the another network device, the network device configures the M groups of first parameters and the N groups of second parameters for the another network device. Then the network device sends the M groups of configured first parameters and the N groups of configured second parameters to the another network device. Similarly, there is the association relationship between the P groups of first parameters in the M groups of first parameters and the N groups of second parameters. The network device and the another network device may use a same network or different networks.

A third case is as follows: When step S101 is performed by the terminal device, another terminal device configures the M groups of first parameters and the N groups of second parameters for the terminal device. Then the another terminal device sends the M groups of configured first parameters and the N groups of configured second parameters to the terminal device. In this case, the another terminal device serves as the network device. Similarly, there is the association relationship between the P groups of first parameters in the M groups of first parameters and the N groups of second parameters. The terminal device and the another terminal device may use a same network or different networks, and the terminal device and the another terminal device may be located in different cells or a same cell.

Figure 10:
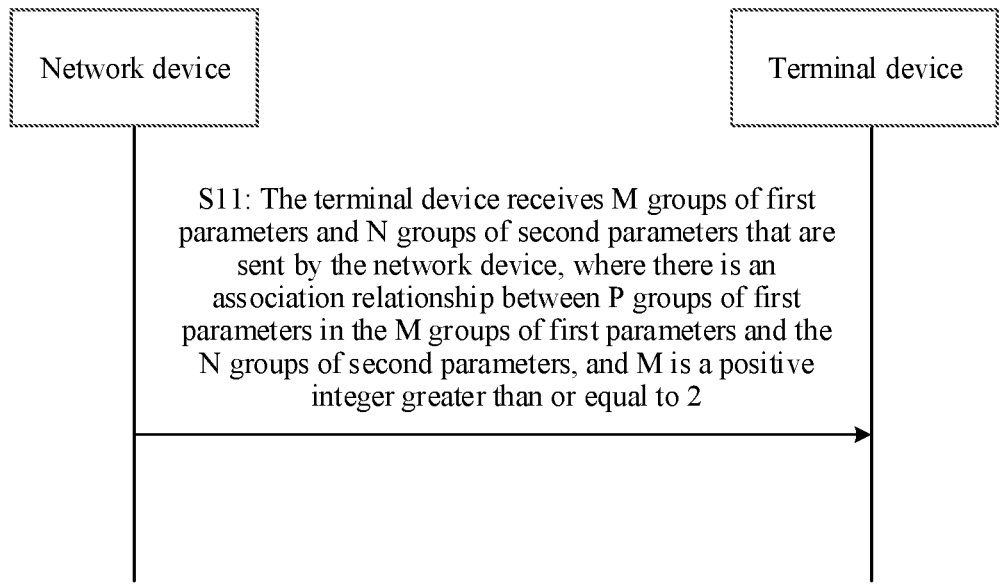
FIG. 10 is a signaling diagram of a communication processing method according to an embodiment of this application.

FIG. 10 is a signaling diagram of a communication processing method according to an embodiment of this application. As shown in FIG. 10, the method includes the following step.

S11: A terminal device receives M groups of first parameters and N groups of second parameters that are sent by a network device, where the first parameter is a downlink parameter, the second parameter is a CRS rate matching parameter, M is a positive integer greater than or equal to 2, and N is a positive integer greater than or equal to 1.

There is an association relationship between P groups of first parameters in the M groups of first parameters and the N groups of second parameters, P is less than or equal to M, and P is a positive integer.

For example, for the step in this embodiment of this application, refer to the first case of step S101 shown in FIG. 9. Details are not described again.

In this embodiment, the M groups of first parameters and the N groups of second parameters that are sent by the network device are received, where the first parameter is the downlink parameter, the second parameter is the CRS rate matching parameter, M is a positive integer greater than or equal to 2, and N is a positive integer greater than or equal to 1. There is the association relationship between the P groups of first parameters in the M groups of first parameters and the N groups of second parameters, P is less than or equal to M, and P is a positive integer. In this way, the network device delivers the first parameters and the at least one group of second parameters, and there is the association relationship between the first parameters and the second parameters. Further, the terminal device or another network device may receive the plurality of groups of first parameters and the at least one group of second parameters that have the association relationship. Then the terminal device or the another network device can obtain data based on the plurality of groups of first parameters and the at least one group of second parameters that have the association relationship. For example, the terminal device determines a time-frequency resource based on the parameters, or the terminal device obtains downlink data based on the parameters. The foregoing data includes but is not limited to the following content: a codeword, a transport block, a code block (code block), and a code block group (code block group). Therefore, in a coordinated multipoint transmission/reception process, network devices participating in coordination may separately perform rate matching on time-frequency resources based on respective CRS rate matching parameters associated with downlink parameters. Terminal devices may determine, based on CRS rate matching parameters determined by the terminal devices, time-frequency resources on which rate matching is performed (namely, locations of punctured time-frequency resources in time-frequency resources associated with a PDSCH), to obtain downlink data. In this way, in a multi-site coordination scenario, CRS rate matching processes are implemented, to ensure that the terminal devices are not interfered with by a signal from another cell, and can correctly exchange data with the network devices.

Puncturing in this application means that sending no data at a location of a time-frequency resource, thereby completing rate matching.

There are the following several implementations of how to set an association relationship between first parameters and second parameters.

Figure 11:
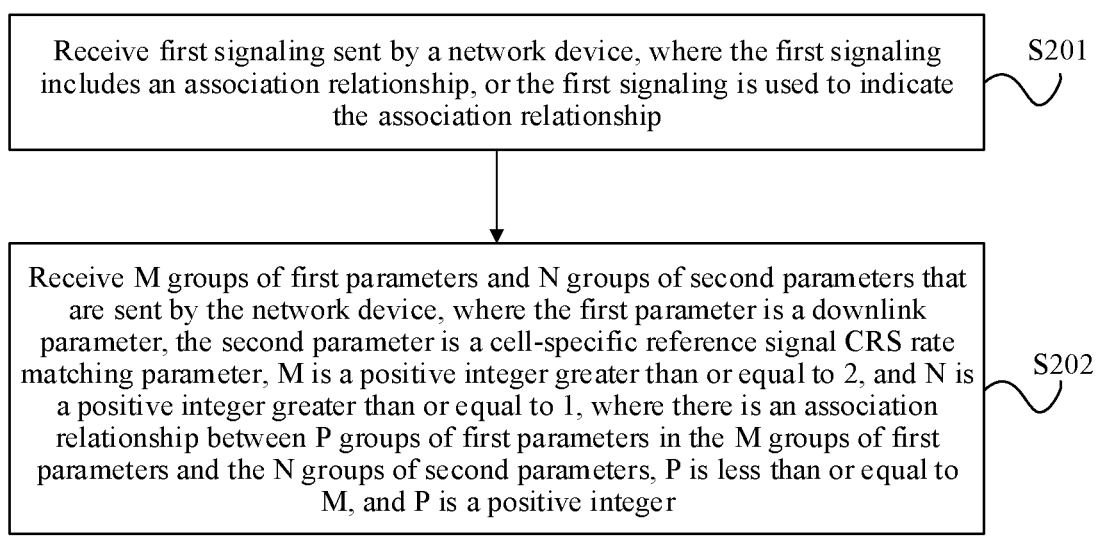
FIG. 11 is a schematic flowchart of another communication processing method according to an embodiment of this application.

A first implementation of setting the association relationship between the first parameters and the second parameters is as follows. FIG. 11 is a schematic flowchart of another communication processing method according to an embodiment of this application. As shown in FIG. 11, the method includes the following steps.

S201: Receive first signaling sent by a network device, where the first signaling includes the association relationship, or the first signaling is used to indicate the association relationship.

For example, an association relationship between P groups of first parameters and N groups of second parameters needs to be sent to a device that receives a parameter. The network device delivers the first signaling, where the first signaling carries the association relationship. Alternatively, the network device delivers the first signaling, where the first signaling is used to indicate or associate the foregoing association relationship. In a specific method for indicating the association relationship, a CRS rate matching parameter may include a field that indicates an identifier (ID) of an associated first parameter and may indicate an ID of one or more first parameters, and IDs, included in different CRS rate matching parameters, of first parameters may be the same or may be different. Alternatively, the first parameter may include a field that indicates an ID of the associated CRS rate matching parameter and that may indicate one or more IDs, and IDs, included in different first parameters, of CRS rate matching parameters may be the same or may be different.

A first case is as follows: When step S201 is performed by a terminal device, the network device adds the association relationship to the first signaling, and then the network device sends the first signaling that carries the association relationship to the terminal device; or the network device sends the first signaling to the terminal device, where the first signaling indicates the association relationship. Then the terminal device obtains the association relationship, and may further determine first parameters and second parameters that are associated with each other.

A second case is as follows: When step S201 is performed by another network device, the network device adds the association relationship to the first signaling, and then the network device sends the first signaling that carries the association relationship to the another network device; or the network device sends the first signaling to the another network device, where the first signaling indicates the association relationship. Then the another network device obtains the association relationship, and may further determine first parameters and second parameters that are associated with each other. The network device and the another network device may use a same network or different networks.

A third case is as follows: When step S201 is performed by a terminal device, another terminal device adds the association relationship to the first signaling, and then the another terminal device sends the first signaling that carries the association relationship to the terminal device, or the another terminal device sends the first signaling to the terminal device, where the first signaling indicates the association relationship. In this case, the another terminal device is the network device that sends the parameters. Then the terminal device obtains the association relationship, and may further determine first parameters and second parameters that are associated with each other. The terminal device and the another terminal device may use a same network or different networks, and the terminal device and the another terminal device may be located in different cells or a same cell.

Optionally, the first signaling is one or more of the following: radio resource control (radio resource control, RRC) signaling, media access control-control element (medium access control-control element, MAC-CE) signaling, downlink control information (downlink control information, DCI) signaling, and the like. That is, a form of the first signaling used to carry the association relationship or used to indicate the association relationship is not limited.

It should be noted that a sequence of S201 and the following S202 is not limited. In addition, S201 and S202 may be performed simultaneously.

S202: Receive M groups of first parameters and N groups of second parameters that are sent by the network device, where the first parameter is a downlink parameter, the second parameter is a CRS rate matching parameter, M is a positive integer greater than or equal to 2, and N is a positive integer greater than or equal to 1.

There is the association relationship between P groups of first parameters in the M groups of first parameters and the N groups of second parameters, P is less than or equal to M, and P is a positive integer.

Optionally, there are the following several implementations of a specific correspondence status of the foregoing association relationship between the first parameters and the second parameters.

In a first implementation, when M is equal to N, each group of first parameters is associated in a one-to-one correspondence with each group of second parameters.

In a second implementation, when M is greater than N, at least two groups of first parameters are associated with a same group of second parameters.

In a third implementation, some first parameters are not associated with a second parameter.

In the third implementation, each first parameter is associated with one or more second parameters.

In a fourth implementation, each second parameter is associated with one or more first parameters.

Optionally, the downlink parameter is a downlink control resource parameter or a downlink data parameter. Optionally, the downlink parameter may alternatively be a downlink control resource parameter and a downlink data parameter.

Optionally, the P groups of first parameters and the N groups of second parameters are used to determine a PDSCH time-frequency resource on which CRS rate matching is performed.

Based on the first parameters and the second parameters, it may be determined that a PDSCH time-frequency resource associated with (including directly indicating a PDSCH time-frequency resource or indirectly used to determine the PDSCH time-frequency resource) the first parameters is a time-frequency resource on which no CRS rate matching is performed, and a CRS resource (which may be a time domain resource, a frequency domain resource, or a time domain and frequency domain resource) indicated by the second parameters is a resource punctured for rate matching. A resource at a location of the CRS resource is punctured on the PDSCH time-frequency resource, to obtain the PDSCH time-frequency resource on which CRS rate matching is performed. It should be noted that, in this application, only CRS rate matching is described, but it is not limited that rate matching processing is performed only on the CRS resource on the PDSCH time-frequency resource, and other rate matching may be performed before or after CRS rate matching, or other rate matching and CRS rate matching may be performed simultaneously. A remaining PDSCH time-frequency resource that is not punctured for rate matching after all rate matching is performed is a time-frequency resource actually used for data transmission. Optionally, the PDSCH time-frequency resource on which CRS rate matching is performed is a remaining PDSCH time-frequency resource in a configured PDSCH time-frequency resource except the resource overlapping the CRS resource indicated by the second parameter. The first parameter is the downlink control resource parameter, and the configured PDSCH time-frequency resource is a PDSCH time-frequency resource scheduled by DCI transmitted on a PDCCH indicated by the downlink control resource parameter.

Optionally, the PDSCH time-frequency resource on which CRS rate matching is performed is a remaining PDSCH time-frequency resource in a configured PDSCH time-frequency resource except the resource overlapping the CRS resource indicated by the second parameter. The first parameter is the downlink data parameter, and the configured PDSCH time-frequency resource is a time-frequency resource corresponding to a PDSCH associated with (including directly indicating or indirectly indicating a time-frequency resource corresponding to a PDSCH or determining, through processing performed based on the downlink data parameter, a time-frequency resource corresponding to a PDSCH) the downlink data parameter.

For example, for this step, refer to step S101 shown in FIG. 9.

In addition, for example, the first implementation of the foregoing association relationship is described as follows.

The network device delivers the M groups of first parameters and the N groups of second parameters, where M is greater than or equal to 2, N is greater than or equal to 1, and a value of M is equal to a value of N. In this case, each group of first parameters is associated in a one-to-one correspondence with each group of second parameters. In the specific method for indicating the association relationship, the CRS rate matching parameter may include a field that indicates the ID of the associated first parameter and indicates an ID of one first parameter. Alternatively, the first parameter may include a field that indicates the ID of the associated CRS rate matching parameter and indicates an ID of one CRS rate matching parameter.

For example, the network device sends three groups of first parameters and three groups of second parameters to the terminal device, where a first group of first parameters is correspondingly associated with a first group of second parameters, a second group of first parameters is correspondingly associated with a second group of second parameters, and a third group of first parameters is correspondingly associated with a third group of second parameters.

In the first implementation, the network device sends the M groups of first parameters and the N groups of second parameters to the terminal device or the another network device. Then the terminal device or the another network device may perform a related processing process based on the first parameters and the second parameters associated with the first parameters. Optionally, the M groups of first parameters and the N groups of second parameters are used to determine the PDSCH time-frequency resource on which CRS rate matching is performed.

For example, in a multi-site coordination scenario, T network devices coordinate to provide downlink data for a terminal device, where T is a positive integer greater than or equal to 2. Each of the T network devices corresponds to another network device. The another network device uses a first network, and signal interference occurs between each of the T network devices and the another network device corresponding to each of the T network devices. The T network devices use a same second network, and all other network devices separately belong to different cells. In this case, each of the T network devices needs to perform a rate matching process. Optionally, the first network is an LTE network, and the second network is an NR network.

In this case, the another network device or one of the T network devices sends the M groups of first parameters and the N groups of second parameters to the terminal device, where each group of first parameters corresponds one-to-one to each group of second parameters. Then each of the T network devices participating in coordination sends DCI to the terminal device by using a respective PDCCH, and each network device sends the DCI by using one group of resources, where the group of resources is indicated by the first parameter. The DCI is used to indicate a PDSCH. In addition, each of the T network devices participating in coordination performs CRS rate matching on a PDSCH time-frequency resource based on the second parameter associated with the respective first parameter. That is, data transmission is not performed at locations corresponding to the time-frequency resources on which rate matching is performed. Then each of the T network devices participating in coordination sends downlink data to the terminal device by using the respective PDSCH.

Then for each of the T network devices, the terminal device may receive the DCI sent by the network device. Then the terminal device detects the DCI based on each group of first parameters, and further determines the first parameters for detecting the resources on which the DCI is located. The terminal device may determine, based on the association relationship, a group of second parameters corresponding to the group of first parameters. Then because the DCI indicates the PDSCH, the terminal device performs, based on the group of second parameters, CRS rate matching on a PDSCH time-frequency resource indicated by the DCI, so that the terminal device obtains downlink data on the PDSCH.

For example, in a scenario shown in FIG. 8, when two network devices coordinate, both a network device B and a network device F use an NR network, the network device B and a network device A are located in a same cell, the network device F and a network device G are located in a same cell, and both the network device A and the network device G use an LTE network. It can be learned that the network device A and the network device G belong to different cells, and the network device B and the network device F belong to different cells. Another network device, the network device B, or the network device F sends two groups of first parameters and two groups of second parameters to a terminal device D, where each group of first parameters corresponds one-to-one to each group of second parameters. Then the network device B and the network device F separately send DCI to the terminal device D by using respective PDCCHs. In addition, the network device B sends the DCI by using one group of downlink control resources, and the network device F sends the DCI by using another group of downlink control resources. DCI is used to indicate a PDSCH. The network device B performs CRS rate matching on a PDSCH time-frequency resource based on a first group of second parameters associated with a first group of first parameters, where the first group of first parameters is associated with the group of downlink control resources. The network device F performs CRS rate matching on a PDSCH time-frequency resource based on a second group of second parameters associated with a second group of first parameters, where the second group of first parameters is associated with the another group of downlink control resources. Then the network device B and the network device F separately send downlink data to the terminal device D. Then the terminal device D may receive the DCI sent by the network device B. The terminal device D may detect the first group of first parameters of the resources corresponding to the DCI. The terminal device may determine, based on the association relationship, the first group of second parameters corresponding to the first group of first parameters. Then because the DCI indicates a PDSCH, the terminal device D performs, based on the first group of second parameters, CRS rate matching on a PDSCH time-frequency resource indicated by the DCI, so that the terminal device D obtains downlink data of the network device B on the PDSCH. The terminal device D may receive the DCI sent by the network device F. The terminal device D may detect the second group of first parameters of the resources corresponding to the DCI. The terminal device D may determine, based on the association relationship, the second group of second parameters corresponding to the second group of first parameters. Then because the DCI indicates a PDSCH, the terminal device D performs, based on the second group of second parameters, CRS rate matching on a PDSCH time-frequency resource indicated by the DCI, so that the terminal device D obtains downlink data of the network device F on the PDSCH. In the foregoing process, the PDSCH corresponding to the network device B and the PDSCH corresponding to the network device F require CRS resource locations at which rate matching is performed to be different.

The second implementation of the foregoing association relationship is described as follows.

The network device delivers the M groups of first parameters and the N groups of second parameters, where M is greater than or equal to 2, N is greater than or equal to 1, and a value of M is greater than a value of N. In this case, the at least two groups of first parameters are associated with the same group of second parameters. A specific configuration manner may be that IDs of the associated second parameters are indicated in the first parameters, or IDs of the associated first parameters are indicated in the second parameters. For example, IDs of a plurality of associated first parameters are indicated in second parameters.

For example, the network device sends three groups of first parameters and two groups of second parameters to the terminal device, where a first group of first parameters is correspondingly associated with a first group of second parameters, a second group of first parameters is correspondingly associated with the first group of second parameters, and a third group of first parameters is correspondingly associated with a second group of second parameters.

For another example, the network device sends two groups of first parameters and one group of second parameters to the terminal device, where a first group of first parameters is correspondingly associated with the group of second parameters, and a second group of first parameters is correspondingly associated with the group of second parameters.

In the second implementation, the network device sends the M groups of first parameters and the N groups of second parameters to the terminal device or the another network device, where M is greater than N. Then the terminal device or the another network device may perform a related processing process based on a required first parameter and a second parameter associated with the first parameter. Optionally, the M groups of first parameters and the N groups of second parameters are used to determine a PDSCH time-frequency resource on which CRS rate matching is performed.

For example, in a multi-site coordination scenario, T network devices coordinate to provide downlink data for a terminal device, where T is a positive integer greater than or equal to 2. Each of the T network devices corresponds to another network device. The another network device uses a first network, and signal interference occurs between each of the T network devices and the another network device corresponding to each of the T network devices. The T network devices use a same second network, and all other network devices separately belong to different cells. In this case, each of the T network devices needs to perform a rate matching process. Optionally, the first network is an LTE network, and the second network is an NR network.

In this case, the another network device or one of the T network devices sends the M groups of first parameters and the N groups of second parameters to the terminal device, where two groups of first parameters are associated with a same group of second parameters. Then each of the T network devices participating in coordination sends DCI to the terminal device by using a respective PDCCH, and each network device sends the DCI by using one group of resources. The DCI is used to indicate a PDSCH. In addition, each of the T network devices participating in coordination performs CRS rate matching on a PDSCH time-frequency resource based on the second parameter associated with the respective first parameter. That is, data transmission is not performed at locations corresponding to the time-frequency resources on which rate matching is performed. Then each of the T network devices participating in coordination sends downlink data to the terminal device by using the respective PDSCH. It can be learned that, in the foregoing process, second parameters used by at least two network devices are the same.

Then for each of the T network devices, the terminal device obtains the downlink data through the process in the first implementation.

For example, similarly, in a scenario shown in FIG. 8, another network device, a network device B, or a network device F sends two groups of first parameters and one group of second parameters to a terminal device D. The two groups of first parameters are associated with the group of second parameters. That is, a first group of first parameters is associated with the group of second parameters, and a second group of first parameters is associated with the group of second parameters. Similarly, the network device B and the network device F separately send DCI to the terminal device D by using respective PDCCHs. In addition, the network device B sends the DCI by using one group of resources, and the network device F sends the DCI by using another group of resources. DCI is used to indicate a PDSCH. The network device B performs CRS rate matching on a PDSCH time-frequency resource based on the second parameters associated with the first group of first parameters, where the first group of first parameters is associated with the group of resources. The network device F performs CRS rate matching on a PDSCH time-frequency resource based on the second parameters associated with the second group of first parameters, where the second group of first parameters is associated with the another group of resources. Then the network device B and the network device F separately send downlink data to the terminal device D. Then the terminal device D may receive the DCI sent by the network device B. The terminal device D may detect the first group of first parameters of the resources corresponding to the DCI. The terminal device may determine, based on the association relationship, the second parameters corresponding to the first group of first parameters. Then because the DCI indicates a PDSCH, the terminal device D performs, based on the second parameters, CRS rate matching on a PDSCH time-frequency resource indicated by the DCI, so that the terminal device D obtains downlink data of the network device B on the PDSCH. The terminal device D may receive the DCI sent by the network device F. The terminal device D may detect the first parameters of the resources corresponding to the DCI. The terminal device D may determine, based on the association relationship, the second parameters corresponding to the second group of first parameters. Then because the DCI indicates a PDSCH, the terminal device D performs, based on the second parameters, CRS rate matching on a PDSCH time-frequency resource indicated by the DCI, so that the terminal device D obtains downlink data of the network device F on the PDSCH. It can be learned that the second parameters corresponding to the first group of first parameters and the second parameters corresponding to the second group of first parameters are the same. In the foregoing process, the PDSCH corresponding to the network device B and the PDSCH corresponding to the network device F require CRS resource locations at which rate matching is performed to be the same.

The third implementation of the foregoing association relationship is described as follows.

The network device delivers the M groups of first parameters and the N groups of second parameters, where M is greater than or equal to 2, N is greater than or equal to 1, and a value of M is greater than a value of N. In this case, the P groups of first parameters in the M groups of first parameters are associated with the N groups of second parameters. In this case, a value of P may be less than M.

For example, the network device sends two groups of first parameters and one group of second parameters to the terminal device, where a first group of first parameters is correspondingly associated with the group of second parameters, and a second group of first parameters is not associated with the second parameters.

For another example, the network device sends three groups of first parameters and two groups of second parameters to the terminal device, where a first group of first parameters is correspondingly associated with a first group of second parameters, a second group of first parameters is correspondingly associated with the first group of second parameters, and a third group of first parameters is not associated with the second parameters.

In the third implementation, the network device sends the M groups of first parameters and the N groups of second parameters to the terminal device or the another network device, where M is greater than N. Then the terminal device or the another network device may perform a related processing process based on a required first parameter and a second parameter associated with the first parameter. Optionally, the P groups of first parameters in the M groups of first parameters and the N groups of second parameters are used to determine a PDSCH time-frequency resource on which CRS rate matching is performed. In this case, P is less than M.

For example, in a multi-site coordination scenario, T network devices coordinate to provide downlink data for a terminal device, where T is a positive integer greater than or equal to 2. Each of the T network devices corresponds to another network device. The another network device uses a first network, and signal interference occurs between each of the T network devices and the another network device corresponding to each of the T network devices. The T network devices use a same second network, and all other network devices separately belong to different cells. In this case, some of the T network devices need to perform rate matching processes. Optionally, a first network is an LTE network, and a second network is an NR network.

In this case, the another network device or one of the T network devices sends the M groups of first parameters and the N groups of second parameters to the terminal device. Then each of the T network devices participating in coordination sends DCI to the terminal device by using a respective PDCCH. In addition, some of the T network devices separately send DCI by using one group of resources. DCI is used to indicate a PDSCH. In addition, the foregoing some network devices perform CRS rate matching on PDSCH time-frequency resources based on second parameters associated with respective first parameters. That is, data transmission is not performed at locations corresponding to the time-frequency resources on which rate matching is performed. However, a remaining network device in the T network devices does not perform a CRS rate matching process. Then each of the T network devices participating in coordination sends downlink data to the terminal device by using a respective PDSCH.

Then for the some of the T network devices, the terminal device obtains the downlink data through the process in the first implementation. For the remaining network device in the T network devices, the terminal device directly obtains the downlink data, and the terminal device does not perform a rate matching process to obtain the downlink data.

For example, in a scenario shown in FIG. 8, a network device B causes signal interference to a network device A, but interference from a network device F to a network device G may be ignored. Another network device, the network device B, or the network device F sends two groups of first parameters and one group of second parameters to a terminal device D, where a first group of first parameters is associated with the group of second parameters, and a second group of first parameters is not associated with the second parameters. Similarly, the network device B and the network device F separately send DCI to the terminal device D by using respective PDCCHs. In addition, the network device B sends the DCI by using one group of resources, and the network device F sends the DCI by using another group of resources. DCI is used to indicate a PDSCH. The network device B performs CRS rate matching on a PDSCH time-frequency resource based on the second parameters associated with the first group of first parameters, where the first group of first parameters is associated with the group of resources. The network device F does not perform a CRS rate matching process. Then the network device B and the network device F separately send downlink data to the terminal device D. Then the terminal device D may receive the DCI sent by the network device B. The terminal device D may detect the first group of first parameters of the resources corresponding to the DCI. The terminal device may determine, based on the association relationship, the second parameters corresponding to the first group of first parameters. Then because the DCI indicates a PDSCH, the terminal device D performs, based on the second parameters, CRS rate matching on a PDSCH time-frequency resource indicated by the DCI, so that the terminal device D obtains downlink data of the network device B on the PDSCH. The terminal device D may directly obtain downlink data sent by the network device F. In the foregoing process, CRS rate matching needs to be performed on the PDSCH corresponding to the network device B, and CRS rate matching does not need to be performed on a PDSCH corresponding to the network device F.

For the foregoing implementations, the downlink parameter may be the downlink control resource parameter, or the downlink data may be the downlink data parameter. Optionally, the downlink parameter may alternatively be the downlink control resource parameter and the downlink data parameter.

The downlink control parameter may be any one of the following: a control resource set (control resource set, CORESET), a control resource set group (CORESET group), a search space (search space), a search space group (search space group), a physical downlink control channel configuration (PDCCH-config), and a transmission configuration indicator (transmission configuration indicator, TCI state) configured for the CORESET. The control resource set group may include one or more CORESETs. The search space group may include one or more search spaces.

The downlink data parameter may be any one of the following: a code division multiplexing (code division multiplexing, CDM) group, a demodulation reference signal (demodulation reference signal, DMRS) group, or a TCI state configured for a PDSCH.

The foregoing control resource set defines a possibility of detecting a PDCCH in frequency domain. A network device may configure one or more of the following information for a terminal device: an identifier of the CORESET, a DMRS scrambling identifier (ID) of the PDCCH, a frequency domain precoding granularity, a symbol length, a frequency domain location, a mapping manner between a CCE and an REG, a quasi co-location assumption for receiving the PDCCH, whether DCI on the PDCCH received in the CORESET includes a TCI field, and the like.

Quasi co-location means that two antenna ports have a quasi co-located (quasi co-located, QCL) relationship, for example, means that a channel large-scale parameter of one antenna port may be inferred (infer) by using an obtained (conveyed) channel large-scale parameter of the other antenna port. The large-scale parameter may include one or more of the following: an average gain (average gain), an average delay (average delay), a delay spread (delay spread), a Doppler shift (Doppler shift), a Doppler spread (Doppler spread), and a spatial parameter (spatial parameter or spatial Rx parameters).

The foregoing search space defines a possibility of detecting the PDCCH in time domain. The network device may configure one or more of the following information for the terminal device: an identifier of the search space e, an identifier of a CORESET associated with the search space, a time unit periodicity and a time unit offset of PDCCH detection, a time domain detection pattern (pattern), and a quantity (which may include 0) of possible candidate PDCCHs (PDCCH candidate) for each aggregation level, a type of the search space, a configuration related to a DCI format (for example, a format possibility of DCI to be detected), and a continuous length.

The foregoing spatial parameter may include one or more of the following: an angle of departure (angle of departure, AOD), a dominant angle of departure (dominant AoD), an average angle of departure (average AoD), an angle of arrival (angle of arrival, AOA), a dominant angle of arrival (dominant AoA), an average angle of arrival (average AoA), a channel correlation matrix, a power angle spread spectrum of the angle of arrival, a power angle spread spectrum of the angle of departure, transmit channel correlation, receive channel correlation, transmit beamforming, receive beamforming, spatial channel correlation, a spatial filter, spatial filtering parameter, a spatial reception parameter, and the like.

The foregoing time domain/time unit includes at least a plurality of time sampling points, and the time sampling point may be any one of the following: a frame, a radio frame, a system frame, a subframe, a half-frame, a slot, a mini slot, a symbol, and the like.

Types of the search space include, for example, a common search space and a terminal device-specific search space, where the common search space means that another terminal device may detect the search space.

The time domain detection pattern is used to indicate a possible symbol location at which the terminal device detects the PDCCH in a slot. For example, the time domain detection pattern may indicate one or more symbol locations, and the symbol locations correspond to first symbol locations from which possible PDCCHs start. For another example, the time domain detection pattern may indicate symbol locations 11, 12, and 13, and the terminal device may separately detect PDCCHs at locations that use 11, 12, and 13 as start symbols.

The quantity of possible PDCCH candidates for each aggregation level is a quantity that is of possible PDCCH candidates at each of different aggregation levels and that may be configured by the network device for the terminal device in a search space, for example, a configured quantity of possible PDCCH candidates at each of aggregation levels 1, 2, 4, 8, and 16 in a search space.

The continuous length refers to duration of the search space in a time domain time unit. A slot is used as an example. A configured periodicity is k, and the duration is d. In this case, the PDCCH may be detected in the search space in all d continuous slots starting from a slot (slot) that satisfies a periodicity and an offset (offset) of the search space.

When the downlink parameter is the downlink control resource parameter, the PDSCH time-frequency resource on which CRS rate matching is performed is a remaining PDSCH time-frequency resource in a configured PDSCH time-frequency resource except the resource overlapping the CRS resource indicated by the second parameter. In addition, in this case, all time-frequency resources are time-frequency resources related to CRS rate matching. In addition, the configured PDSCH time-frequency resource is the PDSCH time-frequency resource scheduled by the DCI transmitted on the PDCCH indicated by the downlink control resource parameter.

When the downlink parameter is the downlink control resource parameter, a manner of associating the downlink control resource parameters with the CRS rate matching parameters is described as follows.

Parameters, namely, the CORESET, the CORESET group, the search space, the search space group, and the PDCCH-config, associated with the CRS rate matching parameter all indicate some time-frequency resources of some downlink control channels, and association is performed based on a downlink control resource location at which the detected DCI is located. The CORESET is used as an example. Association is performed in the following manner: the CRS rate matching parameter—the associated CORESET—the DCI detected in the CORESET—a PDSCH indicated by the DCI, so that association between the PDSCH and the CRS rate matching parameter is established.

The CRS rate matching parameter is associated with the TCI state in the following manner: the CRS rate matching parameter—the associated TCI state—the CORESET for which the TCI state is configured—the DCI detected in the CORESET—a PDSCH indicated by the DCI, so that association between the PDSCH and the CRS rate matching parameter is established.

When the first parameter is the downlink data parameter, the PDSCH time-frequency resource on which CRS rate matching is performed is the remaining PDSCH time-frequency resource in the configured PDSCH time-frequency resource except the resource overlapping the CRS resource indicated by the second parameter. In addition, the configured PDSCH time-frequency resource is the time-frequency resource corresponding to the PDSCH associated with the downlink data parameter.

When the first parameter is the downlink data parameter, a manner of associating the downlink data parameters with the CRS rate matching parameters is described as follows.

The CRS rate matching parameter is associated with the CDM group and the DMRS group in the following manner according to an indication in the DCI: the CRS rate matching parameter—the associated CDM group—the DCI indicates the CDM group—a PDSCH indicated in a same DCI, so that association between the PDSCH and the CRS rate matching parameter is established.

The CRS rate matching parameter is associated with the TCI state in the following manner: the CRS rate matching parameter—the associated TCI state—the DCI indicates the TCI state—a PDSCH indicated by the DCI, so that association between the PDSCH and the CRS rate matching parameter is established.

Figure 12:
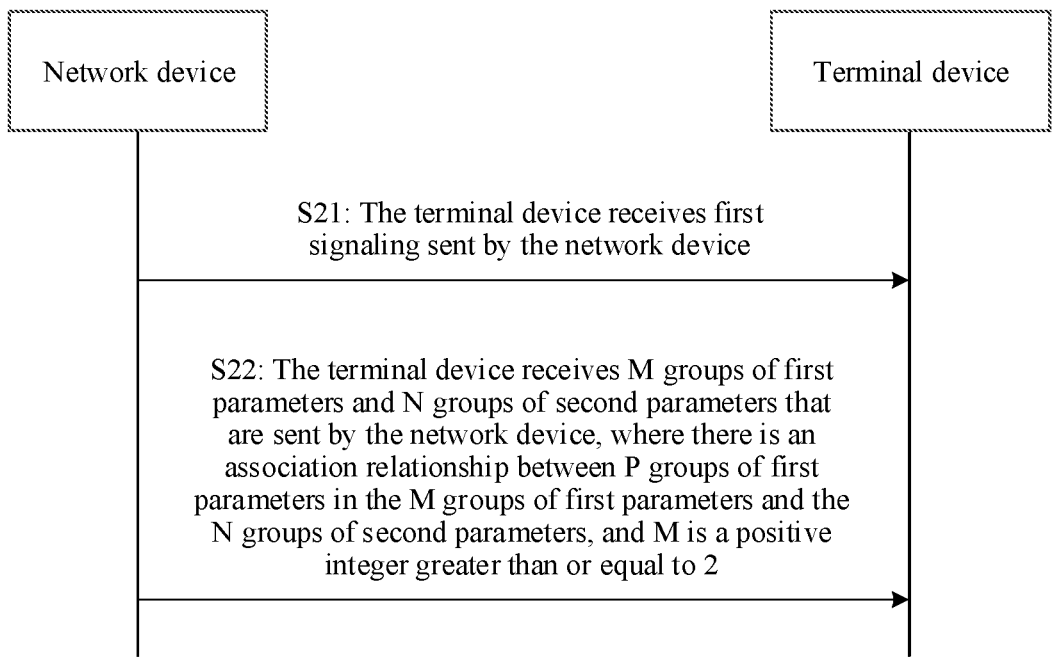
FIG. 12 is a signaling diagram of another communication processing method according to an embodiment of this application.

FIG. 12 is a signaling diagram of another communication processing method according to an embodiment of this application. As shown in FIG. 12, the method includes the following steps.

S21: A terminal device receives first signaling sent by a network device, where the first signaling includes an association relationship, or the first signaling is used to indicate the association relationship.

For example, for this step, refer to the first case of step S201 shown in FIG. 11. Details are not described again.

S22: The terminal device receives M groups of first parameters and N groups of second parameters that are sent by the network device, where the first parameter is a downlink parameter, the second parameter is a CRS rate matching parameter, M is a positive integer greater than or equal to 2, and N is a positive integer greater than or equal to 1.

There is the association relationship between P groups of first parameters in the M groups of first parameters and the N groups of second parameters, P is less than or equal to M, and P is a positive integer.

For example, for this step, refer to step S202 shown in FIG. 11. Details are not described again.

In this embodiment, the first signaling sent by the network device is received, where the first signaling includes the association relationship, or the first signaling is used to indicate the association relationship. The M groups of first parameters and the N groups of second parameters that are sent by the network device are received, where the first parameter is the downlink parameter, the second parameter is the CRS rate matching parameter, M is a positive integer greater than or equal to 2, and N is a positive integer greater than or equal to 1. There is the association relationship between the P groups of first parameters in the M groups of first parameters and the N groups of second parameters, P is less than or equal to M, and P is a positive integer. In this way, the network device delivers an association relationship between the M groups of first parameters and the N groups of second parameters, and the network device delivers the plurality of groups of first parameters and the at least one group of second parameters. The network device may perform rate matching on a time-frequency resource based on the association relationship. Further, the terminal device or another network device may receive the plurality of groups of first parameters and the at least one group of second parameters that have the association relationship. Then the terminal device or the another network device may obtain data based on the plurality of groups of first parameters and the at least one group of second parameters that have the association relationship. Therefore, in a coordinated multipoint transmission/reception process, network devices participating in coordination may separately perform rate matching on time-frequency resources based on respective CRS rate matching parameters associated with downlink parameters. Terminal devices may determine a punctured time-frequency resource on a PDSCH based on CRS rate matching parameters determined by the terminal devices, to obtain downlink data. In this way, in a multi-site coordination scenario, CRS rate matching processes are implemented, to ensure that the terminal devices are not interfered with by a signal from another cell, and can correctly exchange data with the network devices. In addition, this embodiment provides a plurality of CRS rate matching manners that are applicable to a plurality of scenarios.

A second implementation of setting the association relationship between the first parameters and the second parameters is as follows. The association relationship is predefined.

For example, an association relationship between P groups of first parameters in M groups of first parameters and N groups of second parameters is predefined. Predefining refers to any one of the following manners: negotiation in advance, presetting, protocol stipulation, and the like.

Then step S101 shown in FIG. 9 may be directly performed to perform CRS rate matching.

For example, a network device presets the association relationship between the first parameters and the second parameters, or the association relationship between the first parameters and the second parameters is specified in a protocol of a communication standard. Further, when step S101 is performed, the network device may directly send the M groups of first parameters and the N groups of second parameters that have an association relationship to the terminal device. When receiving the first parameters and the second parameters, the terminal device may directly determine the association relationship between the first parameters and the second parameters.

For another example, a network device negotiates with a terminal device by using signaling, to negotiate the association relationship between the first parameters and the second parameters. Therefore, the terminal device has learned of the association relationship in advance. Further, the network device may directly send the M groups of first parameters and the N groups of second parameters that have an association relationship to the terminal device. When the terminal device receives the first parameters and the second parameters, the terminal device may directly determine, based on the learned association relationship, the second parameters associated with the first parameters.

Optionally, for specific descriptions of the association relationship between the first parameters and the second parameters, the downlink parameters, and a PDSCH time-frequency resource on which CRS rate matching is performed, refer to the foregoing embodiment. Details are not described again.

The association relationship between the first parameters and the second parameters is predefined, so that in a coordinated multipoint transmission/reception process, network devices participating in coordination may separately perform rate matching on time-frequency resources based on respective CRS rate matching parameters associated with downlink parameters. Terminal devices may determine a punctured time-frequency resource on a PDSCH based on CRS rate matching parameters determined by the terminal devices, to obtain downlink data. In this way, in a multi-site coordination scenario, CRS rate matching processes are implemented, to ensure that the terminal devices are not interfered with by a signal from another cell, and can correctly exchange data with the network devices. In addition, this embodiment provides a plurality of CRS rate matching manners that are applicable to a plurality of scenarios.

Figure 13:
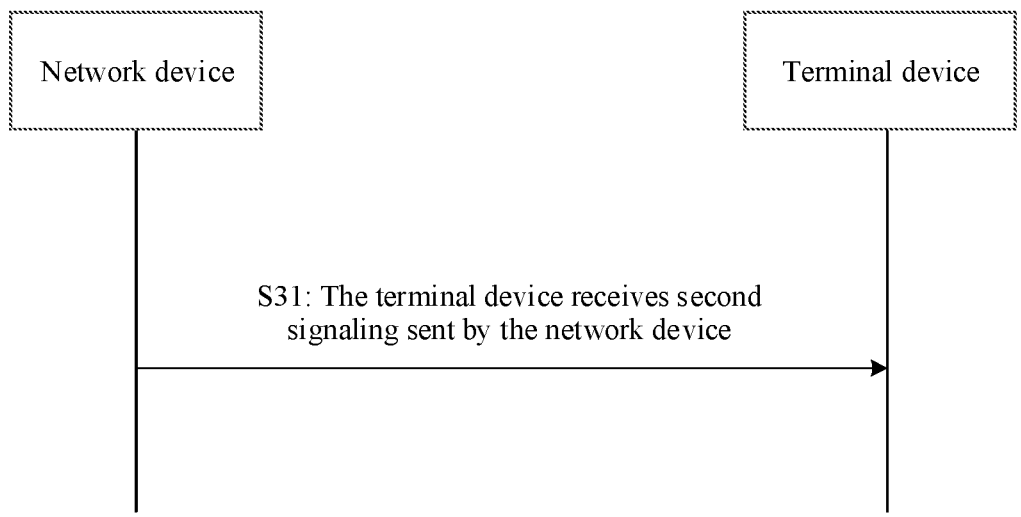
FIG. 13 is a signaling diagram of still another communication processing method according to an embodiment of this application.

FIG. 13 is a signaling diagram of still another communication processing method according to an embodiment of this application. As shown in FIG. 13, the method includes the following step.

S31: A terminal device receives second signaling sent by a network device, where the second signaling includes M groups of first parameters and/or N groups of second parameters, or the second signaling is used to indicate the M groups of first parameters and/or the N groups of second parameters.

The first parameter is a downlink parameter, the second parameter is a CRS rate matching parameter, M is a positive integer greater than or equal to 2, and N is a positive integer greater than or equal to 1. There is the association relationship between P groups of first parameters in the M groups of first parameters and the N groups of second parameters, P is less than or equal to M, and P is a positive integer.

Optionally, the second signaling is one or more of the following: RRC signaling, MAC-CE signaling, and DCI signaling.

For example, the network device may deliver the first parameters and the second parameters by using a same piece of signaling or different signaling.

For example, the network device may send the M groups of first parameters to the terminal device by using one piece of second signaling, and the network device may send the N groups of second parameters to the terminal device by using another piece of second signaling. Alternatively, the network device may send the M groups of first parameters and the N groups of second parameters to the terminal device by using one piece of second signaling.

In addition, the second signaling may directly carry the first parameters and/or the second parameters, or the second signaling indicates the first parameters and/or the second parameters.

For example, the network device sends one piece of RRC signaling to the terminal device, where the RRC signaling carries or indicates the first parameters. In addition, the network device sends one piece of MAC-CE signaling to the terminal device, where the MAC-CE signaling carries or indicates the first parameters.

Optionally, the first signaling may be the same as or different from the second signaling.

For example, the network device sends an association relationship between the M groups of first parameters and the N groups of second parameters to the terminal device by using the first signaling. In addition, the network device sends the M groups of first parameters and the N groups of second parameters to the terminal device by using the second signaling. In this case, the first signaling is different from the second signaling. For another example, the network device sends all of an association relationship between the M groups of first parameters and the N groups of second parameters, the M groups of first parameters, and the N groups of second parameters to the terminal device by using same signaling.

For other implementation statuses, refer to the foregoing embodiment. Details are not described again.

In this embodiment, the second signaling sent by the network device is received, where the second signaling is used to carry or indicate the M groups of first parameters and/or the N groups of second parameters, the first parameter is the downlink parameter, the second parameter is the CRS rate matching parameter, M is a positive integer greater than or equal to 2, and N is a positive integer greater than or equal to 1. There is the association relationship between the P groups of first parameters in the M groups of first parameters and the N groups of second parameters, where P is less than or equal to M, and P is a positive integer. In this way, the network device delivers the first parameters and the at least one group of second parameters, and there is the association relationship between the first parameters and the second parameters. Further, the terminal device or another network device may receive the plurality of groups of first parameters and the at least one group of second parameters that have the association relationship. Then the terminal device or the another network device can obtain data based on the plurality of groups of first parameters and the at least one group of second parameters that have the association relationship. For example, the terminal device determines a time-frequency resource based on the parameters, or the terminal device obtains downlink data based on the parameters. Therefore, in a coordinated multipoint transmission/reception process, network devices participating in coordination may separately perform rate matching on time-frequency resources based on respective CRS rate matching parameters associated with downlink parameters. Terminal devices may determine a punctured time-frequency resource on a PDSCH based on CRS rate matching parameters determined by the terminal devices, to obtain downlink data. In this way, in a multi-site coordination scenario, CRS rate matching processes are implemented, to ensure that the terminal devices are not interfered with by a signal from another cell, and can correctly exchange data with the network devices.

FIG. 14 is a schematic flowchart of yet another communication processing method according to an embodiment of this application. As shown in FIG. 14, the method includes the following step.

S301: Receive M groups of first parameters and N groups of second parameters that are sent by a network device, where the first parameter is a downlink parameter, the second parameter is a CRS rate matching parameter, M is a positive integer greater than or equal to 1, and N is a positive integer greater than or equal to 1.

There is an association relationship between P groups of first parameters in the M groups of first parameters and the N groups of second parameters, P is less than or equal to M, and P is a positive integer.

For example, this embodiment of this application may be performed by a terminal device, a network device, or another apparatus or device that can perform this embodiment of this application.

In this embodiment, a value of M is different from a value of M in the embodiments shown in FIG. 9 to FIG. 13. In this embodiment, M is a positive integer greater than or equal to 1.

When M=1, the network device may deliver one group of first parameters and the at least one group of second parameters. There is an association relationship between the group of first parameters and one group of second parameters in the at least one group of second parameters. That is, the network device may deliver the group of first parameters and the at least one group of second parameters, but the group of first parameters has an association relationship only with one group of second parameters. Then a device that receives the parameters may determine, based on the association relationship, the second parameters associated with the first parameters.

For information about the scenario in which M is greater than or equal to 1, refer to content of the embodiments shown in FIG. 9 to FIG. 13. Details are not described again.

In this embodiment, the M groups of first parameters and the N groups of second parameters that are sent by the network device are received, where the first parameter is the downlink parameter, the second parameter is the CRS rate matching parameter, M is a positive integer greater than or equal to 1, and N is a positive integer greater than or equal to 1. There is the association relationship between the P groups of first parameters in the M groups of first parameters and the N groups of second parameters, P is less than or equal to M, and P is a positive integer. In a coordinated multipoint transmission/reception process, network devices participating in coordination may separately perform rate matching on time-frequency resources based on respective CRS rate matching parameters associated with downlink parameters. Terminal devices may determine a punctured time-frequency resource on a PDSCH based on CRS rate matching parameters determined by the terminal devices, to obtain downlink data. In this way, in a multi-site coordination scenario, CRS rate matching processes are implemented, to ensure that the terminal devices are not interfered with by a signal from another cell, and can correctly exchange data with the network devices. In addition, in a non-coordinated scenario, that is, in a single-site transmission process, the network devices may perform rate matching on time-frequency resources based on CRS rate matching parameters associated with downlink parameters. The terminal devices may directly learn of required CRS rate matching parameters and then determine the time-frequency resources on which rate matching is performed, to obtain downlink data.

FIG. 15 is a signaling diagram of yet another communication processing method according to an embodiment of this application. As shown in FIG. 15, the method includes the following steps.

An association relationship is predefined. Alternatively, S41: A terminal device receives first signaling sent by a network device, where the first signaling includes an association relationship, or the first signaling is used to indicate the association relationship.

Optionally, the first signaling is one or more of the following: RRC signaling, MAC-CE signaling, and DCI signaling.

S42: The terminal device receives M groups of first parameters and N groups of second parameters that are sent by the network device, where the first parameter is a downlink parameter, the second parameter is a CRS rate matching parameter, M is a positive integer greater than or equal to 1, and N is a positive integer greater than or equal to 1.

There is an association relationship between P groups of first parameters in the M groups of first parameters and the N groups of second parameters, P is less than or equal to M, and P is a positive integer.

Optionally, step S42 is specifically that the terminal device receives second signaling sent by the network device, where the second signaling includes the M groups of first parameters and/or the N groups of second parameters, or the second signaling is used to indicate the M groups of first parameters and/or the N groups of second parameters.

Optionally, the second signaling is one or more of the following: RRC signaling, MAC-CE signaling, and DCI signaling.

Optionally, when M is equal to N, each group of first parameters is associated in a one-to-one correspondence with each group of second parameters.

Optionally, when M is greater than N, at least two groups of first parameters are associated with a same group of second parameters.

Optionally, the downlink parameter is a downlink control resource parameter or a downlink data parameter. Optionally, the downlink parameter may alternatively be a downlink control resource parameter and a downlink data parameter.

Optionally, the P groups of first parameters and the N groups of second parameters are used to determine a PDSCH time-frequency resource on which CRS rate matching is performed.

Optionally, the PDSCH time-frequency resource on which CRS rate matching is performed is a remaining PDSCH time-frequency resource in a configured PDSCH time-frequency resource except a resource overlapping a CRS resource indicated by the second parameter. The first parameter is the downlink control resource parameter, and the configured PDSCH time-frequency resource is a PDSCH time-frequency resource scheduled by DCI transmitted on a PDCCH indicated by the downlink control resource parameter.

Optionally, the PDSCH time-frequency resource on which CRS rate matching is performed is a remaining PDSCH time-frequency resource in a configured PDSCH time-frequency resource except a resource overlapping a CRS resource indicated by the second parameter. The first parameter is the downlink data parameter, and the configured PDSCH time-frequency resource is a time-frequency resource corresponding to a PDSCH associated with the downlink data parameter.

For example, when M=1, for steps in this embodiment of this application, refer to the embodiment shown in FIG. 15. The technical content and the technical effects are the same. Details are not described again. When M=2, refer to the embodiments shown in FIG. 9 to FIG. 13. The technical content and technical effects are the same. Details are not described again.

FIG. 16 is a schematic flowchart of still yet another communication processing method according to an embodiment of this application. Details of content that is same as or similar to the foregoing embodiments are not described in this embodiment again. Refer to the description of the foregoing embodiments. As shown in FIG. 16, the method includes the following step.

S401: Receive M groups of first parameters and N groups of second parameters that are sent by a network device, where the first parameter is a downlink parameter, the second parameter is a CRS rate matching parameter, M is a positive integer greater than or equal to 2, and N is a positive integer greater than or equal to 1.

P groups of first parameters in the M groups of first parameters and the N groups of second parameters are used to determine a PDSCH time-frequency resource on which CRS rate matching is performed, P is less than or equal to M, and P is a positive integer.

Optionally, the M groups of first parameters correspond to Q network devices, the N groups of first parameters correspond to the Q network devices, and Q is a positive integer greater than or equal to 2. Optionally, at least one of the Q network devices is the network device that sends the first parameters and/or the second parameters.

Optionally, when the M groups of first parameters correspond to the Q network devices, the following several correspondences are included.

A first correspondence: the M groups of first parameters correspond to the Q network devices. For example, each group of first parameters in the M groups of first parameters corresponds to each of the Q network devices, a plurality of groups of first parameters correspond to a same network device, or a same group of first parameters corresponds to a plurality of network devices. Each group of second parameters in the N groups of second parameters corresponds to each of the Q network devices.

A second correspondence: When M is greater than N, the M groups of first parameters correspond to the Q network devices. For example, each group of first parameters in the M groups of first parameters corresponds to each of the Q network devices, a plurality of groups of first parameters correspond to a same network device, or a same group of first parameters corresponds to a plurality of network devices. At least two of the network devices correspond to a same group of second parameters.

Optionally, the downlink parameter is a downlink control resource parameter or a downlink data parameter. Optionally, the downlink parameter may alternatively be a downlink control resource parameter and a downlink data parameter.

Optionally, the PDSCH time-frequency resource on which CRS rate matching is performed is a remaining PDSCH time-frequency resource in a configured PDSCH time-frequency resource except a resource overlapping a CRS resource associated with the second parameter. The first parameter is the downlink control resource parameter, and the configured PDSCH time-frequency resource is a PDSCH time-frequency resource scheduled by DCI transmitted on a PDCCH indicated by the downlink control resource parameter.

Optionally, the PDSCH time-frequency resource on which CRS rate matching is performed is a remaining PDSCH time-frequency resource in a configured PDSCH time-frequency resource except a resource overlapping a CRS resource associated with the second parameter. The first parameter is the downlink data parameter, and the configured PDSCH time-frequency resource is a time-frequency resource corresponding to a PDSCH associated with the downlink control data parameter.

For example, first, the network device sends the M groups of first parameters and the N groups of second parameters to a terminal device.

The network device sends the parameters to the terminal device in the following several manners.

In a first manner, the network device directly sends the M groups of first parameters and the N groups of second parameters to the terminal device.

In a second manner, the network device may deliver the first parameters and the second parameters by using a same piece of signaling or different signaling.

For example, the network device may send the M groups of first parameters to the terminal device by using one piece of signaling, and the network device may send the N groups of second parameters to the terminal device by using another piece of signaling. Alternatively, the network device may send the M groups of first parameters and the N groups of second parameters to the terminal device by using one piece of signaling.

In addition, the signaling may directly carry the first parameters and/or the second parameters, or the signaling indicates the first parameters and/or the second parameters.

Then because the P groups of first parameters in the M groups of first parameters and the N groups of second parameters are used by the terminal device to determine the PDSCH time-frequency resource on which CRS rate matching is performed, the terminal device may determine the time-frequency resource based on the first parameters and the second parameters. The time-frequency resource is the PDSCH time-frequency resource on which CRS rate matching is performed.

For example, in a multi-site coordination scenario, the Q network devices participate in coordination, where Q is a positive integer greater than or equal to 2. The network device that sends the foregoing parameters may be one of the Q network devices participating in coordination. Alternatively, the network device that sends the foregoing parameters may not be any one of the Q network devices participating in coordination. When the Q network devices participate in coordination, the M groups of first parameters may correspond to the Q network devices, and the N groups of first parameters may correspond to the Q network devices. Therefore, each of the Q network devices may correspond to at least one group of first parameters and/or at least one group of second parameters. Then each of the Q network devices completes a multi-site coordination process based on the parameters of the network device.

A mapping relationship between the parameters and the network devices are classified into the following several types.

A first correspondence between the parameters and the network devices: When M is equal to N, the M groups of first parameters correspond to the Q network devices. For example, each group of first parameters in the M groups of first parameters corresponds to each of the Q network devices, the plurality of groups of first parameters correspond to the same network device, or the same group of first parameters corresponds to the plurality of network devices. In addition, each group of second parameters corresponds to each of the Q network devices. For example, each group of first parameters may correspond one-to-one to each of the Q network devices, and each group of second parameters may correspond one-to-one to each of the Q network devices. For another example, a plurality of groups of first parameters correspond to one network device, and a plurality of groups of second parameters correspond to one network device. In this case, each of the Q network devices participating in coordination has respective first parameters and respective second parameters. Further, each of the Q network devices participating in coordination may complete a CRS rate matching process based on the respective first parameters and second parameters. Then the terminal device may determine, based on obtained first parameters and second parameters, the PDSCH time-frequency resource on which CRS rate matching is performed, and further obtain data.

A second correspondence between the parameters and the network devices: When M is greater than N, the M groups of first parameters correspond to the Q network devices. For example, each group of first parameters in the M groups of first parameters corresponds to each of the Q network devices, the plurality of groups of first parameters correspond to the same network device, or the same group of first parameters corresponds to the plurality of network devices. However, the at least two of the network devices correspond to the same group of second parameters. For example, each group of first parameters may correspond one-to-one to each of the Q network devices, and at least two of the Q network devices correspond to a same group of second parameters. For another example, a plurality of groups of first parameters correspond to one network device, and at least two of the Q network devices correspond to a same group of second parameters. In this case, each of the Q network devices participating in coordination has respective first parameters and respective second parameters, and second parameters of the at least two network devices are the same. Further, each of the Q network devices participating in coordination may complete a CRS rate matching process based on the respective first parameters and second parameters. Then the terminal device may determine, based on obtained first parameters and second parameters, the PDSCH time-frequency resource on which CRS rate matching is performed, and further obtain data.

For descriptions of the downlink parameters, refer to the embodiments shown in FIG. 9 to FIG. 13. Details are not described again.

FIG. 17 is a signaling diagram of still yet another communication processing method according to an embodiment of this application. As shown in FIG. 17, the method includes the following step.

S51: A terminal device receives M groups of first parameters and N groups of second parameters that are sent by a network device, where the first parameter is a downlink parameter, the second parameter is a CRS rate matching parameter, M is a positive integer greater than or equal to 2, and N is a positive integer greater than or equal to 1.

P groups of first parameters in the M groups of first parameters and the N groups of second parameters are used to determine a PDSCH time-frequency resource on which CRS rate matching is performed, P is less than or equal to M, and P is a positive integer.

For example, for the step in this embodiment of this application, refer to the embodiment shown in FIG. 16. Details are not described again.

In this embodiment, the M groups of first parameters and the N groups of second parameters that are sent by the network device are received, where the first parameter is the downlink parameter, the second parameter is the CRS rate matching parameter, M is a positive integer greater than or equal to 2, and N is a positive integer greater than or equal to 1. The P groups of first parameters in the M groups of first parameters and the N groups of second parameters are used to determine the PDSCH time-frequency resource on which CRS rate matching is performed, P is less than or equal to M, and P is a positive integer. In a multi-site coordination scenario, the network device may send the plurality of groups of downlink parameters and the at least one group of CRS rate matching parameters to the terminal device, and network devices participating in coordination may perform rate matching processes based on the foregoing parameters. Then terminal devices may obtain the downlink parameters and the CRS rate matching parameters, and then obtain data. For example, the terminal devices determine a time-frequency resource based on the parameters, or the terminal devices obtain downlink data based on the parameters. Therefore, in a coordinated multipoint transmission/reception process, the network devices participating in coordination may separately perform rate matching on time-frequency resources based on respective CRS rate matching parameters associated with downlink parameters. The terminal devices may determine a punctured time-frequency resource on a PDSCH based on CRS rate matching parameters determined by the terminal devices, to obtain downlink data. In this way, in the multi-site coordination scenario, CRS rate matching processes are implemented, to ensure that the terminal devices are not interfered with by a signal from another cell, and can correctly exchange data with the network devices.

FIG. 18a is a schematic flowchart of a further communication processing method according to an embodiment of this application. As shown in FIG. 18a, the method includes the following step.

S501: Receive N groups of CRS rate matching parameters sent by a network device, where N is a positive integer greater than or equal to 1, and the N groups of CRS rate matching parameters are used to determine a PDSCH time-frequency resource on which CRS rate matching is performed.

For example, the network device delivers at least one group of CRS rate matching parameters.

For example, the network device sends the N groups of CRS rate matching parameters to a terminal device. For example, the network device directly sends the N groups of CRS rate matching parameters to the terminal device. For another example, the network device sends one piece of signaling to the terminal device, where the signaling includes the N groups of CRS rate matching parameters, or the signaling is used to indicate the CRS rate matching parameters. Optionally, the signaling may be one or more of the following: RRC signaling, MAC-CE signaling, and DCI signaling. N may be 1.

In addition, in a multi-site coordination scenario, Q network devices participate in coordination, where Q is a positive integer greater than or equal to 2. The network device that sends the CRS rate matching parameters may be one of the Q network devices participating in coordination. Alternatively, the network device that sends the CRS rate matching parameters may not be any one of the Q network devices participating in coordination.

Then the N groups of CRS rate matching parameters are configured for each of the Q network devices participating in coordination. Then when sending downlink data, each of the Q network devices participating in coordination may perform, based on all the N groups of CRS rate matching parameters, rate matching on all REs on a symbol on which a time-frequency resource indicated by the CRS rate matching parameters is located. Then because the terminal device has learned of the CRS rate matching parameters, the terminal device may directly determine, based on the CRS rate matching parameters, the PDSCH time-frequency resource on which CRS rate matching is performed. That is, the terminal device may determine a symbol that is of a PDSCH and on which a CRS is located. The terminal device directly performs rate matching on the PDSCH on the symbol, so that the terminal device can determine a time-frequency resource location of downlink data, and further obtain the downlink data sent by the network device.

Alternatively, some of the Q network devices participating in coordination may separately perform CRS rate matching on a time-frequency resource based on a configured CRS rate matching parameter. Then because the terminal device has learned of the CRS rate matching parameter, the terminal device may directly determine, based on the CRS rate matching parameter, the PDSCH time-frequency resource on which CRS rate matching is performed.

For example, two network devices participate in collaboration. For example, the network devices may be TRPs. Another network device or one of the two network devices participating in coordination may send one group of CRS rate matching parameters to the terminal device. The two network devices participating in coordination may perform, based on the group of CRS rate matching parameters, CRS rate matching on all REs on a symbol on which a time-frequency resource indicated by the CRS rate matching parameters is located. Then the terminal device determines, based on the received CRS rate matching parameters, a PDSCH time-frequency resource on which CRS rate matching is performed. That is, the terminal device may determine a symbol that is of a PDSCH and on which a CRS is located. The terminal device directly performs rate matching on the PDSCH on the symbol, so that the terminal device can obtain downlink data sent by the network device.

For descriptions of the downlink parameters, refer to the embodiments shown in FIG. 9 to FIG. 13. Details are not described again.

Figure 18B:
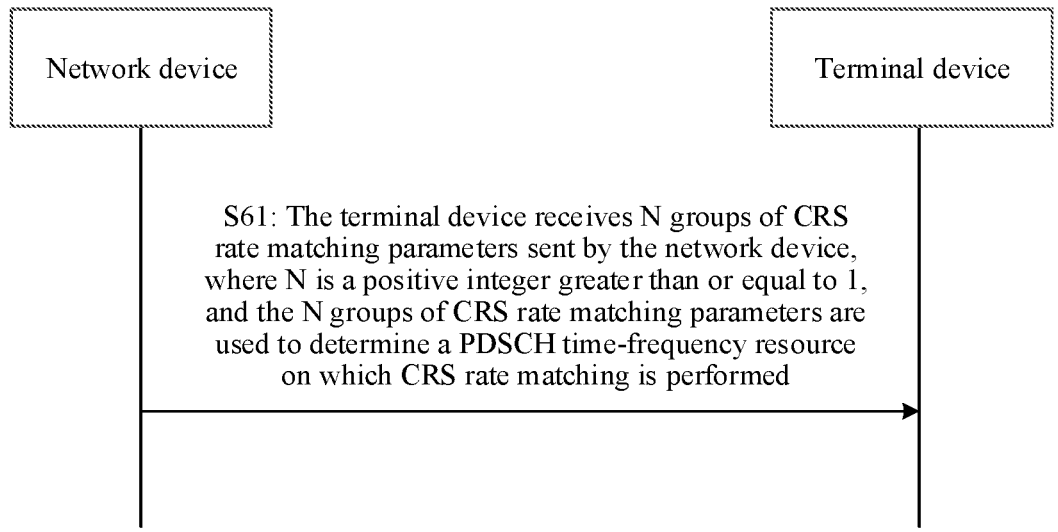
FIG. 18b is a signaling diagram of a further communication processing method according to an embodiment of this application.

FIG. 18b is a signaling diagram of a further communication processing method according to an embodiment of this application. As shown in FIG. 18b, the method includes the following step.

S61: A terminal device receives N groups of CRS rate matching parameters sent by a network device, where N is a positive integer greater than or equal to 1, and the N groups of CRS rate matching parameters are used to determine a PDSCH time-frequency resource on which CRS rate matching is performed.

For example, for the step in this embodiment of this application, refer to the embodiment shown in FIG. 18a. Details are not described again.

In this embodiment, the N groups of CRS rate matching parameters sent by the network device are received, where N is a positive integer greater than or equal to 1, and the N groups of CRS rate matching parameters are used to determine the PDSCH time-frequency resource on which CRS rate matching is performed. In a multi-site coordination scenario, CRS rate matching parameters may be directly configured for network devices participating in coordination. In addition, the terminal device may receive the CRS rate matching parameters. Then the network devices participating in the coordination may perform CRS rate matching on time-frequency resources based on the CRS rate matching parameters. The terminal device may directly determine, based on the CRS rate matching parameters, a PDSCH time-frequency resource on which CRS rate matching is performed, so that the terminal device obtains downlink data. In this way, in the multi-site coordination scenario, CRS rate matching processes are implemented, to ensure that the terminal device is not interfered with by a signal from another cell, and can correctly exchange data with the network devices. In addition, the foregoing process is also applicable to a non-coordinated scenario, namely, a single-site scenario.

The communication processing methods according to the embodiments of this application are described in detail above, and communication processing apparatuses in the embodiments of this application are described below.

Figure 18C:
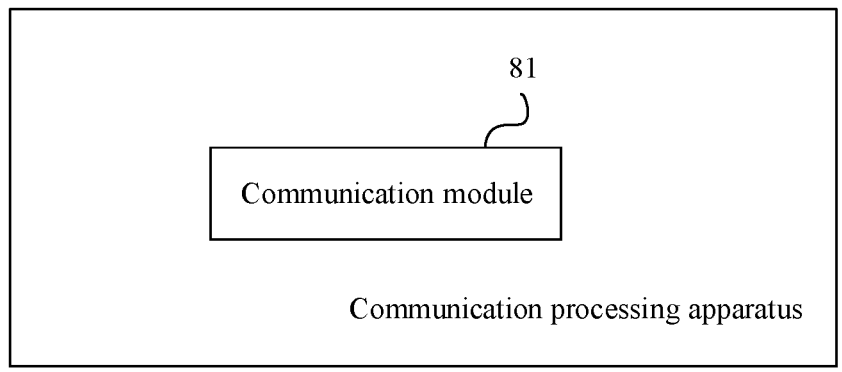
FIG. 18c is a schematic block diagram of a communication processing apparatus according to an embodiment of this application.

FIG. 18c is a schematic block diagram of a communication processing apparatus according to an embodiment of this application. The apparatus in this embodiment of this application may be the terminal device in the foregoing method embodiments, or may be one or more chips in the terminal device. The apparatus may be configured to perform some or all functions of the terminal device in the foregoing method embodiments. The apparatus may include the following unit and module.

A communication module 81 is configured to receive M groups of first parameters and N groups of second parameters that are sent by a network device, where the first parameter is a downlink parameter, the second parameter is a CRS rate matching parameter, M is a positive integer greater than or equal to 2, and N is a positive integer greater than or equal to 1, where there is an association relationship between P groups of first parameters in the M groups of first parameters and the N groups of second parameters, P is less than or equal to M, and P is a positive integer.

Optionally, the association relationship is predefined.

Optionally, the communication module 81 is further configured to receive first signaling sent by the network device, where the first signaling includes the association relationship, or the first signaling is used to indicate the association relationship.

Optionally, the first signaling is one or more of the following: RRC signaling, MAC-CE signaling, and DCI signaling.

Optionally, the communication module 81 is specifically configured to receive second signaling sent by the network device, where the second signaling includes the M groups of first parameters and/or the N groups of second parameters, or the second signaling is used to indicate the M groups of first parameters and/or the N groups of second parameters.

Optionally, the second signaling is one or more of the following: RRC signaling, MAC-CE signaling, and DCI signaling.

Optionally, when M is equal to N, each group of first parameters is associated in a one-to-one correspondence with each group of second parameters.

Optionally, when M is greater than N, at least two groups of first parameters are associated with a same group of second parameters.

Optionally, the downlink parameter is a downlink control resource parameter or a downlink data parameter. Optionally, the downlink parameter may alternatively be a downlink control resource parameter and a downlink data parameter.

Optionally, the P groups of first parameters and the N groups of second parameters are used to determine a PDSCH time-frequency resource on which CRS rate matching is performed.

Optionally, the PDSCH time-frequency resource on which CRS rate matching is performed is a remaining PDSCH time-frequency resource in a configured PDSCH time-frequency resource except a resource overlapping a CRS resource indicated by the second parameter. The first parameter is the downlink control resource parameter, and the configured PDSCH time-frequency resource is a PDSCH time-frequency resource scheduled by DCI transmitted on a PDCCH indicated by the downlink control resource parameter.

Optionally, the PDSCH time-frequency resource on which CRS rate matching is performed is a remaining PDSCH time-frequency resource in a configured PDSCH time-frequency resource except a resource overlapping a CRS resource indicated by the second parameter. The first parameter is the downlink data parameter, and the configured PDSCH time-frequency resource is a time-frequency resource corresponding to a PDSCH associated with the downlink data parameter.

The communication module 81 may perform step S101 in the method shown in FIG. 9, or may perform step S11 in the method shown in FIG. 10. Alternatively, the communication module 81 may perform steps S201 and S202 in the method shown in FIG. 11, or may perform steps S21 and S22 in the method shown in FIG. 12. Alternatively, the communication module 81 may perform step S31 in the method shown in FIG. 13.

The apparatus in the embodiment shown in FIG. 18c may be configured to execute the technical solutions in the embodiments shown in FIG. 9 to FIG. 13 in the foregoing methods. Implementation principles and technical effects of the apparatus are similar to those of the technical solutions. Details are not described herein again.

Figure 19:
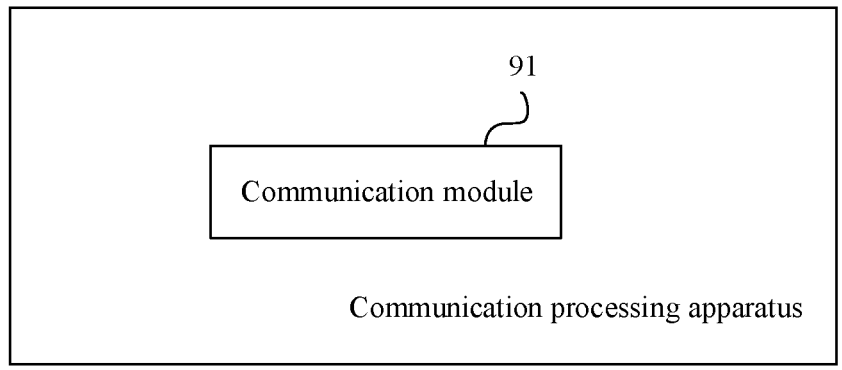
FIG. 19 is a schematic block diagram of another communication processing apparatus according to an embodiment of this application.

FIG. 19 is a schematic block diagram of another communication processing apparatus according to an embodiment of this application. The apparatus in this embodiment of this application may be the network device in the foregoing method embodiments, or may be one or more chips in the network device. The apparatus may be configured to perform some or all functions of the network device in the foregoing method embodiments. The apparatus may include the following unit and module.

A communication module 91 is configured to send M groups of first parameters and N groups of second parameters to a terminal device, where the first parameter is a downlink parameter, the second parameter is a CRS rate matching parameter, M is a positive integer greater than or equal to 2, and N is a positive integer greater than or equal to 1, where there is an association relationship between P groups of first parameters in the M groups of first parameters and the N groups of second parameters, P is less than or equal to M, and P is a positive integer.

Optionally, the association relationship is predefined.

Optionally, the communication module 91 is further configured to send first signaling to the terminal device, where the first signaling includes the association relationship, or the first signaling is used to indicate the association relationship.

Optionally, the first signaling is one or more of the following: RRC signaling, MAC-CE signaling, and DCI signaling.

Optionally, the communication module 91 is specifically configured to send second signaling to the terminal device, where the second signaling includes the M groups of first parameters and/or the N groups of second parameters, or the second signaling is used to indicate the M groups of first parameters and/or the N groups of second parameters.

Optionally, the second signaling is one or more of the following: RRC signaling, MAC-CE signaling, and DCI signaling.

Optionally, when M is equal to N, each group of first parameters is associated in a one-to-one correspondence with each group of second parameters.

Optionally, when M is greater than N, at least two groups of first parameters are associated with a same group of second parameters.

Optionally, the downlink parameter is a downlink control resource parameter or a downlink data parameter. Optionally, the downlink parameter may alternatively be a downlink control resource parameter and a downlink data parameter.

Optionally, the P groups of first parameters and the N groups of second parameters are used by the terminal device to determine a PDSCH time-frequency resource on which CRS rate matching is performed.

Optionally, the PDSCH time-frequency resource on which CRS rate matching is performed is a remaining PDSCH time-frequency resource in a configured PDSCH time-frequency resource except a resource overlapping a CRS resource indicated by the second parameter. The first parameter is the downlink control resource parameter, and the configured PDSCH time-frequency resource is a PDSCH time-frequency resource scheduled by DCI transmitted on a PDCCH indicated by the downlink control resource parameter.

Optionally, the PDSCH time-frequency resource on which CRS rate matching is performed is a remaining PDSCH time-frequency resource in a configured PDSCH time-frequency resource except a resource overlapping a CRS resource indicated by the second parameter. The first parameter is the downlink data parameter, and the configured PDSCH time-frequency resource is a time-frequency resource corresponding to a PDSCH associated with the downlink data parameter.

The communication module 91 may perform the sending action of the network device in step S101 in the method shown in FIG. 9, or may perform step S1/ in the method shown in FIG. 10. Alternatively, the communication module 91 may perform the sending actions of the network device in steps S201 and S202 in the method shown in FIG. 11, or may perform steps S21 and S22 in the method shown in FIG. 12. Alternatively, the communication module 91 may perform step S31 in the method shown in FIG. 13.

The apparatus in the embodiment shown in FIG. 19 may be configured to execute the technical solutions in the embodiment shown in FIG. 9 to FIG. 13 in the foregoing methods. Implementation principles and technical effects of the apparatus are similar to those of the technical solutions. Details are not described herein again.

Figure 20:
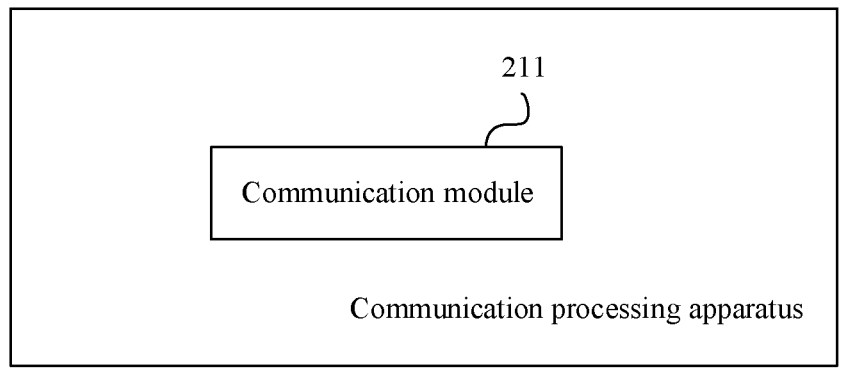
FIG. 20 is a schematic block diagram of still another communication processing apparatus according to an embodiment of this application.

FIG. 20 is a schematic block diagram of still another communication processing apparatus according to an embodiment of this application. The apparatus in this embodiment of this application may be the terminal device in the foregoing method embodiments, or may be one or more chips in the terminal device. The apparatus may be configured to perform some or all functions of the terminal device in the foregoing method embodiments. The apparatus may include the following unit and module.

A communication module 211 is configured to receive M groups of first parameters and N groups of second parameters that are sent by a network device, where the first parameter is a downlink parameter, the second parameter is a CRS rate matching parameter, M is a positive integer greater than or equal to 1, and N is a positive integer greater than or equal to 1, where there is an association relationship between P groups of first parameters in the M groups of first parameters and the N groups of second parameters, P is less than or equal to M, and P is a positive integer.

Optionally, the association relationship is predefined.

Optionally, the communication module 211 is further configured to receive first signaling sent by the network device, where the first signaling includes the association relationship, or the first signaling is used to indicate the association relationship.

Optionally, the first signaling is one or more of the following: RRC signaling, MAC-CE signaling, and DCI signaling.

Optionally, the communication module 211 is specifically configured to receive second signaling sent by the network device, where the second signaling includes the M groups of first parameters and/or the N groups of second parameters, or the second signaling is used to indicate the M groups of first parameters and/or the N groups of second parameters.

Optionally, the second signaling is one or more of the following: RRC signaling, MAC-CE signaling, and DCI signaling.

Optionally, when M is equal to N, each group of first parameters is associated in a one-to-one correspondence with each group of second parameters.

Optionally, when M is greater than N, at least two groups of first parameters are associated with a same group of second parameters.

Optionally, the downlink parameter is a downlink control resource parameter or a downlink data parameter. Optionally, the downlink parameter may alternatively be a downlink control resource parameter and a downlink data parameter.

Optionally, the P groups of first parameters and the N groups of second parameters are used to determine a PDSCH time-frequency resource on which CRS rate matching is performed.

Optionally, the PDSCH time-frequency resource on which CRS rate matching is performed is a remaining PDSCH time-frequency resource in a configured PDSCH time-frequency resource except a resource overlapping a CRS resource indicated by the second parameter. The first parameter is the downlink control resource parameter, and the configured PDSCH time-frequency resource is a PDSCH time-frequency resource scheduled by DCI transmitted on a PDCCH indicated by the downlink control resource parameter.

Optionally, the PDSCH time-frequency resource on which CRS rate matching is performed is a remaining PDSCH time-frequency resource in a configured PDSCH time-frequency resource except a resource overlapping a CRS resource indicated by the second parameter. The first parameter is the downlink data parameter, and the configured PDSCH time-frequency resource is a time-frequency resource corresponding to a PDSCH associated with the downlink data parameter.

The communication module 211 may perform step S301 in the method shown in FIG. 14, or may perform steps S41 and S42 in the method shown in FIG. 15.

The apparatus in the embodiment shown in FIG. 20 may be configured to execute the technical solutions in the embodiment shown in FIG. 14 and FIG. 15 in the foregoing methods. Implementation principles and technical effects of the apparatus are similar to those of the technical solutions. Details are not described herein again.

Figure 21:
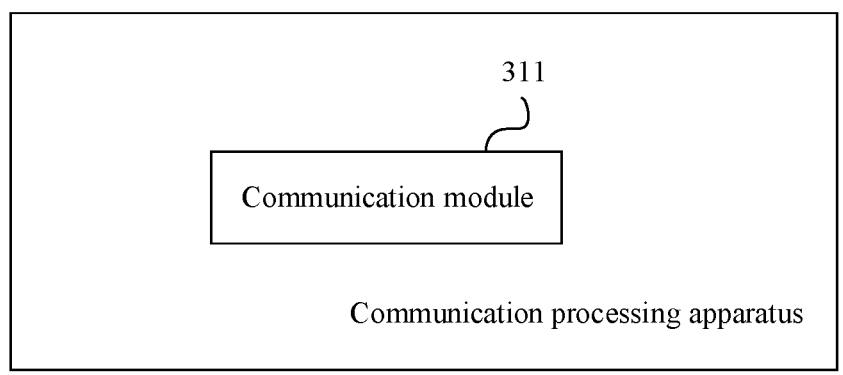
FIG. 21 is a schematic block diagram of yet another communication processing apparatus according to an embodiment of this application.

FIG. 21 is a schematic block diagram of yet another communication processing apparatus according to an embodiment of this application. The apparatus in this embodiment of this application may be the network device in the foregoing method embodiments, or may be one or more chips in the network device. The apparatus may be configured to perform some or all functions of the network device in the foregoing method embodiments. The apparatus may include the following unit and module.

A communication module 311 is configured to send M groups of first parameters and N groups of second parameters to a terminal device, where the first parameter is a downlink parameter, the second parameter is a CRS rate matching parameter, M is a positive integer greater than or equal to 2, and N is a positive integer greater than or equal to 1, where there is an association relationship between P groups of first parameters in the M groups of first parameters and the N groups of second parameters, P is less than or equal to M, and P is a positive integer.

Optionally, the association relationship is predefined.

Optionally, the communication module 311 is further configured to send first signaling to the terminal device, where the first signaling includes the association relationship, or the first signaling is used to indicate the association relationship.

Optionally, the first signaling is one or more of the following: RRC signaling, MAC-CE signaling, and DCI signaling.

Optionally, the communication module 311 is specifically configured to send second signaling to the terminal device, where the second signaling includes the M groups of first parameters and/or the N groups of second parameters, or the second signaling is used to indicate the M groups of first parameters and/or the N groups of second parameters.

Optionally, the second signaling is one or more of the following: RRC signaling, MAC-CE signaling, and DCI signaling.

Optionally, when M is equal to N, each group of first parameters is associated in a one-to-one correspondence with each group of second parameters.

Optionally, when M is greater than N, at least two groups of first parameters are associated with a same group of second parameters.

Optionally, the downlink parameter is a downlink control resource parameter or a downlink data parameter. Optionally, the downlink parameter may alternatively be a downlink control resource parameter and a downlink data parameter.

Optionally, the P groups of first parameters and the N groups of second parameters are used by the terminal device to determine a PDSCH time-frequency resource on which CRS rate matching is performed.

Optionally, the PDSCH time-frequency resource on which CRS rate matching is performed is a remaining PDSCH time-frequency resource in a configured PDSCH time-frequency resource except a resource overlapping a CRS resource indicated by the second parameter. The first parameter is the downlink control resource parameter, and the configured PDSCH time-frequency resource is a PDSCH time-frequency resource scheduled by DCI transmitted on a PDCCH indicated by the downlink control resource parameter.

Optionally, the PDSCH time-frequency resource on which CRS rate matching is performed is a remaining PDSCH time-frequency resource in a configured PDSCH time-frequency resource except a resource overlapping a CRS resource indicated by the second parameter. The first parameter is the downlink data parameter, and the configured PDSCH time-frequency resource is a time-frequency resource corresponding to a PDSCH associated with the downlink data parameter.

The communication module 311 may perform the sending action of the network device in step S301 in the method shown in FIG. 14, or perform the sending actions of the network device in steps S41 and S42 in the method shown in FIG. 15.

The apparatus in the embodiment shown in FIG. 21 may be configured to execute the technical solutions in the embodiment shown in FIG. 14 and FIG. 15 in the foregoing methods. Implementation principles and technical effects of the apparatus are similar to those of the technical solutions. Details are not described herein again.

Figure 22:
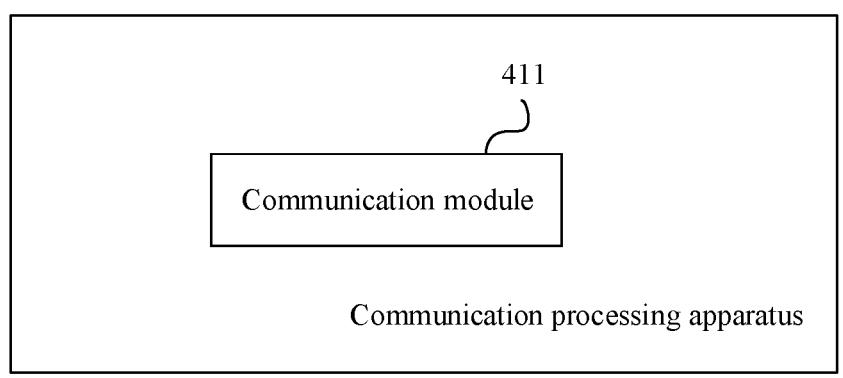
FIG. 22 is a schematic block diagram of still yet another communication processing apparatus according to an embodiment of this application.

FIG. 22 is a schematic block diagram of still yet another communication processing apparatus according to an embodiment of this application. The apparatus in this embodiment of this application may be the terminal device in the foregoing method embodiments, or may be one or more chips in the terminal device. The apparatus may be configured to perform some or all functions of the terminal device in the foregoing method embodiments. The apparatus may include the following unit and module.

A communication module 411 is configured to receive M groups of first parameters and N groups of second parameters that are sent by a network device, where the first parameter is a downlink parameter, the second parameter is a CRS rate matching parameter, M is a positive integer greater than or equal to 2, and N is a positive integer greater than or equal to 1, where P groups of first parameters in the M groups of first parameters and the N groups of second parameters are used to determine a PDSCH time-frequency resource on which CRS rate matching is performed, P is less than or equal to M, and P is a positive integer.

Optionally, the M groups of first parameters correspond to Q network devices, the N groups of first parameters correspond to the Q network devices, and Q is a positive integer greater than or equal to 2.

Optionally, when M is equal to N, the M groups of first parameters correspond to the Q network devices. For example, each group of first parameters in the M groups of first parameters corresponds to each of the Q network devices, a plurality of groups of first parameters correspond to a same network device, or a same group of first parameters corresponds to a plurality of network devices. Each group of second parameters in the N groups of second parameters corresponds to each of the Q network devices.

Optionally, when M is greater than N, the M groups of first parameters correspond to the Q network devices. For example, each group of first parameters in the M groups of first parameters corresponds to each of the Q network devices, a plurality of groups of first parameters correspond to a same network device, or a same group of first parameters corresponds to a plurality of network devices. At least two of the network devices correspond to a same group of second parameters.

Optionally, at least one of the Q network devices is the network device that sends the first parameters and/or the second parameters.

Optionally, the downlink parameter is a downlink control resource parameter or a downlink data parameter. Optionally, the downlink parameter may alternatively be a downlink control resource parameter and a downlink data parameter.

Optionally, the PDSCH time-frequency resource on which CRS rate matching is performed is a remaining PDSCH time-frequency resource in a configured PDSCH time-frequency resource except a resource overlapping a CRS resource associated with the second parameter. The first parameter is the downlink control resource parameter, and the configured PDSCH time-frequency resource is a PDSCH time-frequency resource scheduled by DCI transmitted on a PDCCH indicated by the downlink control resource parameter.

Optionally, the PDSCH time-frequency resource on which CRS rate matching is performed is a remaining PDSCH time-frequency resource in a configured PDSCH time-frequency resource except a resource overlapping a CRS resource associated with the second parameter. The first parameter is the downlink data parameter, and the configured PDSCH time-frequency resource is a time-frequency resource corresponding to a PDSCH associated with the downlink control data parameter.

The communication module 411 may perform step S401 in the method shown in FIG. 16, or may perform step S51 in the method shown in FIG. 17.

The apparatus in the embodiment shown in FIG. 22 may be configured to execute the technical solutions in the embodiment shown in FIG. 16 and FIG. 17 in the foregoing methods. Implementation principles and technical effects of the apparatus are similar to those of the technical solutions. Details are not described herein again.

Figure 23:
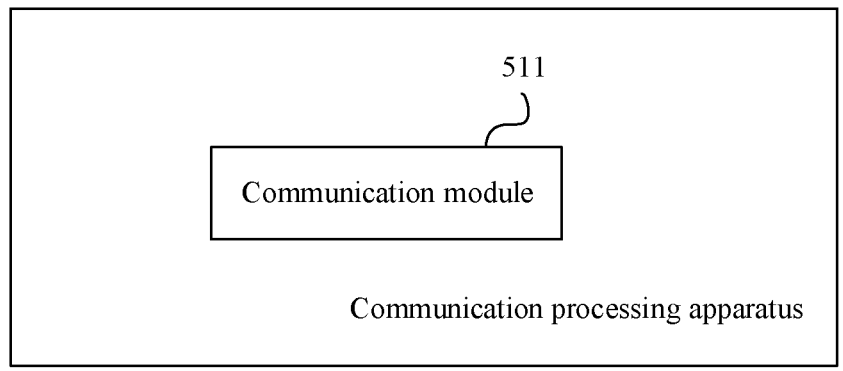
FIG. 23 is a schematic block diagram of a further communication processing apparatus according to an embodiment of this application.

FIG. 23 is a schematic block diagram of a further communication processing apparatus according to an embodiment of this application. The apparatus in this embodiment of this application may be the network device in the foregoing method embodiments, or may be one or more chips in the network device. The apparatus may be configured to perform some or all functions of the network device in the foregoing method embodiments. The apparatus may include the following unit and module.

A communication module 511 is configured to send M groups of first parameters and N groups of second parameters to a terminal device, where the first parameter is a downlink parameter, the second parameter is a CRS rate matching parameter, M is a positive integer greater than or equal to 2, and N is a positive integer greater than or equal to 1, where P groups of first parameters in the M groups of first parameters and the N groups of second parameters are used by the terminal device to determine a PDSCH time-frequency resource on which CRS rate matching is performed, P is less than or equal to M, and P is a positive integer.

Optionally, the M groups of first parameters correspond to Q network devices, the N groups of first parameters correspond to the Q network devices, and Q is a positive integer greater than or equal to 2.

Optionally, when M is equal to N, the M groups of first parameters correspond to the Q network devices. For example, each group of first parameters in the M groups of first parameters corresponds to each of the Q network devices, a plurality of groups of first parameters correspond to a same network device, or a same group of first parameters corresponds to a plurality of network devices. Each group of second parameters in the N groups of second parameters corresponds to each of the Q network devices.

Optionally, when M is greater than N, the M groups of first parameters correspond to the Q network devices. For example, each group of first parameters in the M groups of first parameters corresponds to each of the Q network devices, a plurality of groups of first parameters correspond to a same network device, or a same group of first parameters corresponds to a plurality of network devices. At least two of the network devices correspond to a same group of second parameters.

Optionally, at least one of the Q network devices is the network device that sends the first parameters and/or the second parameters.

Optionally, the downlink parameter is a downlink control resource parameter or a downlink data parameter. Optionally, the downlink parameter may alternatively be a downlink control resource parameter and a downlink data parameter.

Optionally, the PDSCH time-frequency resource on which CRS rate matching is performed is a remaining PDSCH time-frequency resource in a configured PDSCH time-frequency resource except a resource overlapping a CRS resource associated with the second parameter. The first parameter is the downlink control resource parameter, and the configured PDSCH time-frequency resource is a PDSCH time-frequency resource scheduled by DCI transmitted on a PDCCH indicated by the downlink control resource parameter.

Optionally, the PDSCH time-frequency resource on which CRS rate matching is performed is a remaining PDSCH time-frequency resource in a configured PDSCH time-frequency resource except a resource overlapping a CRS resource associated with the second parameter. The first parameter is the downlink data parameter, and the configured PDSCH time-frequency resource is a time-frequency resource corresponding to a PDSCH associated with the downlink control data parameter.

The communication module 511 may perform the sending action of the network device in step S401 in the method shown in FIG. 16, or perform the sending action of the network device in step S51 in the method shown in FIG. 17.

The apparatus in the embodiment shown in FIG. 23 may be configured to execute the technical solutions in the embodiment shown in FIG. 16 and FIG. 17 in the foregoing methods. Implementation principles and technical effects of the apparatus are similar to those of the technical solutions. Details are not described herein again.

Figure 24A:
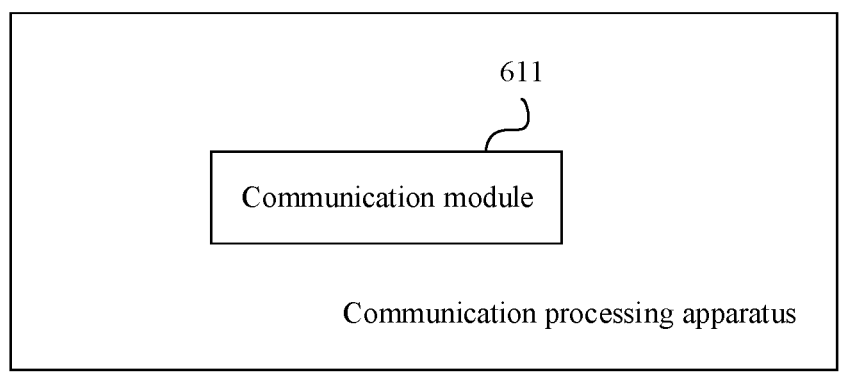
FIG. 24a is a schematic block diagram of a still further communication processing apparatus according to an embodiment of this application.

FIG. 24a is a schematic block diagram of a still further communication processing apparatus according to an embodiment of this application. The apparatus in this embodiment of this application may be the terminal device in the foregoing method embodiment, or may be one or more chips in the terminal device. The apparatus may be configured to perform some or all functions of the terminal device in the foregoing method embodiment. The apparatus may include the following unit and module.

A communication module 611 is configured to receive N groups of CRS rate matching parameters sent by a network device, where N is a positive integer greater than or equal to 1, and the N groups of CRS rate matching parameters are used to determine a PDSCH time-frequency resource on which CRS rate matching is performed.

The communication module 611 may perform step S501 in the method shown in FIG. 18a, or may perform step S61 in the method shown in FIG. 18b.

The apparatus in the embodiment shown in FIG. 24a may be configured to execute the technical solution in the embodiment shown in FIG. 18a or FIG. 18b in the foregoing method. Implementation principles and technical effects of the apparatus are similar to those of the technical solution. Details are not described herein again.

Figure 24B:
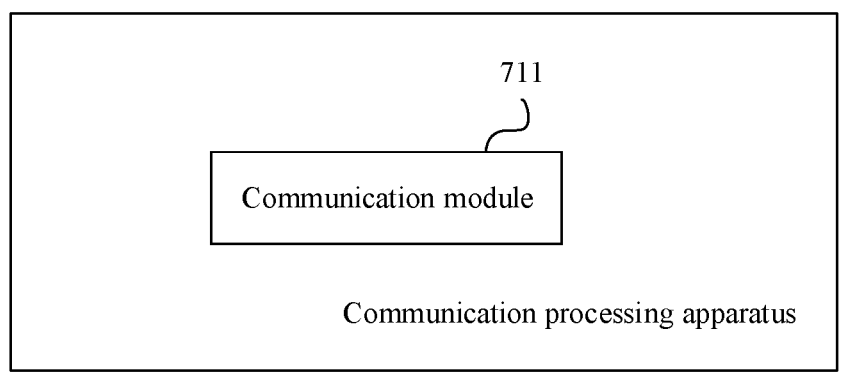
FIG. 24b is a schematic block diagram of a yet further communication processing apparatus according to an embodiment of this application.

FIG. 24b is a schematic block diagram of a yet further communication processing apparatus according to an embodiment of this application. The apparatus in this embodiment of this application may be the network device in the foregoing method embodiment, or may be one or more chips in the network device. The apparatus may be configured to perform some or all functions of the network device in the foregoing method embodiment. The apparatus may include the following unit and module.

A communication module 711 is configured to send N groups of CRS rate matching parameters to a terminal device, where N is a positive integer greater than or equal to 1, and the N groups of CRS rate matching parameters are used to determine a PDSCH time-frequency resource on which CRS rate matching is performed.

The communication module 711 may perform the action of the network device in step S501 in the method shown in FIG. 18a, or may perform the action of the network device in step S61 in the method shown in FIG. 18b.

The apparatus in the embodiment shown in FIG. 24b may be configured to execute the technical solution in the embodiment shown in FIG. 18*a* or FIG. 18*b* in the foregoing method. Implementation principles and technical effects of the apparatus are similar to those of the technical solution. Details are not described herein again.

In all the following embodiments, a processor, a memory, a receiver, and a transmitter do not necessarily exist simultaneously, and the following apparatus or device may alternatively exist in a product form of a chip. The apparatus or the device specifically includes a processor. The processor is connected to a memory. The memory stores computer program instructions. The processor executes the computer program instructions stored in the memory, to implement the method provided in any one of the foregoing implementations. The memory and the processor may be integrated together, or may be independent devices. If the memory and the processor are the independent devices, the memory may be located inside the apparatus or the device, or may be located outside the apparatus or the device.

In a possible implementation, the processor includes a logic circuit and an input interface and/or an output interface. The output interface is configured to perform a sending action in a corresponding method, and the input interface is configured to perform a receiving action in the corresponding method.

In a possible implementation, the following apparatus or device further includes a communication interface and a communication bus. The processor, the memory, and the communication interface are connected by using the communication bus. The communication interface is configured to perform sending and receiving actions in the corresponding method. The communication interface may also be referred to as a transceiver. Optionally, the communication interface includes a transmitter or a receiver. In this case, the transmitter is configured to perform a sending action in a corresponding method, and the receiver is configured to perform a receiving action in the corresponding method.

Figure 24C:
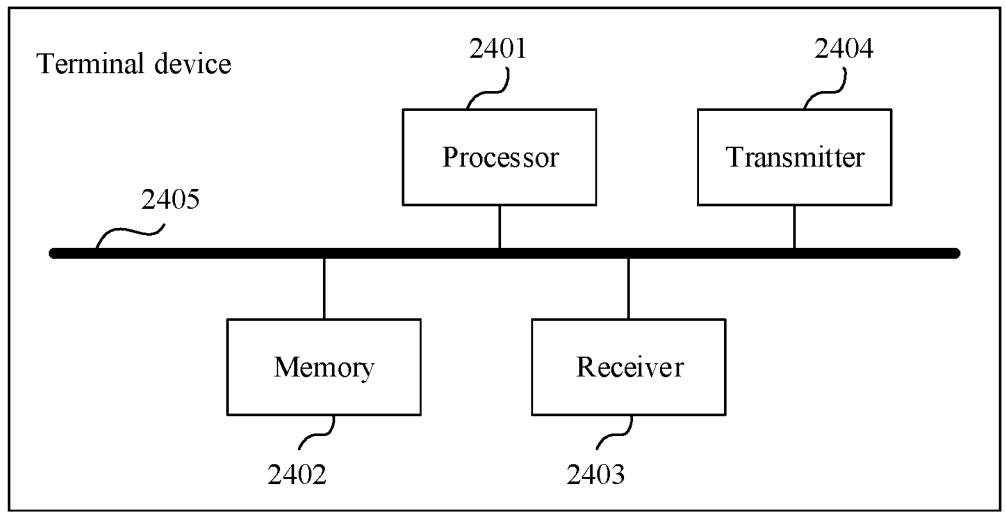
FIG. 24c is a schematic structural diagram of a terminal device according to an embodiment of this application.

FIG. 24*c* is a schematic structural diagram of a terminal device according to an embodiment of this application. As shown in FIG. 24*c*, the terminal device provided in this embodiment of this application may be configured to perform the actions or the steps of the terminal device in the embodiments shown in FIG. 9 to FIG. 13, may be further configured to perform the actions or the steps of the module of the apparatus in the embodiment shown in FIG. 18*c*, and specifically includes a processor 2401, a memory 2402, a receiver 2403, and a transmitter 2404. The receiver 2403 and the transmitter 2404 may be connected to an antenna. In a downlink direction, the receiver 2403 and the transmitter 2404 receive, by using the antenna, information sent by a network device, and send the information to the processor 2401 for processing. In an uplink direction, the processor 2401 processes information about the terminal, and sends the information to the network device by using the transmitter 2404.

The memory 2402 is configured to store a computer program.

The processor 2401 is configured to execute the computer program stored in the memory 2402, to implement the processing actions of the terminal device in the embodiments shown in FIG. 9 to FIG. 13, or the processing actions of the module of the apparatus in the embodiment shown in FIG. 18*c*. Details are not described again.

The receiver 2403 is configured to perform the receiving actions of the terminal device in the embodiments shown in FIG. 9 to FIG. 13, or the receiving actions of the module of the apparatus in the embodiment shown in FIG. 18*c*. Details are not described again.

The transmitter 2404 is configured to perform the sending actions of the terminal device in the embodiments shown in FIG. 9 to FIG. 13, or the sending actions of the module of the apparatus in the embodiment shown in FIG. 18*c*. Details are not described again.

Optionally, the terminal device may further include a bus 2405. The processor 2401, the memory 2402, the receiver 2403, and the transmitter 2404 may be connected to each other by using the bus 2405. The bus 2405 may be a peripheral component interconnect (peripheral component interconnect, PCI) bus, an extended industry standard architecture (extended industry standard architecture, EISA) bus, or the like. The bus 2404 may be classified into an address bus, a data bus, a control bus, and the like. For ease of representation, only one thick line is used to represent the bus in FIG. 24*c*, but this does not mean that there is only one bus or only one type of bus.

In the embodiments of this application, refer to each other for the foregoing embodiments. Same or similar steps and nouns are not described one by one again.

Some or all of the foregoing modules may alternatively be implemented in a form of an integrated circuit that is embedded in a chip of an SMF entity. In addition, they may be separately implemented, or may be integrated together. That is, the modules may be configured as one or more integrated circuits for implementing the foregoing method, for example, one or more application specific integrated circuits (Application Specific Integrated Circuit, ASIC), one or more microprocessors (digital signal processor, DSP), or one or more field programmable gate arrays (Field Programmable Gate Array, FPGA).

Figure 25:
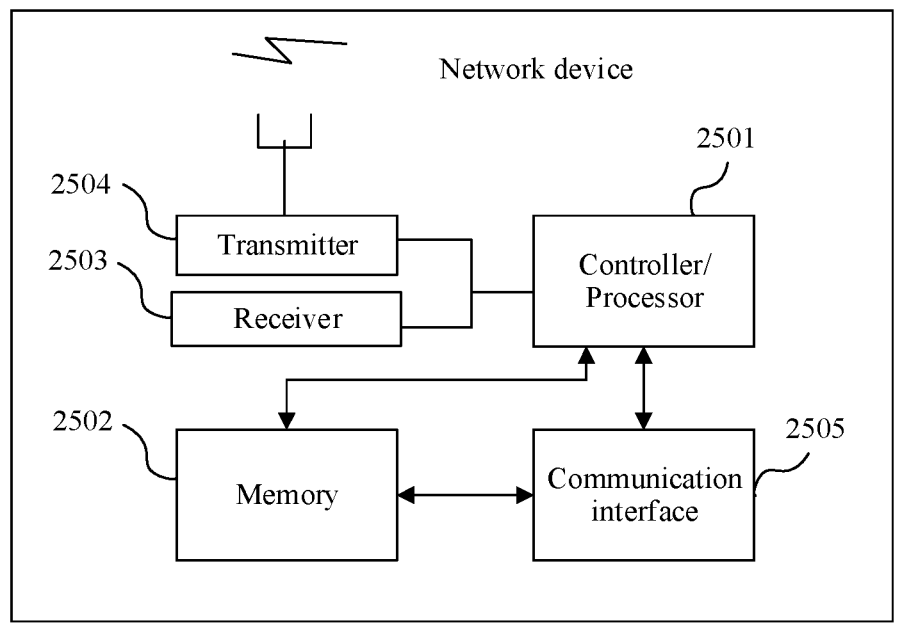
FIG. 25 is a schematic structural diagram of a network device according to an embodiment of this application.

FIG. 25 is a schematic structural diagram of a network device according to an embodiment of this application. As shown in FIG. 25, the network device provided in this embodiment of this application may be configured to perform the actions or the steps of the network device in the embodiments shown in FIG. 9 to FIG. 13, may be further configured to perform the actions or the steps of the module of the apparatus in the embodiment shown in FIG. 19, and specifically includes a processor 2501, a memory 2502, a receiver 2503, and a transmitter 2504.

The memory 2502 is configured to store a computer program.

The processor 2501 is configured to execute the computer program stored in the memory 2502, to implement the processing actions of the network device in the embodiments shown in FIG. 9 to FIG. 13, or the processing actions of the module in the apparatus in the embodiment shown in FIG. 19. Details are not described again.

The receiver 2503 is configured to perform the receiving actions of the network device in the embodiments shown in FIG. 9 to FIG. 13, or the receiving actions of the module of the apparatus in the embodiment shown in FIG. 19. Details are not described again.

The transmitter 2504 is configured to perform the sending actions of the network device in the embodiments shown in FIG. 9 to FIG. 13, or the sending actions of the module of the apparatus in the embodiment shown in FIG. 19. Details are not described again.

The processor 2501 may alternatively be a controller, and is represented as the "controller/processor 2501" in FIG. 25. The receiver 2503 and the transmitter 2504 are configured to support the network device in transmitting information to and receiving information from the terminal device in the foregoing embodiments, and support radio communication between the network device and another network device.

Optionally, the processor 2501 performs various functions for communicating with the terminal device.

In addition, the network device may further include a communication interface 2505. The communication interface 2505 is configured to support the network device in communicating with another network entity.

The processor 2501, for example, a central processing unit (central processing unit, CPU), may be one or more integrated circuits configured to implement the foregoing methods, for example, one or more specific integrated circuits, one or more microprocessors, or one or more field programmable gate arrays. The memory 2502 may be a memory, or may be a general name of a plurality of storage elements.

Figure 26:
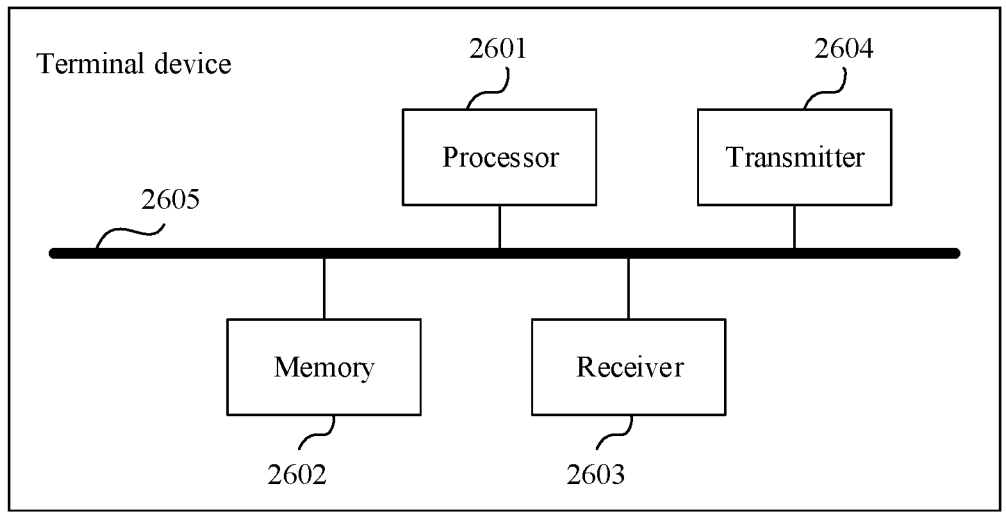
FIG. 26 is a schematic structural diagram of another terminal device according to an embodiment of this application.

FIG. 26 is a schematic structural diagram of another terminal device according to an embodiment of this application. As shown in FIG. 26, the terminal device provided in this embodiment of this application may be configured to perform the actions or the steps of the terminal device in the embodiments shown in FIG. 14 and FIG. 15, may be further configured to perform the actions or the steps of the module of the apparatus in the embodiment shown in FIG. 20, and specifically includes a processor 2601, a memory 2602, a receiver 2603, and a transmitter 2604. The receiver 2603 and the transmitter 2604 may be connected to an antenna. In a downlink direction, the receiver 2603 and the transmitter 2604 receive, by using the antenna, information sent by a network device, and send the information to the processor 2601 for processing. In an uplink direction, the processor 2601 processes information about the terminal, and sends the information to the network device by using the transmitter 2604.

The memory 2602 is configured to store a computer program.

The processor 2601 is configured to execute the computer program stored in the memory 2602, to implement the processing actions of the terminal device in the embodiments shown in FIG. 14 and FIG. 15, or the processing actions of the module of the apparatus in the embodiment shown in FIG. 20. Details are not described again.

The receiver 2603 is configured to perform the receiving actions of the terminal device in the embodiments shown in FIG. 14 and FIG. 15, or the receiving actions of the module of the apparatus in the embodiment shown in FIG. 20. Details are not described again.

The transmitter 2604 is configured to perform the sending actions of the terminal device in the embodiments shown in FIG. 14 and FIG. 15, or the sending actions of the module of the apparatus in the embodiment shown in FIG. 20. Details are not described again.

Optionally, the terminal device may further include a bus 2605. The processor 2601, the memory 2602, the receiver 2603, and the transmitter 2604 may be connected to each other by using the bus 2605. The bus 2605 may be a PCI bus, an EISA bus, or the like. The bus 2604 may be classified into an address bus, a data bus, a control bus, and the like. For ease of representation, only one thick line is used to represent the bus in FIG. 26, but this does not mean that there is only one bus or only one type of bus.

In the embodiments of this application, refer to each other for the foregoing embodiments. Same or similar steps and nouns are not described one by one again.

Some or all of the foregoing modules may alternatively be implemented in a form of an integrated circuit that is embedded in a chip of an SMF entity. In addition, they may be separately implemented, or may be integrated together. In other words, the modules may be configured as one or more integrated circuits for implementing the foregoing method, for example, one or more ASICs, one or more DSPs, or one or more FPGAs.

Figure 27:
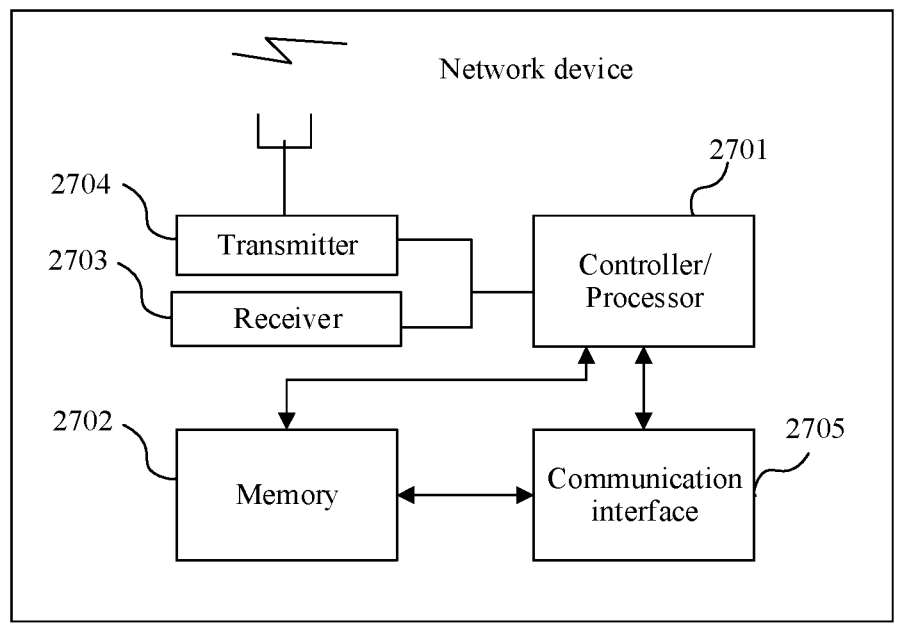
FIG. 27 is a schematic structural diagram of another network device according to an embodiment of this application.

FIG. 27 is a schematic structural diagram of another network device according to an embodiment of this application. As shown in FIG. 27, the network device provided in this embodiment of this application may be configured to perform the actions or the steps of the network device in the embodiments shown in FIG. 14 and FIG. 15, may be further configured to perform the actions or the steps of the module of the apparatus in the embodiment shown in FIG. 21, and specifically includes a processor 2701, a memory 2702, a receiver 2703, and a transmitter 2704.

The memory 2702 is configured to store a computer program.

The processor 2701 is configured to execute the computer program stored in the memory 2702, to implement the processing actions of the network device in the embodiments shown in FIG. 14 and FIG. 15, or the processing actions of the module in the apparatus in the embodiment shown in FIG. 21. Details are not described again.

The receiver 2703 is configured to perform the receiving actions of the network device in the embodiments shown in FIG. 14 and FIG. 15, or the receiving actions of the module of the apparatus in the embodiment shown in FIG. 21. Details are not described again.

The transmitter 2704 is configured to perform the sending actions of the network device in the embodiments shown in FIG. 14 and FIG. 15, or the sending actions of the module of the apparatus in the embodiment shown in FIG. 21. Details are not described again.

The processor 2701 may alternatively be a controller, and is represented as the "controller/processor 2701" in FIG. 27. The receiver 2703 and the transmitter 2704 are configured to support the network device in transmitting information to and receiving information from the terminal device in the foregoing embodiments, and support radio communication between the network device and another network device. Optionally, the processor 2701 performs various functions for communicating with the terminal device.

In addition, the network device may further include a communication interface 2705. The communication interface 2705 is configured to support the network device in communicating with another network entity.

The processor 2701, for example, a CPU, may be one or more integrated circuits configured to implement the foregoing methods, for example, one or more specific integrated circuits, one or more microprocessors, or one or more field programmable gate arrays. The memory 2702 may be a memory, or may be a general name of a plurality of storage elements.

Figure 28:
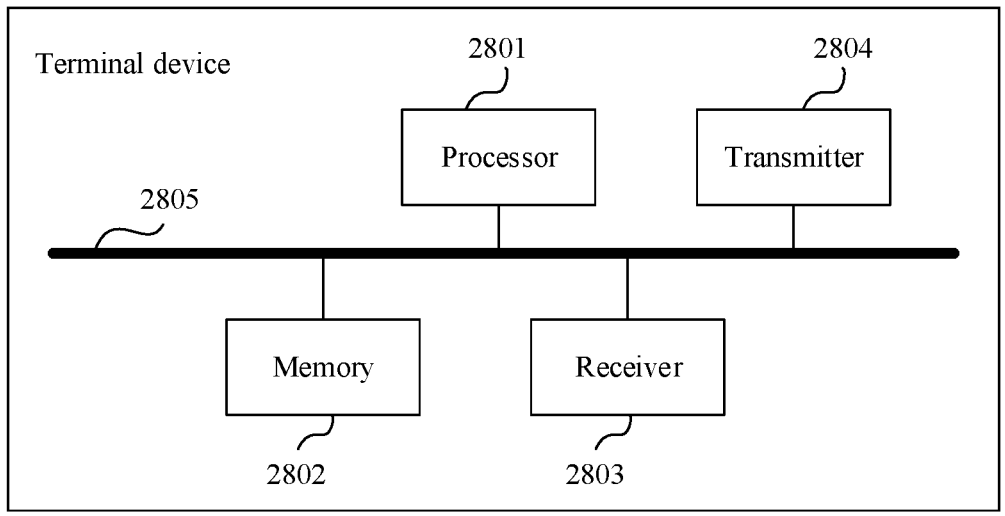
FIG. 28 is a schematic structural diagram of still another terminal device according to an embodiment of this application.

FIG. 28 is a schematic structural diagram of still another terminal device according to an embodiment of this application. As shown in FIG. 28, the terminal device provided in this embodiment of this application may be configured to perform the actions or the steps of the terminal device in the embodiments shown in FIG. 16 and FIG. 17, may be further configured to perform the actions or the steps of the module of the apparatus in the embodiment shown in FIG. 22, and specifically includes a processor 2801, a memory 2802, a receiver 2803, and a transmitter 2804. The receiver 2803 and the transmitter 2804 may be connected to an antenna. In a downlink direction, the receiver 2803 and the transmitter 2804 receive, by using the antenna, information sent by a network device, and send the information to the processor 2801 for processing. In an uplink direction, the processor

2801 processes information about the terminal, and sends the information to the network device by using the transmitter 2804.

The memory 2802 is configured to store a computer program.

The processor 2801 is configured to execute the computer program stored in the memory 2802, to implement the processing actions of the terminal device in the embodiments shown in FIG. 16 and FIG. 17, or the processing actions of the module of the apparatus in the embodiment shown in FIG. 22. Details are not described again.

The receiver 2803 is configured to perform the receiving actions of the terminal device in the embodiments shown in FIG. 16 and FIG. 17, or the receiving actions of the module of the apparatus in the embodiment shown in FIG. 22. Details are not described again.

The transmitter 2804 is configured to perform the sending actions of the terminal device in the embodiments shown in FIG. 16 and FIG. 17, or the sending actions of the module of the apparatus in the embodiment shown in FIG. 22. Details are not described again.

Optionally, the terminal device may further include a bus 2805. The processor 2801, the memory 2802, the receiver 2803, and the transmitter 2804 may be connected to each other by using the bus 2805. The bus 2805 may be a PCI bus, an EISA bus, or the like. The bus 2804 may be classified into an address bus, a data bus, a control bus, and the like. For ease of representation, only one thick line is used to represent the bus in FIG. 28, but this does not mean that there is only one bus or only one type of bus.

In the embodiments of this application, refer to each other for the foregoing embodiments. Same or similar steps and nouns are not described one by one again.

Some or all of the foregoing modules may alternatively be implemented in a form of an integrated circuit that is embedded in a chip of an SMF entity. In addition, they may be separately implemented, or may be integrated together. In other words, the modules may be configured as one or more integrated circuits for implementing the foregoing method, for example, one or more ASICs, one or more DSPs, or one or more FPGAs.

Figure 29:
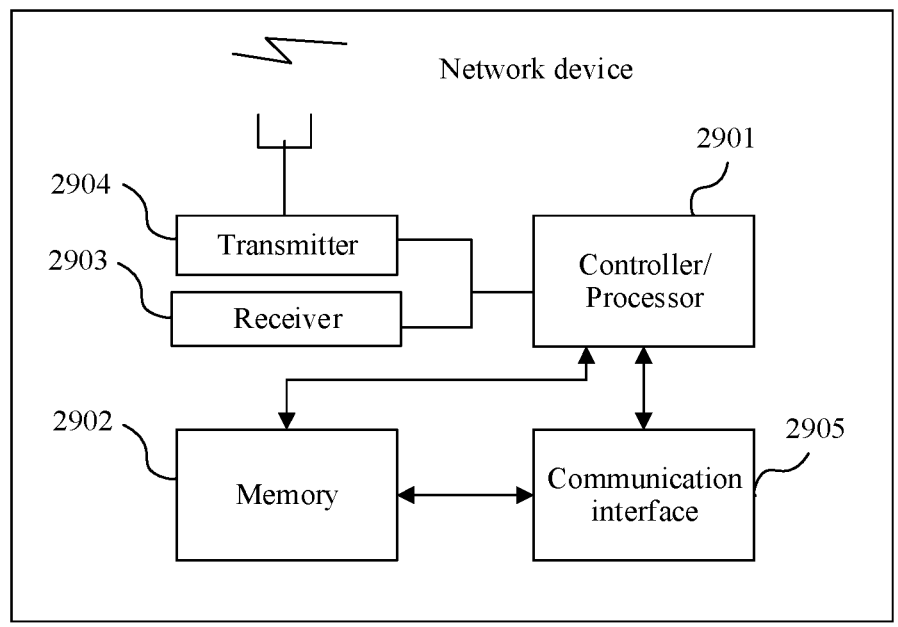
FIG. 29 is a schematic structural diagram of still another network device according to an embodiment of this application.

FIG. 29 is a schematic structural diagram of still another network device according to an embodiment of this application. As shown in FIG. 29, the network device provided in this embodiment of this application may be configured to perform the actions or the steps of the network device in the embodiments shown in FIG. 16 and FIG. 17, may be further configured to perform the actions or the steps of the module of the apparatus in the embodiment shown in FIG. 23, and specifically includes a processor 2901, a memory 2902, a receiver 2903, and a transmitter 2904.

The memory 2902 is configured to store a computer program.

The processor 2901 is configured to execute the computer program stored in the memory 2902, to implement the processing actions of the network device in the embodiments shown in FIG. 16 and FIG. 17, or the processing actions of the module in the apparatus in the embodiment shown in FIG. 23. Details are not described again.

The receiver 2903 is configured to perform the receiving actions of the network device in the embodiments shown in FIG. 16 and FIG. 17, or the receiving actions of the module of the apparatus in the embodiment shown in FIG. 23. Details are not described again.

The transmitter 2904 is configured to perform the sending actions of the network device in the embodiments shown in FIG. 16 and FIG. 17, or the sending actions of the module of the apparatus in the embodiment shown in FIG. 23. Details are not described again.

The processor 2901 may alternatively be a controller, and is represented as the "controller/processor 2901" in FIG. 29. The receiver 2903 and the transmitter 2904 are configured to support the network device in transmitting information to and receiving information from the terminal device in the foregoing embodiments, and support radio communication between the network device and another network device. Optionally, the processor 2901 performs various functions for communicating with the terminal device.

In addition, the network device may further include a communication interface 2905. The communication interface 2905 is configured to support the network device in communicating with another network entity.

The processor 2901, for example, a CPU, may be one or more integrated circuits configured to implement the foregoing methods, for example, one or more specific integrated circuits, one or more microprocessors, or one or more field programmable gate arrays. The memory 2902 may be a memory, or may be a general name of a plurality of storage elements.

Figure 30:
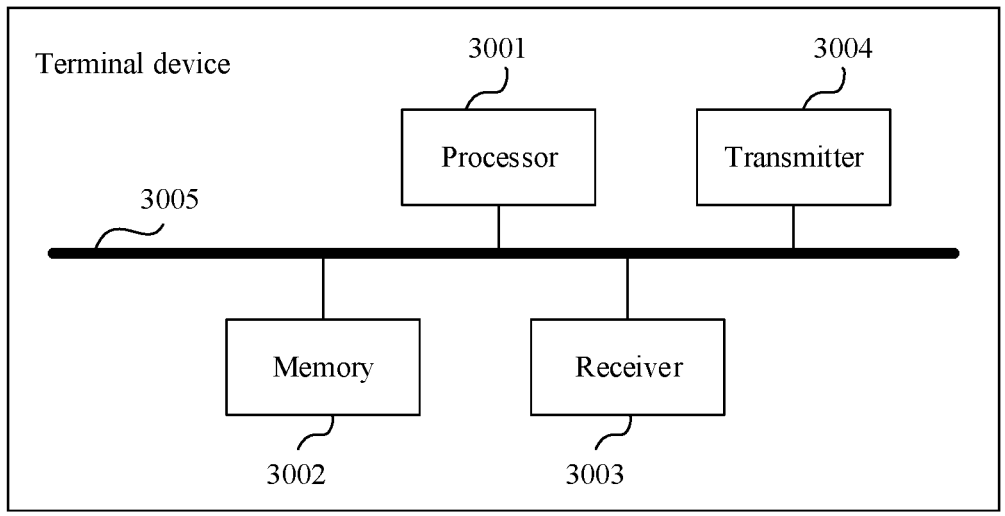
FIG. 30 is a schematic structural diagram of yet another terminal device according to an embodiment of this application.

FIG. 30 is a schematic structural diagram of yet another terminal device according to an embodiment of this application. As shown in FIG. 30, the terminal device provided in this embodiment of this application may be configured to perform the actions or the steps of the terminal device in the embodiments shown in FIG. 18*a* and FIG. 18*b*, may be further configured to perform the actions or the steps of the module of the apparatus in the embodiment shown in FIG. 24*a*, and specifically includes a processor 3001, a memory 3002, a receiver 3003, and a transmitter 3004. The receiver 3003 and the transmitter 3004 may be connected to an antenna. In a downlink direction, the receiver 3003 and the transmitter 3004 receive, by using the antenna, information sent by a network device, and send the information to the processor 3001 for processing. In an uplink direction, the processor 3001 processes information about the terminal, and sends the information to the network device by using the transmitter 3004.

The memory 3002 is configured to store a computer program.

The processor 3001 is configured to execute the computer program stored in the memory 3002, to implement the processing actions of the terminal device in the embodiments shown in FIG. 18*a* and FIG. 18*b*, or the processing actions of the module of the apparatus in the embodiment shown in FIG. 24*a*. Details are not described again.

The receiver 3003 is configured to perform the receiving actions of the terminal device in the embodiments shown in FIG. 18*a* and FIG. 18*b*, or the receiving actions of the module of the apparatus in the embodiment shown in FIG. 24*a*. Details are not described again.

The transmitter 3004 is configured to perform the sending actions of the terminal device in the embodiments shown in FIG. 18*a* and FIG. 18*b*, or the sending actions of the module of the apparatus in the embodiment shown in FIG. 24*a*. Details are not described again.

Optionally, the terminal device may further include a bus 3005. The processor 3001, the memory 3002, the receiver 3003, and the transmitter 3004 may be connected to each other by using the bus 3005. The bus 3005 may be a PCI bus, an EISA bus, or the like. The bus 3004 may be classified into an address bus, a data bus, a control bus, and the like. For ease of representation, only one thick line is used to represent the bus in FIG. 30, but this does not mean that there is only one bus or only one type of bus.

In the embodiments of this application, refer to each other for the foregoing embodiments. Same or similar steps and nouns are not described one by one again.

Some or all of the foregoing modules may alternatively be implemented in a form of an integrated circuit that is embedded in a chip of an SMF entity. In addition, they may be separately implemented, or may be integrated together. In other words, the modules may be configured as one or more integrated circuits for implementing the foregoing method, for example, one or more ASICs, one or more DSPs, or one or more FPGAs.

Figure 31:
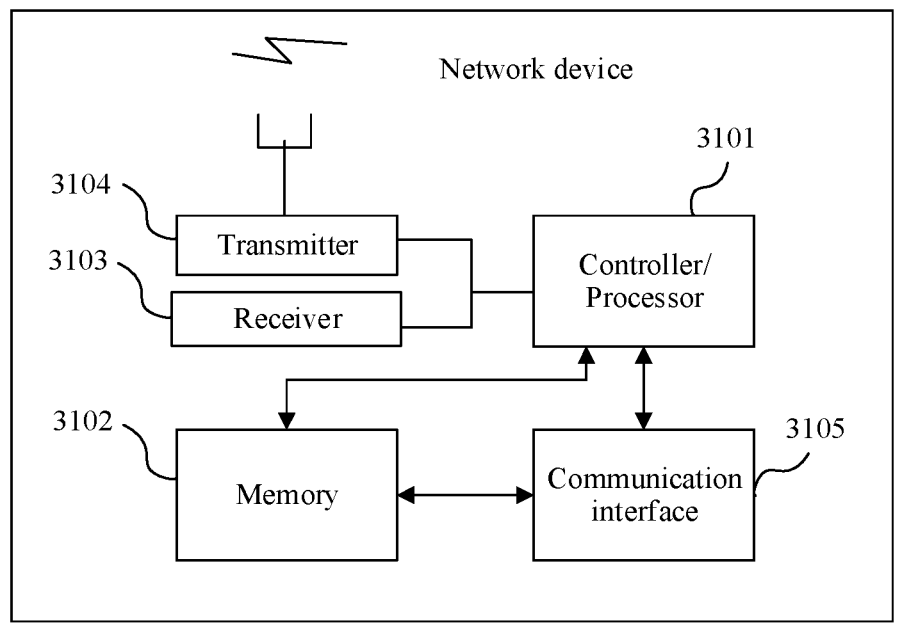
FIG. 31 is a schematic structural diagram of yet another network device according to an embodiment of this application.

FIG. 31 is a schematic structural diagram of yet another network device according to an embodiment of this application. As shown in FIG. 31, the network device provided in this embodiment of this application may be configured to perform the actions or the steps of the network device in the embodiments shown in FIG. 18a and FIG. 18b, may be further configured to perform the actions or the steps of the module of the apparatus in the embodiment shown in FIG. 24b, and specifically includes a processor 3101, a memory 3102, a receiver 3103, and a transmitter 3104.

The memory 3102 is configured to store a computer program.

The processor 3101 is configured to execute the computer program stored in the memory 3102, to implement the processing actions of the network device in the embodiments shown in FIG. 18a and FIG. 18b, or the processing actions of the module in the apparatus in the embodiment shown in FIG. 24b. Details are not described again.

The receiver 3103 is configured to perform the receiving actions of the network device in the embodiments shown in FIG. 18a and FIG. 18b, or the receiving actions of the module of the apparatus in the embodiment shown in FIG. 24b. Details are not described again.

The transmitter 3104 is configured to perform the sending actions of the network device in the embodiments shown in FIG. 18a and FIG. 18b, or the sending actions of the module of the apparatus in the embodiment shown in FIG. 24b. Details are not described again.

The processor 3101 may alternatively be a controller, and is represented as the "controller/processor 3101" in FIG. 31. The receiver 3103 and the transmitter 3104 are configured to support the network device in transmitting information to and receiving information from the terminal device in the foregoing embodiments, and support radio communication between the network device and another network device. Optionally, the processor 3101 performs various functions for communicating with the terminal device.

In addition, the network device may further include a communication interface 3105. The communication interface 3105 is configured to support the network device in communicating with another network entity.

The processor 3101, for example, a CPU, may be one or more integrated circuits configured to implement the foregoing methods, for example, one or more specific integrated circuits, one or more microprocessors, or one or more field programmable gate arrays. The memory 3102 may be a memory, or may be a general name of a plurality of storage elements.

An embodiment of this application provides a communication system. The communication system includes the terminal device provided in FIG. 24c and the network device provided in FIG. 25.

An embodiment of this application provides another communication system. The communication system includes the terminal device provided in FIG. 26 and the network device provided in FIG. 27.

An embodiment of this application provides still another communication system. The communication system includes the terminal device provided in FIG. 28 and the network device provided in FIG. 29.

An embodiment of this application provides yet another communication system. The communication system includes the terminal device provided in FIG. 30 and the network device provided in FIG. 31.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (Digital Subscriber Line, DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

A person skilled in the art should be aware that in the foregoing one or more examples, functions described in the embodiments of this application may be implemented by hardware, software, firmware, or any combination thereof. When this application is implemented by software, the foregoing functions may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium may be any available medium accessible to a general-purpose or dedicated computer.

What is claimed is:

1. A communication method, comprising:
receiving M groups of first parameters and N groups of second parameters that are from a network device, wherein each group of the M groups of first parameters is associated in an one-to-one correspondence with a corresponding group of the N groups of second parameters, wherein each first parameter is a control resource set (CORESET) group comprising one or more CORESETs, and each CORESET of the one or more CORESETs indicates time-frequency resource of downlink channel for detecting a downlink control information (DCI), wherein the DCI indicates a first physical downlink shared channel (PDSCH) time-frequency resource, each second parameter of the N groups of second parameters is a cell-specific reference signal (CRS) rate matching parameter, wherein the each second parameter indicates a time-frequency resource punctured for rate matching, M is equal to N, both M and N are positive integers greater than or equal to 2; and performing a CRS rate matching on the first PDSCH time-frequency resource indicated by the DCI, to obtain a second PDSCH time-frequency resource, wherein the second PDSCH time-frequency resource is a remaining PDSCH time-frequency resource in the first PDSCH time-frequency resource except a resource overlapping a time-frequency resource punctured for rate matching indicated by a second parameter, the second parameter is associated in the one-to-one correspondence with a CORESET group comprising a CORESET, wherein the CORESET indicates a time-frequency resource on which the DCI is received.

2. The communication method according to claim 1, wherein the correspondence between the M groups of first parameters and N groups of second parameters is predefined.

3. The communication method according to claim 1, wherein the method further comprises:
receiving first signaling sent by the network device, wherein:
the first signaling comprises the correspondence between the M groups of first parameters and N groups of second parameters; or
the first signaling is used to indicate the correspondence between the M groups of first parameters and N groups of second parameters.

4. The communication method according to claim 3, wherein the first signaling is one or more of the following: radio resource control (RRC) signaling, media access control-control element (MAC-CE) signaling, or downlink control information (DCI) signaling.

5. The communication method according to claim 1, wherein the receiving M groups of first parameters and N groups of second parameters that are sent by a network device comprises:
receiving second signaling sent by the network device, wherein:
the second signaling comprises at least one of (i) the M groups of first parameters or (ii) the N groups of second parameters; or
the second signaling is used to indicate at least one of (i) the M groups of first parameters or (ii) the N groups of second parameters.

6. The communication method according to claim 5, wherein the second signaling is one or more of the following: RRC signaling, MAC-CE signaling, or DCI signaling.

7. A communication apparatus, comprising:
at least one processor; and
one or more memories coupled to the at least one processor and storing programming instructions for execution by the at least one processor to perform operations comprising:
receiving M groups of first parameters and N groups of second parameters that are from a network device, wherein each group of the M groups of first parameters is associated in an one-to-one correspondence with a corresponding group of the N groups of second parameters, wherein each first parameter is a control resource set (CORESET) group comprising one or more CORESETs, and each CORESET of the one or more CORESETs indicates time-frequency resource of downlink channel for detecting a downlink control information (DCI), wherein the DCI indicates a first physical downlink shared channel (PDSCH) time-frequency resource, each second parameter of the N groups of second parameters is a cell-specific reference signal (CRS) rate matching parameter, wherein the each second parameter indicates a time-frequency resource punctured for rate matching, M is equal to N, both M and N are positive integers greater than or equal to 2; and performing a CRS rate matching on the first PDSCH time-frequency resource indicated by the DCI, to obtain a second PDSCH time-frequency resource, wherein the second PDSCH time-frequency resource is a remaining PDSCH time-frequency resource in the first PDSCH time-frequency resource except a resource overlapping a time-frequency resource punctured for rate matching indicated by a second parameter, the second parameter is associated in the one-to-one correspondence with a CORESET group comprising a CORESET, wherein the CORESET indicates a time-frequency resource on which the DCI is received.

8. The communication apparatus according to claim 7, wherein the correspondence between the M groups of first parameters and N groups of second parameters is predefined.

9. The communication apparatus according to claim 7, wherein the operations further comprise:
receiving first signaling sent by the network device, wherein:
the first signaling comprises the correspondence between the M groups of first parameters and N groups of second parameters; or
the first signaling is used to indicate the correspondence between the M groups of first parameters and N groups of second parameters.

10. The communication apparatus according to claim 9, wherein the first signaling is one or more of the following: radio resource control (RRC) signaling, media access control-control element (MAC-CE) signaling, or downlink control information (DCI) signaling.

11. The communication apparatus according to claim 7, wherein the operations comprise:
receiving second signaling sent by the network device, wherein:
the second signaling comprises at least one of (i) the M groups of first parameters or (ii) the N groups of second parameters; or
the second signaling is used to indicate at least one of (i) the M groups of first parameters or (ii) the N groups of second parameters.

12. The communication apparatus according to claim 11, wherein the second signaling is one or more of the following: RRC signaling, MAC-CE signaling, or DCI signaling.

13. The communication apparatus according to claim 7, wherein the communication apparatus is a terminal device.

14. A non-transitory computer-readable storage medium, wherein the computer-readable storage medium stores a program or instructions for being executed by at least one processor to perform operations comprising:
receiving M groups of first parameters and N groups of second parameters that are from a network device, wherein each group of the M groups of first parameters is associated in an one-to-one correspondence with a corresponding group of the N groups of second parameters, wherein each first parameter is a control resource set (CORESET) group comprising one or more CORESETs, and each CORESET of the one or more CORESETs indicates time-frequency resource of downlink channel for detecting a downlink control information (DCI), wherein the DCI indicates a first physical downlink shared channel (PDSCH) time-frequency resource, each second parameter of the N groups of second parameters is a cell-specific reference signal (CRS) rate matching parameter, wherein the each second parameter indicates a time-frequency resource punctured for rate matching, M is equal to N, both M and N are positive integers greater than or equal to 2; and performing a CRS rate matching on the first PDSCH time-frequency resource indicated by the DCI, to obtain a second PDSCH time-frequency resource, wherein the second PDSCH time-frequency resource is a remaining PDSCH time-frequency resource in the first PDSCH time-frequency resource except a resource overlapping a time-frequency resource punctured for rate matching indicated by a second parameter, the second parameter is associated in the one-to-one correspondence with a CORESET group comprising a CORESET, wherein the CORESET indicates a time-frequency resource on which the DCI is received.

15. The non-transitory computer-readable storage medium according to claim 14, wherein the correspondence between the M groups of first parameters and N groups of second parameters is predefined.

16. The non-transitory computer-readable storage medium according to claim 14, wherein the operations comprise:

receiving second signaling sent by the network device, wherein:

the second signaling comprises at least one of (i) the M groups of first parameters or (ii) the N groups of second parameters; or the second signaling is used to indicate at least one of (i) the M groups of first parameters or (ii) the N groups of second parameters.

17. The non-transitory computer-readable storage medium according to claim 16, wherein the second signaling is one or more of the following: RRC signaling, MAC-CE signaling, or DCI signaling.

* * * * *